(12) United States Patent
Kondo et al.

(10) Patent No.: US 11,165,665 B2
(45) Date of Patent: Nov. 2, 2021

(54) APPARATUS AND METHOD TO IMPROVE PRECISION OF IDENTIFYING A RANGE OF EFFECTS OF A FAILURE IN A SYSTEM PROVIDING A MULTILAYER STRUCTURE OF SERVICES

(71) Applicant: FUJITSU LIMITED, Kawasaki (JP)

(72) Inventors: Reiko Kondo, Yamato (JP); Yukihiro Watanabe, Kawasaki (JP); Masahiro Asaoka, Kawasaki (JP); Tetsuya Uchiumi, Kawasaki (JP); Kazuhiro Suzuki, Kawasaki (JP); Fumi Iikura, Shinagawa (JP); Shingo Okuno, Kawasaki (JP); Yuji Saito, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/225,152

(22) Filed: Dec. 19, 2018

(65) Prior Publication Data

US 2019/0207826 A1 Jul. 4, 2019

(30) Foreign Application Priority Data

Dec. 28, 2017 (JP) .............................. JP2017-254294

(51) Int. Cl.
*H04L 12/24* (2006.01)
*H04L 29/08* (2006.01)
*H04L 12/26* (2006.01)

(52) U.S. Cl.
CPC ...... *H04L 41/5035* (2013.01); *H04L 41/0631* (2013.01); *H04L 41/12* (2013.01);
(Continued)

(58) Field of Classification Search
CPC ..... H04L 41/12; H04L 41/22; H04L 41/0631; H04L 41/5009; H04L 41/5035;
(Continued)

(56) References Cited

U.S. PATENT DOCUMENTS 6,564,258 B1 * 5/2003 Uniacke .................. H04L 45/02
370/351
7,590,048 B2 * 9/2009 Doukai ................... H04L 45/00
370/217
(Continued)

FOREIGN PATENT DOCUMENTS

| JP | 2012-38028 | 2/2012 |
| JP | 2012-99048 | 5/2012 |
| JP | 2015-22396 | 2/2015 |

OTHER PUBLICATIONS

Villegas D, Bobroff N, Rodero I, Delgado J, Liu Y, Devarakonda A, Fong L, Sadjadi SM, Parashar M. Cloud federation in a layered service model. Journal of Computer and System Sciences. Sep. 1, 2012;78(5):1330-44. (Year: 2012).*

(Continued)

*Primary Examiner* — James N Fiorillo
(74) *Attorney, Agent, or Firm* — Fujitsu Patent Center

(57) ABSTRACT

An apparatus obtains, from a first device, an identifier of a higher-order service for which occurrence of an abnormality or a possibility of being affected by an abnormality has been detected, where the first device searches for a range of effects of failure within a higher-order service layer that provides a higher-order service using a service provided in an object-service layer within a cloud service providing a layered structure of services. The apparatus determines a service within the object-service layer, which is reachable by tracing relations among services from the detected higher-order service, to be an in-effect-range service for which there is a possibility of being affected by an abnormality, and
(Continued)

transmits the identifier of the in-effect-range service to a second device that searches for a range of effects of failure at a lower-order service layer that provides a lower-order service used to provide a service within the object-service layer.

9 Claims, 62 Drawing Sheets

(52) U.S. Cl.
    CPC ............ *H04L 41/145* (2013.01); *H04L 41/22* (2013.01); *H04L 41/5009* (2013.01); *H04L 43/0876* (2013.01); *H04L 43/10* (2013.01); *H04L 67/16* (2013.01)

(58) Field of Classification Search
    CPC ......... H04L 67/12; H04L 67/16; H04L 43/10; H04L 43/0811; H04L 43/0817; H04L 43/0876; H04L 41/145; H04L 41/50; H04L 43/08; H04L 61/30; H04L 45/02; H04L 12/24; H04L 12/26; H04L 29/08; H04W 4/00
    USPC .................................. 709/224; 714/2, 15, 31
    See application file for complete search history.

(56) References Cited

U.S. PATENT DOCUMENTS

| | | | | |
|---|---|---|---|---|
| 9,378,044 | B1* | 6/2016 | Gaurav | G06F 9/5077 |
| 10,999,127 | B1* | 5/2021 | Zuber | H04L 41/0668 |
| 2009/0183031 | A1* | 7/2009 | Bethke | G06F 11/3604 |
| | | | | 714/38.1 |
| 2012/0117226 | A1* | 5/2012 | Tanaka | H04L 41/0266 |
| | | | | 709/224 |
| 2013/0030875 | A1* | 1/2013 | Lee | G06Q 30/0267 |
| | | | | 705/7.38 |
| 2013/0283088 | A1* | 10/2013 | Behrendt | G06F 11/0748 |
| | | | | 714/2 |
| 2013/0297972 | A1* | 11/2013 | Yokote | G06F 11/008 |
| | | | | 714/15 |
| 2014/0289560 | A1* | 9/2014 | Nishi | G06F 11/22 |
| | | | | 714/31 |
| 2015/0317217 | A1* | 11/2015 | Kurabayashi | H04L 67/10 |
| | | | | 714/4.11 |
| 2016/0006576 | A1* | 1/2016 | Matsuzaki | G06F 13/00 |
| | | | | 709/224 |
| 2016/0080422 | A1* | 3/2016 | Belgodere | G06N 5/046 |
| | | | | 706/47 |
| 2016/0350173 | A1* | 12/2016 | Ahad | G06F 11/0751 |
| 2016/0352562 | A1* | 12/2016 | Astigarraga | H04L 47/822 |
| 2016/0358251 | A1* | 12/2016 | Downer | H04L 43/0811 |
| 2017/0099178 | A1* | 4/2017 | Satoh | H04L 43/0805 |
| 2017/0160704 | A1* | 6/2017 | Eiraku | G06F 16/13 |
| 2018/0032388 | A1* | 2/2018 | Saito | G06F 11/079 |
| 2018/0032399 | A1* | 2/2018 | Johnson | G06F 11/2033 |
| 2018/0046620 | A1* | 2/2018 | Sasaki | G06F 3/0482 |
| 2018/0084053 | A1* | 3/2018 | Kuchibhotla | H04L 67/1097 |
| 2018/0101168 | A1* | 4/2018 | Lv | G05B 23/0262 |
| 2018/0196689 | A1* | 7/2018 | Suda | G06F 11/3051 |
| 2018/0255137 | A1* | 9/2018 | Hu | H04L 67/1097 |
| 2018/0276038 | A1* | 9/2018 | Malik | G06F 9/4856 |
| 2018/0351838 | A1* | 12/2018 | Lui | H04L 41/064 |
| 2019/0007410 | A1* | 1/2019 | Hu | H04L 47/70 |
| 2019/0082058 | A1* | 3/2019 | Aoki | H04N 1/32406 |
| 2019/0121965 | A1* | 4/2019 | Chai | G06F 21/554 |
| 2020/0220773 | A1* | 7/2020 | Terashima | H04L 69/321 |

OTHER PUBLICATIONS

Jhawar R, Piuri V, Santambrogio M. Fault tolerance management in cloud computing: A system-level perspective. IEEE Systems Journal. Nov. 29, 2012;7(2):288-97. (Year: 2012).*

Villegas D, Bobroff N, Rodero I, Delgado J, Liu Y, Devarakonda A, Fong L, Sadjadi SM, Parashar M. Cloud federation in a layered service model. Journal of Computer and System Sciences. Sep. 1, 2012;78(5):1330-44. (Year: 2012) (Year: 2012).*

Hawar R, Piuri V, Santambrogio M. Fault tolerance management in cloud computing: A system-level perspective. IEEE Systems Journal. Nov. 29, 2012;7(2):288-97. (Year: 2012) (Year: 2012).*

Zhai E, Chen R, Wolinsky DI, Ford B. Heading off correlated failures through independence-as-a-service. In11th {USENIX} Symposium on Operating Systems Design and Implementation ({OSDI} 14) 2014 (pp. 317-334). (Year: 2014).*

* cited by examiner

FIG. 39
FAILURE EFFECT RANGE DISPLAY SCREEN
RESULTS REFLECTING EFFECTS FROM HIGHER-ORDER STACK
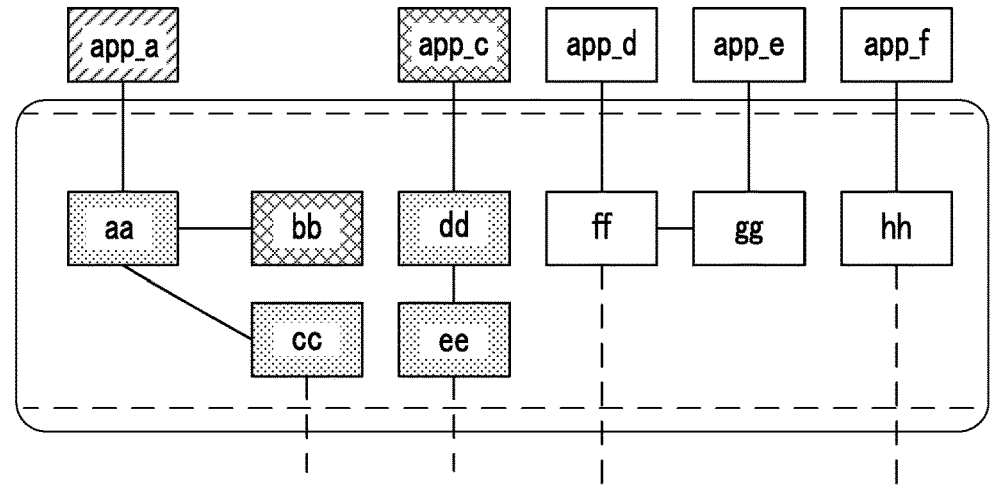
RESULTS REFLECTING EFFECTS FROM HIGHER-ORDER STACK AND LOWER-ORDER STACK
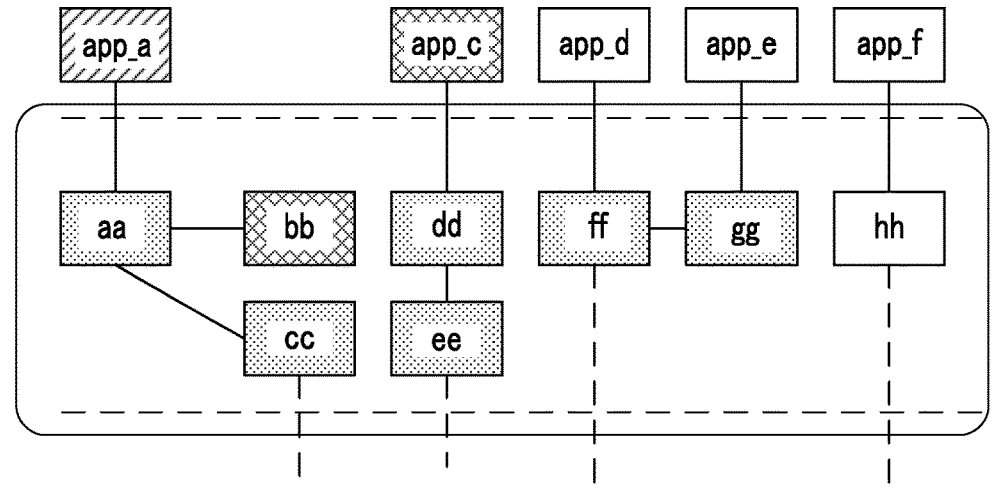
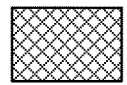 FAILURE-DETECTED EQUIPMENT
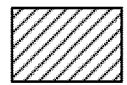 FAILURE-AFFECTED EQUIPMENT OF OTHER STACK
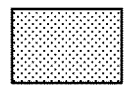 FAILURE-AFFECTED EQUIPMENT OF OWN STACK

APPARATUS AND METHOD TO IMPROVE PRECISION OF IDENTIFYING A RANGE OF EFFECTS OF A FAILURE IN A SYSTEM PROVIDING A MULTILAYER STRUCTURE OF SERVICES

CROSS-REFERENCE TO RELATED APPLICATION

This application is based upon and claims the benefit of priority of the prior Japanese Patent Application No. 2017-254294, filed on Dec. 28, 2017, the entire contents of which are incorporated herein by reference.

FIELD

The embodiments discussed herein are related to apparatus and method to improve precision of identifying a range of effects of a failure in a system providing a multilayer structure of services.

BACKGROUND

In a case where a failure occurs in a part of equipment in a computer network system, equipment dependent on that equipment is also affected by the failure. Equipment affected by a failure may exhibit operating speed slower than normal, inability to execute application programs, and so forth, for example. The effects of such a failure, which are also referred to as failure impact, occur as a chain reaction through the network. In a large-scale system, for example, many such equipment are in a dependency relation. Accordingly, the effects of a failure is not restricted to the equipment where the trouble is occurring and equipment directly connected to that equipment, but to various types of equipment in the periphery thereof.

In a case where a failure occurs at certain equipment and other equipment is affected by that failure, there may be cases where a user notices the effects of the failure, but there may be cases where the user does not notice even though affected by the failure, depending on the equipment. In a case where the user does not notice being affected by the failure, the system administrator is not notified by the user that there is equipment affected by the failure, and the administrator does not take measures. There also is equipment that currently is not affected due to no load thereupon (no application program or the like being executed) at the time of the failure occurring, but likely will be affected under load.

Equipment regarding which the user has not noticed the effects of the failure, or currently is not affected due to no load, may be the cause of trouble hereafter. Accordingly, it is important for the system administrator to recognize such a group of equipment that may be affected (range of effects, or range of influences), in order to operate the system in a stable manner.

Examples of technology for identifying the state of the range of effects of a failure include technology for visualizing range of effects of failures and so forth in an object system taking into consideration a cloud environment, failure tolerability, and so forth. There also is an administration management device that enables display with range of effects regarding individual failures and cause portions regarding individual service failures sectioned off. Further, there also is technology where the relation of calculator resources that a virtual server uses is comprehensively expressed by a tree structure, and statistical information of virtual resources that share physical resources are automatically compiled.

The above related art is described in, for example, Japanese Laid-open Patent Publication Nos. 2012-38028, 2015-22396, and 2012-99048.

SUMMARY

According to an aspect of the embodiments, an apparatus obtains, from a higher-order effect range identifying device configured to search for a range of effects of failure within a higher-order service layer that provides a higher-order service using a service provided in an object service layer within a cloud service where services being provided have a layered structure, an identifier of a detected higher-order service regarding which occurrence of an abnormality or a possibility of being affected by an abnormality has been detected. The apparatus determines, based on search route information indicating a search route to search for a service within a range of effects of failure from a start point service, a service within the object service layer that is reachable by tracing relations among services from the detected higher-order service by following a search route in a case where the detected higher-order service is the start point service, to be a first in-effect-range service regarding which there is a possibility of being affected by an abnormality, and transmits the identifier of the first in-effect-range service to a lower-order effect range identifying device configured to search for a range of effects of failure at a lower-order service layer, which is a source of providing a lower-order service that is used to provide a service within the object service layer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 39 is a diagram illustrating an example of a failure effect range display screen;

DESCRIPTION OF EMBODIMENTS

A service (cloud service) using a cloud computing system has a layered structure where services are in multiple layers. For example, Platform as a Service (Paas) is provided by Infrastructure as a Service (IaaS) having been provided, and Software as a Service (SaaS) is provided by PaaS having been provided. In this case, each of IaaS, PaaS, and SaaS is a service layer. In such a cloud service, individual services provided at each layer are the object of judgement regarding whether or not it is within the range of effects of a failure.

In a case where services are in a multilayer structure, effects of a failure occurring at a service in a certain layer may propagate from the certain layer to another layer. For example, a failure occurring in a service at a certain layer may cause communication speed of a service in another layer to drop. Accordingly, it is insufficient to search within services in a single layer to search for the range of effects of a failure.

However, searching of the range of effects of a failure in the related art has been performed on each layer separately, and searching of the range of effects of a failure is not performed across service layers. Accordingly, the range of effects of a failure is not accurately comprehended.

It is desirable to improve precision of identifying the range of effects of failures.

Hereinafter, embodiments will be described with reference to the drawings. It is understood that multiple embodiments may be combined and carried out insofar as no conflict exists.

First Embodiment

Figure 1:
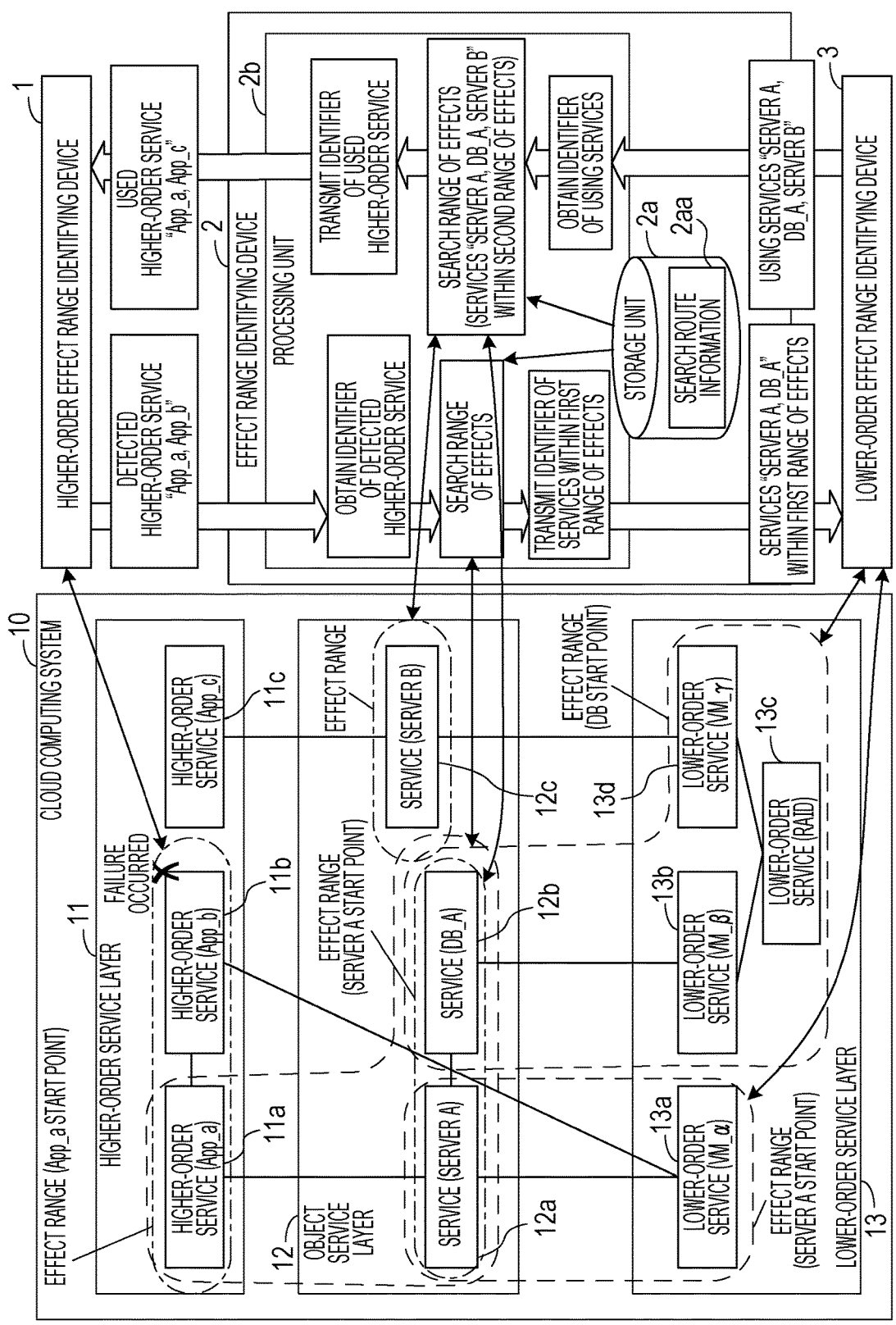
FIG. 1 is a diagram illustrating an example of a system according to a first embodiment.

FIG. 1 is a diagram illustrating an example of a system according to a first embodiment. A cloud service provided using a cloud computing system 10 has a layered structure. The structure has three layers in the example illustrated in FIG. 1. Each service layer will be assumed to be managed by a separate administrator. Description will primarily be made in the following regarding effect range identifying processing at the time of a failure occurring, for the administrator of the service layer that is the second layer from the top. Accordingly, with the service layer at the second layer from the top as a reference, the highest-order service layer will be referred to as higher-order service layer 11, the service layer that is the second layer from the top will be referred as object service layer 12, and the lowest-order service layer will be referred to as lower-order service layer 13.

The higher-order service layer 11 is a service layer that provides SaaS, for example, the higher-order service layer 11 provides multiple higher-order services 11a, 11b, and 11c. The higher-order services 11a and 11c are services provided using services 12a and 12c within the object service layer 12. The higher-order service 11b is a service provided using lower-order service 13a within the lower-order service layer 13. The higher-order services 11a, 11b, and 11c are services provided users with an application software usage environment, for example. The identifier of the higher-order service 11a is "App_a", the identifier of the higher-order service 11b is "App_b", and the identifier of the higher-order service 11c is "App_c".

The object service layer 12 is a service layer providing PaaS, for example. Multiple services 12a, 12b, and 12c are provided at the object service layer 12. The services 12a, 12b, and 12c are services provided using lower-order services 13a, 13b, and 13d in the lower-order service layer 13.

The services 12a, 12b, and 12c are services that provide users with a usage environment of software such as an application server, database, or the like, for example. The identifier of the service 12a is "server A", the identifier of the service 12b is "DB_A", and the identifier of the service 12c is "server B".

The lower-order service layer 13 is a service layer that provides IaaS, for example. Multiple lower-order services 13a, 13b, 13c, and 13d are provided at the lower-order service layer 13. The lower-order services 13a, 13b, 13c, and 13d are services providing user with a usage environment of storage including virtual machines (VM) and Redundant Arrays of Inexpensive Disks (RAID) and so forth. The identifier of the lower-order service 13a is "VM_$\alpha$", the identifier of the lower-order service 13b is "VM_$\beta$", the identifier of the lower-order service 13c is "RAID", and the identifier of the lower-order service 13d is "VM_$\gamma$". The lower-order service 13c is provided via the lower-order service 13b or lower-order service 13d.

In a case where a failure occurs on the cloud computing system 10, services that are in the range of effects of the failure are identified by an effect range identifying device corresponding to each service layer. Services within the range of effects of failure within the higher-order service layer 11 are identified by higher-order effect range identifying device 1. Services within the range of effects of failure within the object service layer 12 are identified by an effect range identifying device 2. Services within the range of effects of failure within the lower-order service layer 13 are identified by a lower-order effect range identifying device 3.

The higher-order effect range identifying device 1, effect range identifying device 2, and lower-order effect range identifying device 3 are realized by computers having a processor and memory, for example. The effect range identifying device 2 has a storage unit 2a and a processing unit 2b, for example. The storage unit 2a is, for example, memory or a storage device that the effect range identifying device 2 has. The processing unit 2b is a processor or computing circuit that the effect range identifying device 2 has, for example.

The storage unit 2a of the effect range identifying device 2 stores search route information 2aa indicating a search route for searching for services within the range of effects of a failure from a start point. The search route information 2aa indicates search routes in accordance with the type of start point service and the contents of the failure.

The processing unit 2b of the effect range identifying device 2 references the search route information 2aa in a case where a failure has occurred within the cloud computing system 10, and identifies services within the range of effects of the failure within the object service layer 12.

In a case where a failure has been detected in a service layer other than the object service layer 12, the effect range identifying device 2 recognizes the occurrence of the failure by information obtained from the higher-order effect range identifying device 1 or the lower-order effect range identifying device 3. For example, in a case where a failure is detected at the higher-order service 11b within the higher-order service layer 11, higher-order services within the range of effects of the failure (detected higher-order services) are identified by the higher-order effect range identifying device 1. The higher-order effect range identifying device 1 transmits identifiers of the detected higher-order services that have been detected, to the effect range identifying device 2. The effect range identifying device 2 recognizes occurrence of the failure within the cloud computing system 10 by receiving the identifiers of the detected higher-order services. The processing unit 2b then searches the range of effects of the failure.

For example, the processing unit 2b receives identifiers of the detected higher-order services, regarding which occurrence of an abnormality or the possibility of being affected by the abnormality has been detected, from the higher-order effect range identifying device 1. The processing unit 2b then searches the range of effects based on the search route information 2aa. That is to say, the processing unit 2b searches services within the object service layer that may be reached by tracing relations among services from the detected higher-order services, following a search route in a case where a detected higher-order service is a start point. The processing unit 2b judges services which were successfully reached by the search as being first in-effect-range services, where there is a possibility of being affected by the abnormality. The processing unit 2b then transmits the identifiers of the first in-effect-range services to the lower-order effect range identifying device 3.

The lower-order effect range identifying device 3 identifies, out of the lower-order services 13a through 13d within the lower-order service layer 13, the lower-order services within the range of effects of the failure, based on the identifiers of the first in-effect-range services. The lower-order effect range identifying device 3 transmits the identifiers of services within the object service layer 12 using lower-order services determined to be within the range of effects in the range of effects of failure search (using services) to the effect range identifying device 2.

The processing unit 2b of the effect range identifying device 2 obtains the identifiers of using services sent from the lower-order effect range identifying device 3. Next, the processing unit 2b searches for services within the range of effects of the failure, based on the search route information 2aa. The processing unit 2b judges services within the effect object service layer that may be reached by tracing relations among services from using services, following a search route in a case where a using service is a start point service, as being second in-effect-range service regarding which there is a possibility of being affected by the failure. The processing unit 2b then transmits identifiers of higher-order services using the second in-effect-range services, out of the higher-order services 11a through 11c within the higher-order service layer 11, to the higher-order effect range identifying device 1.

The higher-order effect range identifying device 1 recognizes that there is a possibility of these higher-order services being affected by the failure, based on the identifiers of the used higher-order services.

According to this flow, services within the range of effects of the failure may be identified while taking into consideration propagation of effects of the failure over multiple service layers, by the higher-order effect range identifying device 1, effect range identifying device 2, and lower-order effect range identifying device 3 performing cooperative processing. This improves the precision of identifying services within the range of effects of the failure.

For example, assumption will be made that a failure is detected at the higher-order service 11b. In this case, the higher-order effect range identifying device 1 searches for higher-order services within the range of effects of the failure, with the higher-order service 11b as the start point service. In the example in FIG. 1, the higher-order service 11a is detected as being within the range of effects of the failure. In response to this, the higher-order effect range identifying device 1 transmits the identifiers "App_a, App_b" of the detected higher-order services to the effect range identifying device 2.

The processing unit 2b of the effect range identifying device 2 obtains the identifiers "App_a, App_b" of the detected higher-order services. The processing unit 2b then searches the range of effects with each of the detected higher-order services as a start point. In the example in FIG. 1, the services 12a and 12b are identified as being services within the range of effects (services within first range of effects). Next, the processing unit 2b transmits the identifiers "server A, DB_A) of the first in-effect-range services to the lower-order effect range identifying device 3.

The lower-order effect range identifying device 3 searches for services within the range of effects of the lower-order service layer 13, with each of the first in-effect-range services as a start point. In the example in FIG. 1, the lower-order services 13a through 13d are identified as being within the range of effects. The lower-order effect range identifying device 3 then transmits the identifiers "server A, DB_A, server B" of the services within the object service layer 12 using the lower-order services 13a through 13d that have been identified (using services) to the effect range identifying device 2.

Upon receiving the identifiers "server A, DB_A, server B" of the using services, the processing unit 2b of the effect range identifying device 2 searches for the range of effects of failure with each using service as a start point. In the example in FIG. 1, services 12a through 12c are judged to be services within the range of effects of the failure (services within second range of effects). The processing unit 2b transmits the identifiers "App_a, App_c" of higher-order services within the higher-order service layer 11 using the second in-effect-range services (using higher-order services) to the higher-order effect range identifying device 1.

Thus, the administrator of the object service layer 12 may accurately comprehend the effects of the failure detected at the higher-order service layer 11 on the object service layer 12, by confirming the search results of the range of effects by the effect range identifying device 2, for example.

Note that the effect range identifying device 2 may display the search results of the range of effects of failure on a terminal device that the administrator uses. For example, the processing unit 2b of the effect range identifying device 2 outputs display data indicating services identified to be within the range of effects of failure in the object service layer 12 (services within the first or second range of effects) to the terminal device used by the administrator. Thus, the administrator may readily confirm the results of search of the range of effects.

Note that in a case where there are multiple detected higher-order services, the processing unit 2b of the effect range identifying device 2 judges first in-effect-range services with each of the multiple detected higher-order services as a start point service. The processing unit 2b then decides a value corresponding the number of times that judgement has been made that a first in-effect-range service may be reached by tracing relations among services from a detected higher-order service, as being a severity of the failure for that first in-effect-range service. In a case of having decided a severity, the processing unit 2b displays severity display data on the terminal device used by the administrator, to display the severity of each of the first and second in-effect-range services within the object service layer 12. Thus, the difference among probabilities of being affected may be compared among the multiple services that will be affected by the failure, and the administrator may handle the failure with priority regarding services that have a higher probability of being affected. As a result, the effects of the failure may be efficiently suppressed from spreading.

Further, the processing unit 2b of the effect range identifying device 2 may calculate the seriousness of a case of the first and second in-effect-range services being affected by the failure, based on the usage forms of the first and second in-effect-range services. In this case, the processing unit 2b outputs seriousness display data for displaying the seriousness of the first and second in-effect-range services within the object service layer 12 to the terminal device that the administrator uses. Accordingly, the difference among the seriousness of being affected may be compared among the multiple services in a case of being affected by the failure, and the administrator may take measures to deal with the failure with priority regarding services that have a higher probability of being affected. As a result, reduced service quality due to effects of the failure seriously affecting business operations of users of the service may be suppressed.

Note that when calculating the seriousness, the processing unit 2b may reflect the usage form of higher-order services within the higher-order service layer 11 that use the first and second in-effect-range services, in the seriousness for example. For example, the processing unit 2b adds a value calculated based on the usage form of the first and second in-effect-range services, and a value calculated based on the usage form of higher-order services within the higher-order service layer that use the first in-effect-range services. The processing unit 2b then sets a value, obtained by adding the values obtained for each of the first and second in-effect-range services, as the seriousness of each of the first and second in-effect-range services. Thus, seriousness may be calculated taking into consideration the usage stage of services in service layers managed by other administrators, and seriousness with higher reliability may be calculated.

Second Embodiment

Next, a second embodiment will be described. The second embodiment involves searching for the range of effects of failure in a cloud service where IaaS, PaaS, and SaaS are provided in a layered structure.

Figure 2:
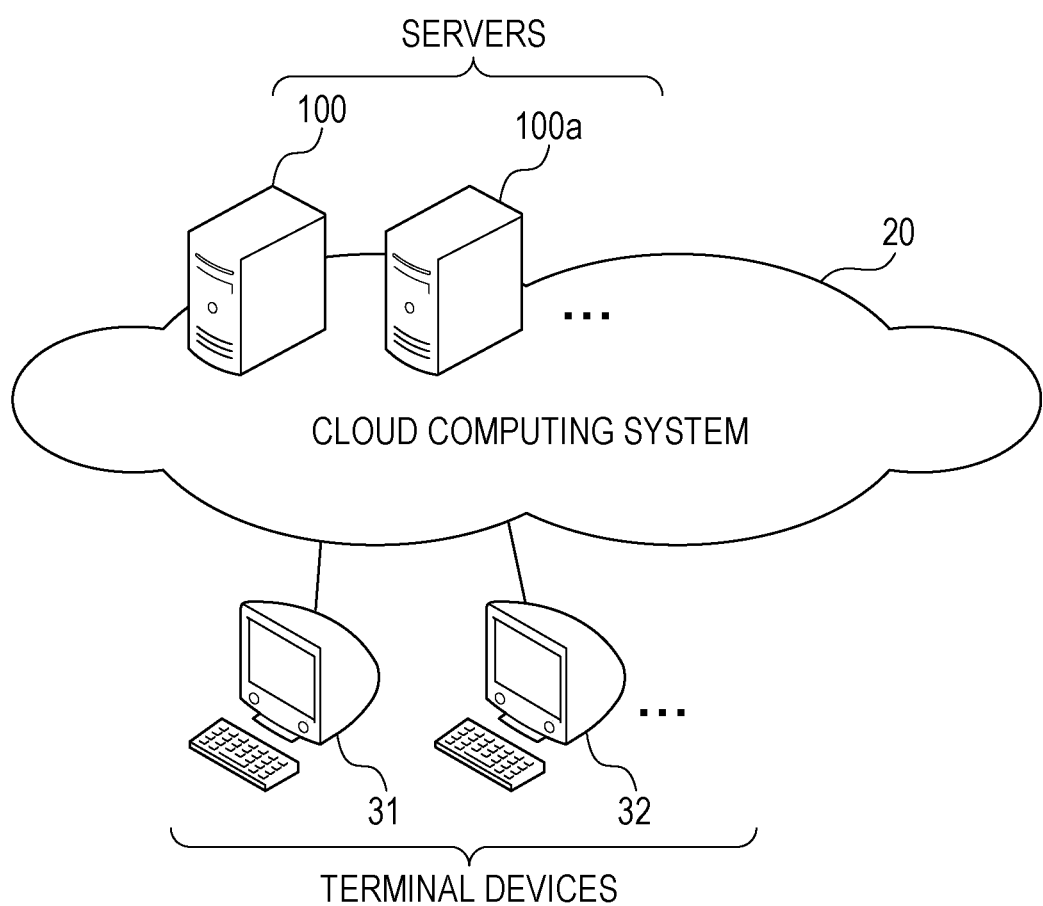
FIG. 2 is a diagram illustrating a system configuration example of a second embodiment.

FIG. 2 is a diagram illustrating a system configuration example according to the second embodiment. Multiple servers 100, 100a, and so forth, are provided in a cloud computing system 20. The multiple servers 100, 100a, and so forth, provide various cloud services. Multiple terminal devices 31, 32, and so forth, are connected to the cloud computing system 20 via a network. Users use the terminal devices 31, 32, and so forth, to access the cloud computing system 20 and receive providing of cloud services.

Figure 3:
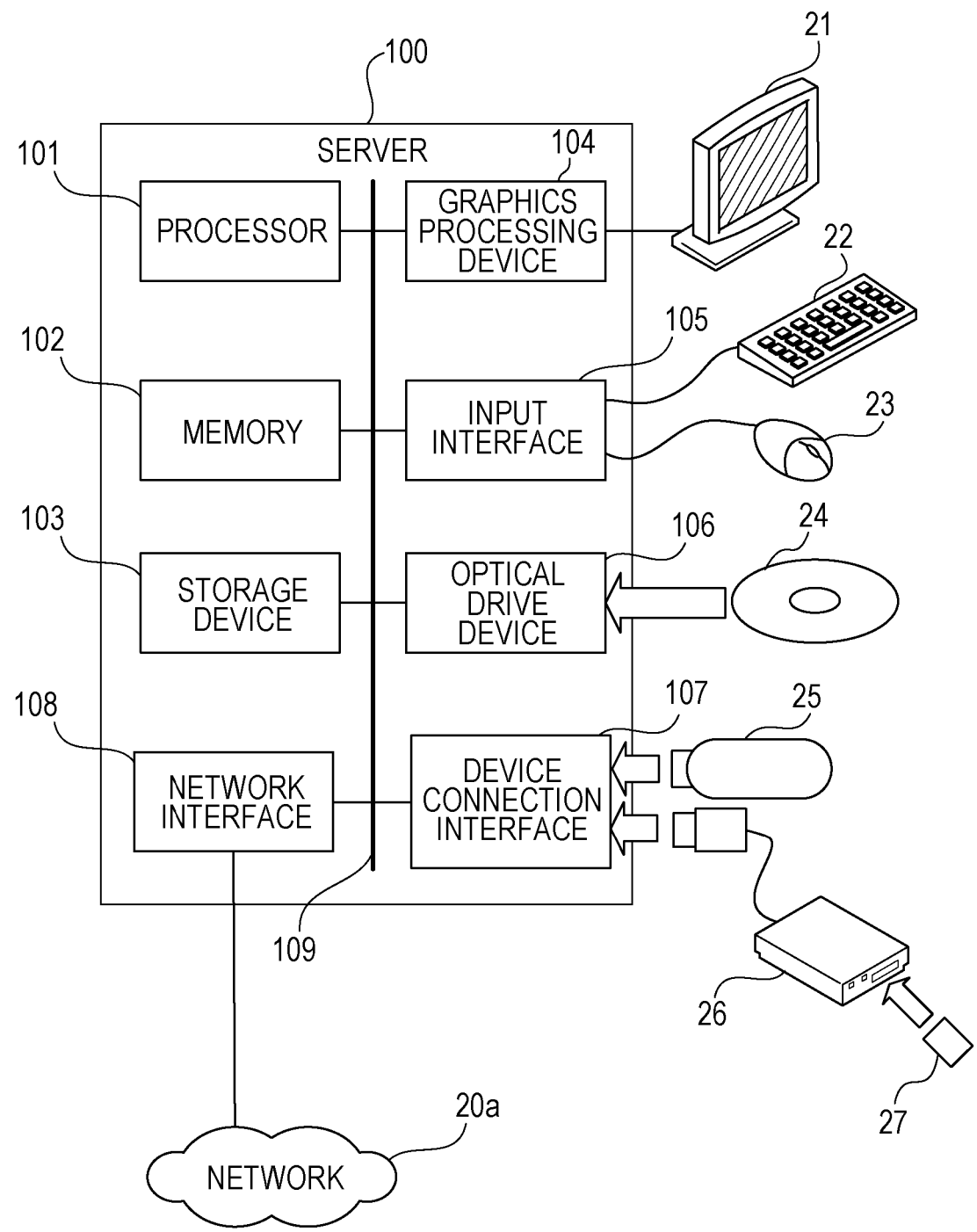
FIG. 3 is a diagram illustrating a configuration example of hardware of a server.

FIG. 3 is a diagram illustrating a configuration of server hardware. The entire server 100 is controlled by a processor 101. Memory 102 and multiple peripheral devices are connected to the processor 101 via a bus 109. The processor 101 may be a multiprocessor. Examples of the processor 101 include a central processing unit (CPU), micro processing unit (MPU) and digital signal processor (DSP). At least part of functions realized by the processor 101 executing a program may be realized by an electronic circuit such as an application specific integrated circuit (ASIC), programmable logic device (PLD), or the like.

The memory 102 is used as a main storage device for the server 100. The memory 102 temporarily stores at least part of an operating system (OS) program and application programs to be executed by the processor 101. The memory 102 also stores various types of data to be used for processing by the processor 101. A volatile semiconductor device such as random access memory (RAM), for example, is used for the memory 102.

Peripheral devices connected to the bus 109 include a storage device 103, graphics processing device 104, input interface 105, optical drive device 106, device connection interface 107, and network interface 108.

The storage device 103 electrically or magnetically writes and reads data to and from a built-in storage medium. The storage device 103 is used as an auxiliary storage device of the computer. The storage device 103 stores OS programs, application programs, and various types of data. Examples of the storage device 103 include a hard disk drive HDD and a solid state drive (SSD).

A monitor 21 is connected to the graphics processing device 104. The graphics processing device 104 displays images on a screen of the monitor 21 in accordance with commands from the processor 101. Examples of the monitor 21 include organic electroluminescence display devices, liquid crystal display devices, and so forth.

A keyboard 22 and mouse 23 are connected to the input interface 105. The input interface 105 transmits signals sent from the keyboard 22 and mouse 23 to the processor 101. Note that the mouse 23 is an example of a pointing device, and that other pointing devices may also be used. Examples of other point devices include a touch panel, tablet, touchpad, trackball, and so forth.

The optical drive device 106 reads data recorded in an optical disc 24, using laser beams or the like. An optical disc 24 is a portable recording medium in which data has been recorded so as to be able to be read using reflection of light. Examples of an optical disc 24 include digital versatile disc (DVD), DVD-RAM, compact disc read only memory (CD-ROM), CD-recordable (CD-R)/rewritable (RW), and so forth.

The device connection interface 107 is a communication information for connecting peripheral devices to the server 100. For example, a memory device 25 and memory reader/writer 26 may be connected to the device connection interface 107. The memory device 25 is a recording medium having functions of communication with the device connection interface 107. The memory reader/writer 26 is a device that writes data to a memory card 27, and also reads data from the memory card 27. The memory card 27 is a card-type recording medium.

The network interface 108 is connected to a network 20a within the cloud computing system 20. The network interface 108 exchanges data with other computers and communication equipment via the network 20a.

The processing functions of the second embodiment may be realized by the above hardware configuration. Note that the effect range identifying devices 1 through 3 described in the first embodiment may also be realized by hardware the same as the server 100 illustrated in FIG. 3.

The server 100 realizes the processing functions of the second embodiment by executing programs recorded in a computer-readable recording medium, for example. Programs describing the processing contents to be executed by the server 100 may be stored in various types of recording media. For example, programs to be executed by the server 100 may be stored in the storage device 103. The processor 101 loads at least part of programs in the storage device 103 to the memory 102, and executes the programs. Also, programs to be executed by the server 100 may be recorded in portable recording media, such as the optical disc 24, memory device 25, memory card 27, or the like. Programs stored in portable recording media are executable after having been installed to the storage device 103 under control of the processor 101, for example. Alternatively, the processor 101 may also read out programs directly from portable recording media, and execute.

Next, a layered structure of a cloud service will be described.

Figure 4:
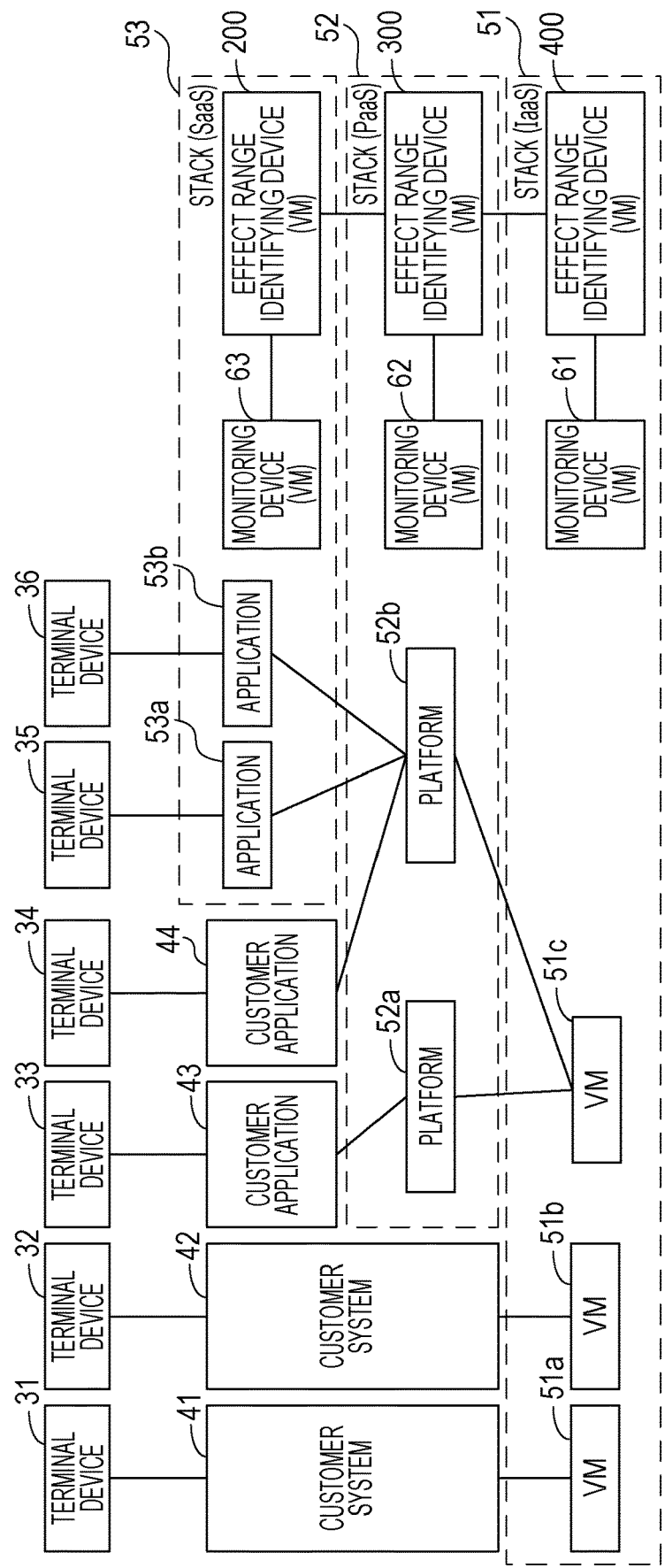
FIG. 4 is a diagram illustrating an example of a cloud service.

FIG. 4 is a diagram illustrating an example of a cloud service. The cloud service has a layered structure of IaaS providing infrastructure, PaaS providing platforms, and SaaS providing applications, for example. The layers of the cloud service will be referred to as stacks 51 through 53 below.

In the stack 51 that is IaaS, a usage environment of virtual machines (VMs) 51a, 51b, and 51c is provided. A user that uses a terminal device 31 in the example in FIG. 4 has configured a customer system 41 on the VM 51a, and is operating the customer system 41. In the same way, a user that uses a terminal device 32 has configured a customer system 42 on the VM 51b, and is operating the customer system 42. The customer systems 41 and 42 include a platform on which application software (hereinafter referred to simply as "application") is run, and applications on the platform. The platform includes OS, various types of middleware, databases, and so forth.

A user using the VM 51c provides services at the PaaS stack 52 using the VM 51c. The stack 52 includes platforms 52a and 52b. A user using a terminal device 33 introduces a customer application 43 on the platform 52a, and uses the customer application 43 using the terminal device 33. A user using a terminal device 34 introduces a customer application 44 on the platform 52b, and uses the customer application 44 using the terminal device 34.

In the example in FIG. 4, service at the stack 53 that is SaaS is provided using the platform 52b. A usage environment of applications 53a and 53b as a service is provided at the stack 53. A user using a terminal device 35 uses an application 53a provided at the stack 53. A user using a terminal device 36 uses an application 53b provided at the stack 53, by using the terminal device 36.

Thus, when multiple stacks are in layers, there are cases where each stack is provided and managed by separate corporations. Also, even if stacks in different layers are provided by the same corporation, the stacks may each be provided and managed by separate divisions in the corporation. For example, monitoring devices 61 through 63 that are realized by VMs are provided in the respective stacks. The monitoring devices 61 through 63 monitor operations of services within the stack they belong to, and if there is an abnormality in operations, detects that abnormality.

The monitoring devices 61 through 63 perform monitoring for each provided service. Functions of provided services that are the object of monitoring may be handled on the system in the same way as equipment having the functions. Accordingly, increments of services that are the object of monitoring will be referred to as "equipment" in the following description. For example, the VMs 51a, 51b, 51c, the platforms 52a and 52b, and the applications 53a and 53b each are equipment that is the object of monitoring.

Further, effect range identifying devices 200, 300 and 400 realized by VMs, for example, are provided at the respective stacks. The effect range identifying devices 200, 300 and 400 obtain information of equipment where a failure has occurred, from the monitoring devices 61 through 63 of the respective stacks to which they belong to. Effects that a failure that has occurred are searched over multiple different stacks by the multiple effect range identifying devices 200, 300 and 400 operating in cooperation.

Now, before describing details of the effect range searching processing performed by the effect range identifying devices 200, 300 and 400, problems that occur when the effect range identifying devices 200, 300 and 400 are not in cooperation will be described.

In a cloud environment where multiple stacks such as IaaS, PaaS, and SaaS are connected in layers, as illustrated in FIG. 4, in a case where a failure has occurred at a part of equipment of the system, the failure is propagated over the stacks. However, the providers of the stacks are not able to inform each other of configuration information of the system that each one is managing, or customer information (types of business where occurrence of trouble would have great social impact, the number of customers that each has, and so forth), from the perspective of protecting personal information and keeping trade secrets. The only information that the providers of each stack may know is equipment (equipment of a higher-order stack) that uses the equipment (equipment making up the system, such as physical equipment, virtual equipment and software, network equipment, and so forth) managed by him/herself. Accordingly, the administrator of a stack is not able to comprehend the relation of connection among equipment at stacks other than the stack (higher-order stacks or lower-order stacks) managed by him/herself, or the relation of connection among stacks other than the stack managed by him/herself. As a result, the administrators of each stack are not able to view the entire system comprehensively and trace the propagation of the failure, and are not able to analyze the range of effects of a failure or estimate the cause of the failure.

Accordingly, in the second embodiment, the effect range identifying devices 200, 300 and 400 are provided to the respective stacks, and the effect range identifying devices 200, 300 and 400 are operated cooperatively, thereby enabling searching for the range of effects of failure over multiple stacks.

Figure 5:
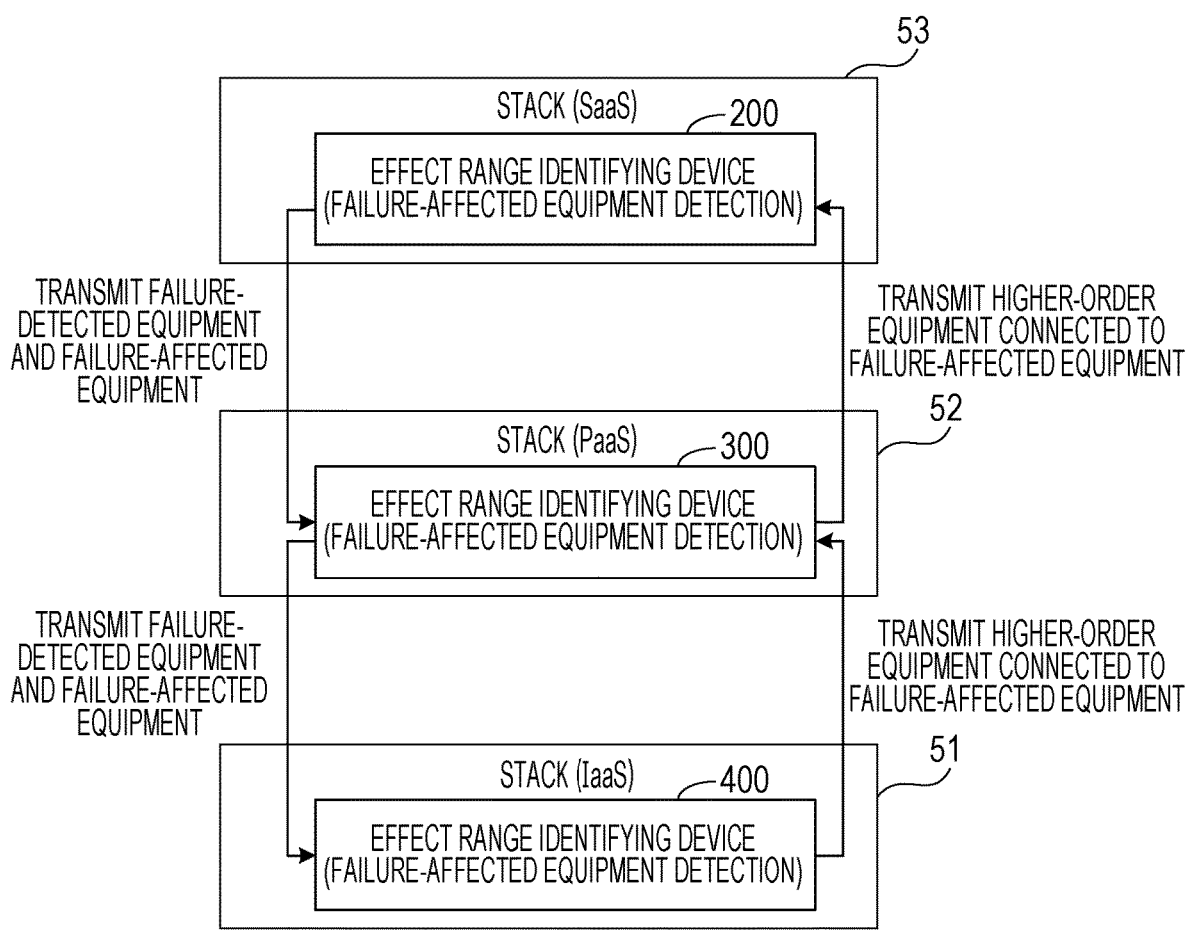
FIG. 5 is a diagram illustrating transmission paths of information among effect range identifying devices.

FIG. 5 is a diagram illustrating transmission paths of information among effect range identifying devices. The stacks 51 through 53 may know information of stacks on the higher-order side of itself. Accordingly, information of connection between a higher-order stack and a lower-order stack is managed by an effect range identifying device of the lower-order stack. For example, information of connection between equipment within the stack 53 (higher-order side) and equipment within the stack 52 (lower-order side) is managed at the effect range identifying device 300 at the lower-order stack 52.

In a case where a failure occurs, the effect range identifying devices 200, 300 and 400 exchange information, and search for the range of effects of the failure. The information that is exchanged is identifiers of equipment regarding which a failure has been detected (failure-detected equipment), and identifiers of equipment that may be affected by the failure (failure-affected equipment). For example, the effect range identifying device within a higher-order stack transmits the identifiers of equipment where failure has occurred and failure-affected equipment within the stack to which it belongs, to effect range identifying devices at lower-order stacks. The effect range identifying devices within a lower-order stack transmits identifiers of equipment within the higher-order stack to which failure-affected equipment within its own stack are connected, to the effect range identifying devices in higher-order stacks.

The effect range identifying devices 200, 300 and 400 within the stacks 51 through 53 search for the range of effects of failure within their own stacks, and transmit the search results to the effect range identifying devices of the other stacks.

For example, in a case where a failure is detected at equipment within the stack 53, the effect range identifying device 200 searches for within the range of effects of failure (failure-affected equipment) within the stack 53, and notifies the effect range identifying device 300 within the stack 52 of the identifiers of the failure-detected equipment and failure-affected equipment. The effect range identifying device 300 searches for the range of effects of failure, with the equipment within the stack 52 connected to the failure-detected equipment and failure-affected equipment regarding which notification has been made, as a start point, and identifies failure-affected equipment within the stack 52. The effect range identifying device 300 then notifies the effect range identifying device 400 of the lower-order stack 51 of the identifiers of the failure-affected equipment within the stack 52. The effect range identifying device 400 searches for the range of effects of failure, with the equipment within the stack 51 connected to the failure-affected equipment regarding which notification has been made, as a start point, and identifies failure-affected equipment within the stack 51.

The effect range identifying device 400 within the lowest-order stack 51 notifies the effect range identifying device 300 of the stack 52 of the identifiers of equipment in the higher-order stack 52 connected to the failure-affected equipment within the stack 51. The effect range identifying device 300 searches for the range of effects of failure with the equipment regarding which notification has been made as a start point, and identifies failure-affected equipment within the stack 52. The effect range identifying device 300 then notifies the effect range identifying device 200 of the higher-order stack 53 of identifiers of the equipment of the higher-order stack 53 connected to the failure-affected equipment within the stack 52.

Thus, upon information being transmitted from the effect range identifying device of a higher-order stack to the effect range identifying device of a lower-order stack, and information being transmitted to the effect range identifying device of the lowest-order stack, information is transmitted from that stack in order to higher-order stacks. Hereinafter, transmission of information from the effect range identifying device of a higher-order stack to the effect range identifying device of a lower-order stack will be referred to as downflow, and transmission of information from the effect range identifying device of a lower-order stack to the effect range identifying device of a higher-order stack will be referred to as upflow.

Next, the functions of the effect range identifying devices 200, 300, and 400 will be described.

Figure 6:
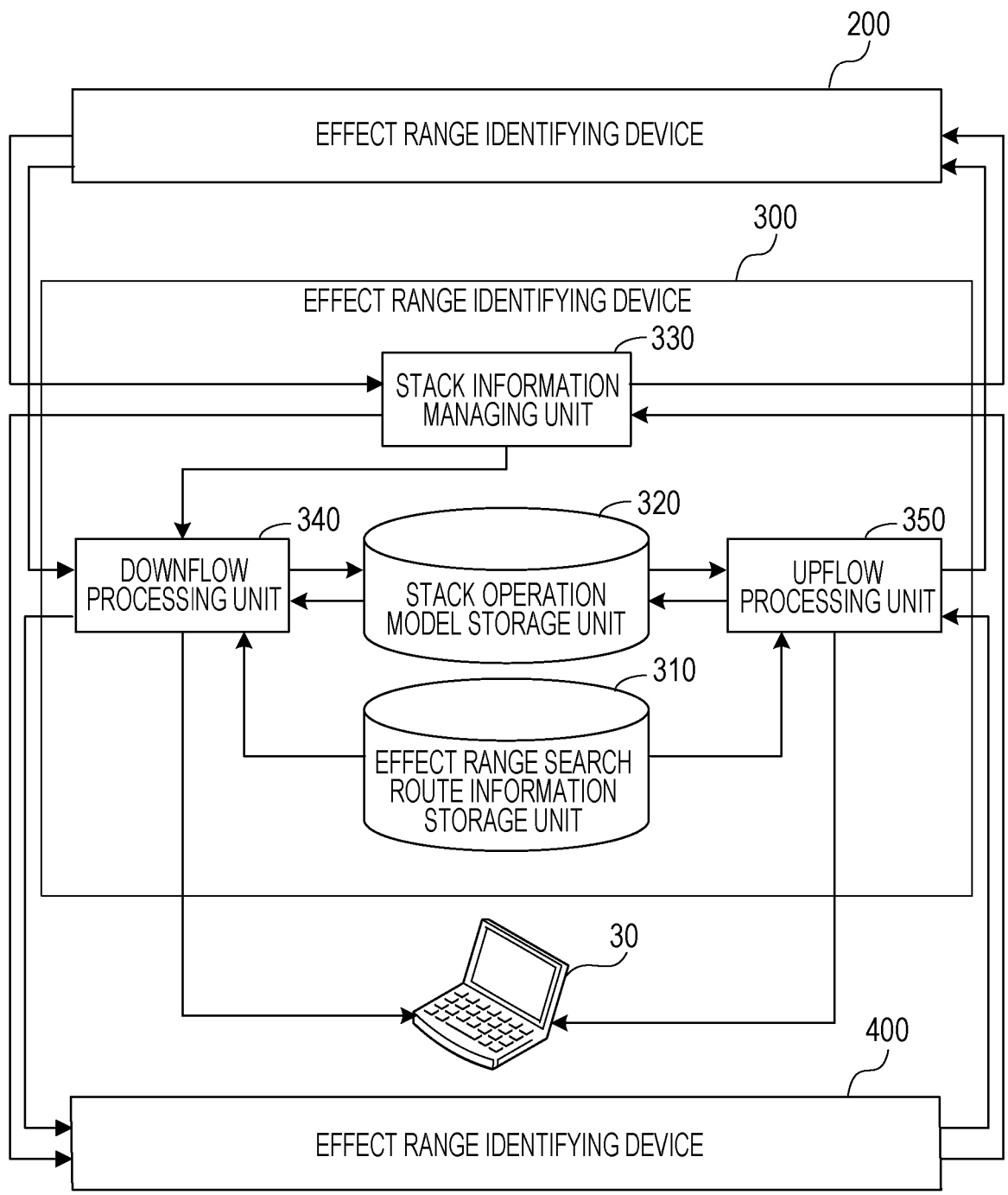
FIG. 6 is a block diagram illustrating an example of functions of an effect range identifying device.

FIG. 6 is a block diagram illustrating an example of functions of an effect range identifying device. Although FIG. 6 illustrates the functions of the effect range identifying device 300, the functions of the other effect range identifying devices 200 and 400 are also the same as those of the effect range identifying device 300.

The effect range identifying device 300 includes an effect range search route information storage unit 310, a stack operation model storage unit 320, a stack information managing unit 330, a downflow processing unit 340, and an upflow processing unit 350.

The effect range search route information storage unit 310 stores effect range search route information indicating a search route of the range of effects of failure from equipment serving as a start point.

The stack operation model storage unit 320 stores a stack operation model indicating the range of effects of failure of each piece of equipment when a failure occurs. The stack information managing unit 330 manages identification numbers of the stack 52 to which the effect range identifying device 300 belongs, and of the higher and lower stacks 51 and 53. The downflow processing unit 340 performs downflow processing that is transmission information from a higher-order stack to a lower-order stack. The upflow processing unit 350 performs upflow processing that is transmission information from a lower-order stack to a higher-order stack. The downflow processing unit 340 and upflow processing unit 350 also may display information relating to failure-affected equipment within the stack 52 on the terminal device 30 used by the administrator.

Note that the lines connecting the components illustrated in FIG. 6 only illustrate part of communication paths, and that communication paths other than the illustrated communication paths may be set. The functions of the components illustrated in FIG. 6 may be realized by causing a computer to execute program modules corresponding to the components.

Figure 7:
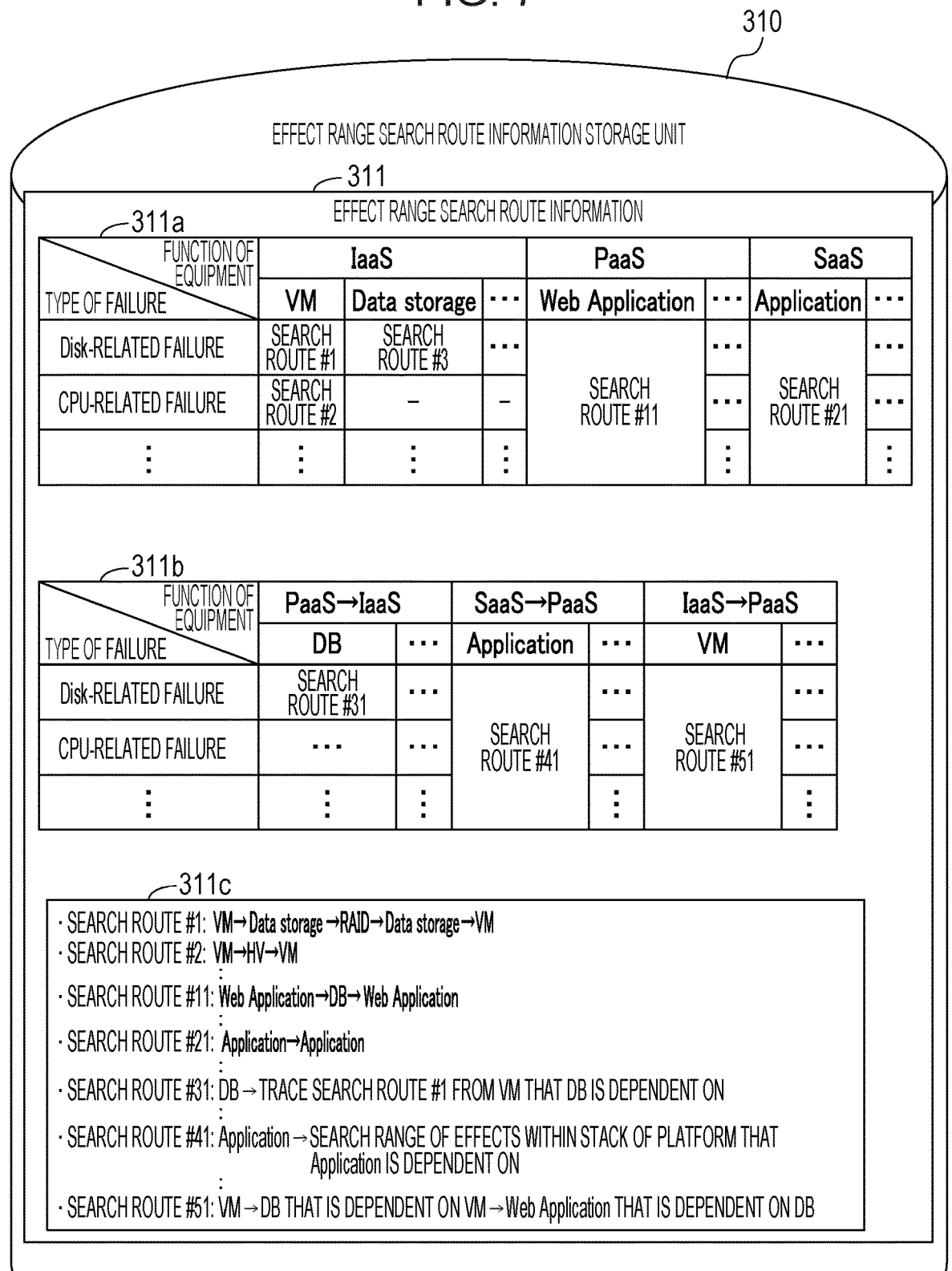
FIG. 7 is a diagram illustrating an example of an effect range search route information storage unit.

FIG. 7 is a diagram illustrating an example of an effect range search route information storage unit. The effect range search route information storage unit 310 stores effect range search route information 311. The effect range search route information 311 includes failure and search route correlation table 311a indicating search routes within the stack, failure and search route correlation table 311b indicating search routes over multiple stacks, and search route information 311c.

The failure and search route correlation table 311a has search route numbers that uniquely indicate search routes set corresponding to sets of functions of equipment within each stack and failure types. A failure type is a type of resource that may be a cause of a failure, such as a disk-related failure or a CPU-related failure, for example.

The failure and search route correlation table 311b has search route numbers that uniquely indicate search routes set corresponding to sets of functions of equipment and failure types, for each set of stack to which the equipment serving as a start point belongs, and a high-order or lower-order stack as to that stack.

The search route information 311c indicates a search route for each search route number, corresponding to that search route number. A search route is indicated by the layout of functions of equipment regarding which the range of effects is searched. For example, a search route indicated by "search route #1" is "VM→data storage→RAID data storage→VM". This search route indicates that the search starts from equipment of which the function is "VM". This also indicates that equipment that is connected to the "VM" equipment and of which the function is "data storage" is to be searched next. In a case where relevant equipment is successfully detected, equipment having corresponding functions are searched for from equipment connected to the equipment detected last, in the order indicated by the search route.

An example of search routes will be described with reference to FIG. 8.

Figure 8:
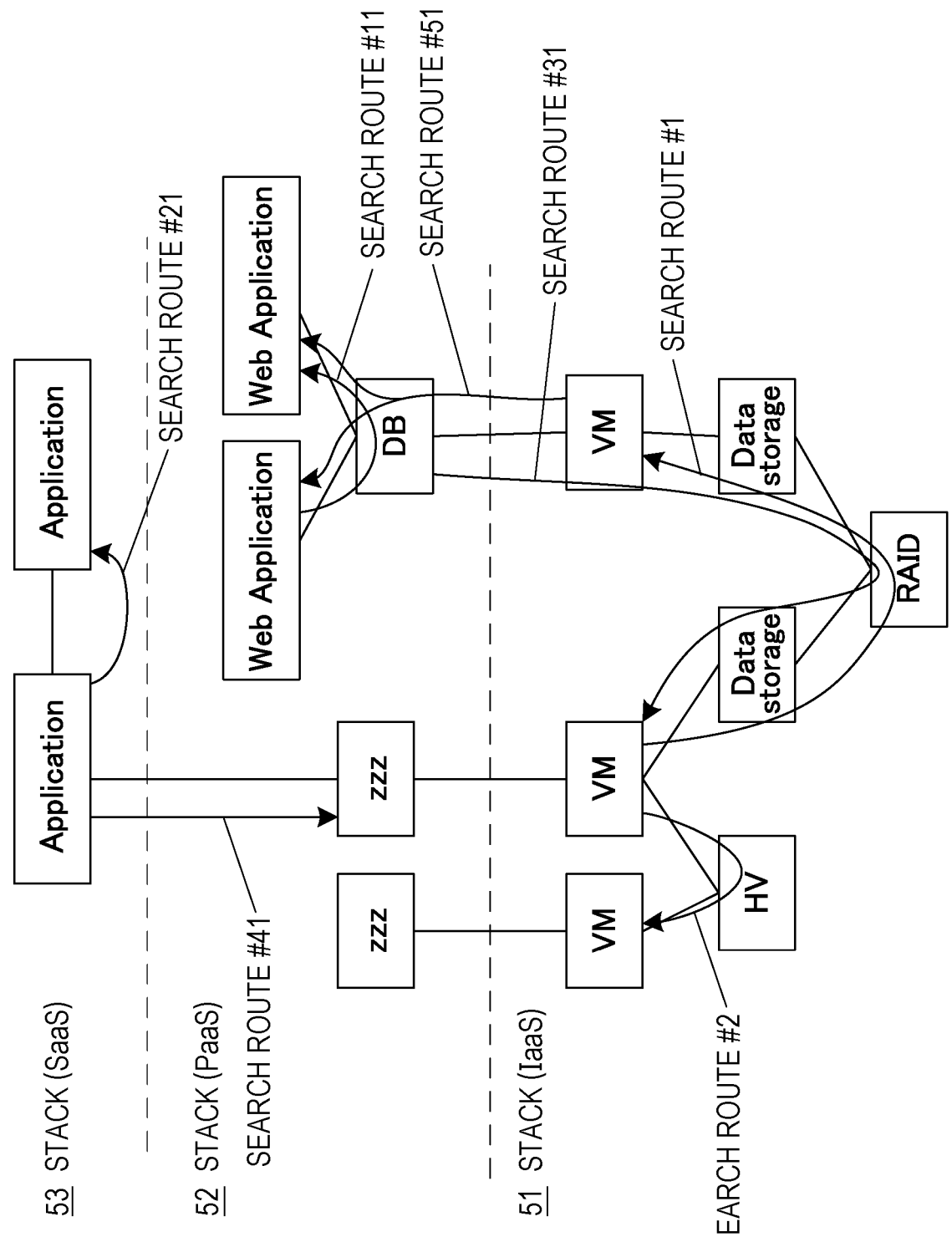
FIG. 8 is a diagram illustrating an example of a search route.

FIG. 8 is a diagram illustrating an example of search routes. FIG. 8 illustrates "search route #1", "search route #2", "search route #11", and "search route #21", as intra-stack search routes.

The "search route #1" within IaaS is one where the cause of failure is disk-related, and is applied in a case where the start point equipment is a VM. In a case where "search route

1" is applied at the time of a range of effects search within IaaS, searching for adjacent equipment (equipment having a connection relation) having the relevant functions is performed in the order of "VM→data storage→RAID data storage→VM".

The "search route #2" within IaaS is one where the cause of failure is CPU-related, and is applied in a case where the start point equipment is a VM. In a case where "search route #2" is applied at the time of a range of effects search within IaaS, searching for adjacent equipment having the relevant functions is performed in the order of "VM→hypervisor (HV)→VM".

The "search route #11" within PaaS is applied in a case where the start point equipment is Web application, for all causes of failure. In a case where "search route #11" is applied at the time of a range of effects search within PaaS, searching for adjacent equipment having the relevant functions is performed in the order of "Web application→database (DB)→Web application".

The "search route #21" within SaaS is applied in a case where the start point equipment is an application, for all causes of failure. In a case where "search route #21" is applied at the time of a range of effects search within SaaS, searching for adjacent equipment having the relevant functions is performed in the order of "application→application".

FIG. 8 also illustrates "search route #31", "search route #41", and "search route #51" as inter-stack search routes.

The "search route #31" for PaaS→IaaS is one where the cause of failure is disk-related, and is applied in a case where the start point equipment is a database in the higher-order stack. In a case where "search route #31" is applied at the time of a range of effects search within IaaS, searching for adjacent equipment having the relevant functions is performed from a VM in the IaaS on which the database serving as the start point is dependent, in the same order as the "search route #1". Note that the meaning of equipment A being dependent on equipment B is that equipment A is being executed using the functions of equipment B (VM, OS, middleware, or the like) as an execution platform.

The "search route #41" for SaaS PaaS is applied in a case where the start point equipment is a SaaS application, for all causes of failure. In a case where "search route #41" is applied at the time of a range of effects search within PaaS of which the start point is equipment within SaaS, dependent equipment is searched for from the platform on which the start point application is dependent ("zzz" in the example in FIG. 8). In a case where equipment on which the platform "zzz" that the start point application is dependent on is not in the same stack as "zzz", just "zzz" is the equipment within the range of effects.

The "search route #51" for IaaS PaaS is one where the start point is a VM of the IaaS, for all causes of failure. In a case where "search route #51" is applied at the time of a range of effects search within PaaS of which the start point is equipment within IaaS, from the database dependent on the VM that is the start point to all Web applications dependent on the database, are equipment within the range of effects.

Next, an example of a stack operation model stored in the stack operation model storage unit 320 will be described.

Figure 9:
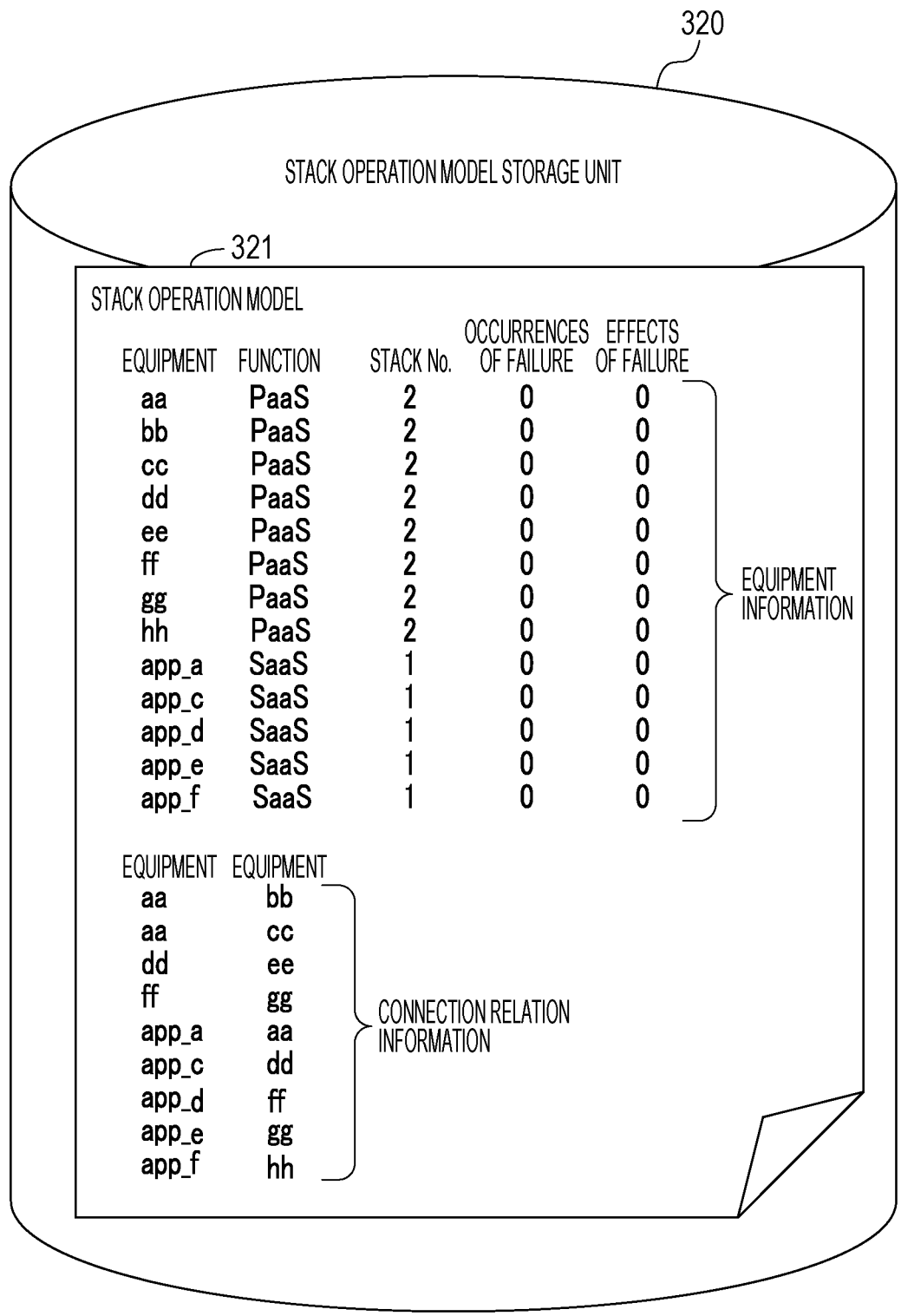
FIG. 9 is a diagram illustrating an example of a stack operation model.

FIG. 9 is a diagram illustrating an example of a stack operation model. A stack operation model 321 includes equipment information and connection relation information. Equipment information has set therein, in correlation with identifiers of each equipment of stack 52 and the higher-order stack 53, function of the equipment, identifier of the stack to which the equipment belongs (stack No.), information indicating whether or not a failure has occurred (value of the column "occurrence of failure"), and information indicating whether or not there are effects of failure (value of the column "effects of failure").

The type of the stack to which the equipment belongs (IaaS, PaaS, SaaS) is given as the function of the equipment. The function of the equipment includes information indicating a specific service type, such as database, VM, and so forth, although omitted from illustration in FIG. 9.

In a case where the corresponding equipment is failure-detected equipment, for example, information indicating whether or not a failure has occurred is set to the value "1" indicating that a failure has occurred. In a case where the corresponding equipment is failure-affected equipment, for example, information indicating whether or not there are effects of failure is set to the value "1" indicating that this is within the range of effects of failure.

The connection relation information indicates the connection relation among equipment within the stack 52, and the connection relation between equipment within stack 52 and equipment within stack 53. The connection relation among equipment within the stack 52 is the relation between two pieces of equipment that operate cooperatively to provide a service, or the relation between two pieces of equipment where one piece of equipment is dependent on the other piece of equipment. The connection relation between equipment within stack 52 and equipment within stack 53 is the relation between equipment within the stack 52, and the equipment within the higher-order stack 53 that is dependent on that equipment.

Next, functions of the stack information managing unit 330 will be described.

Figure 10:
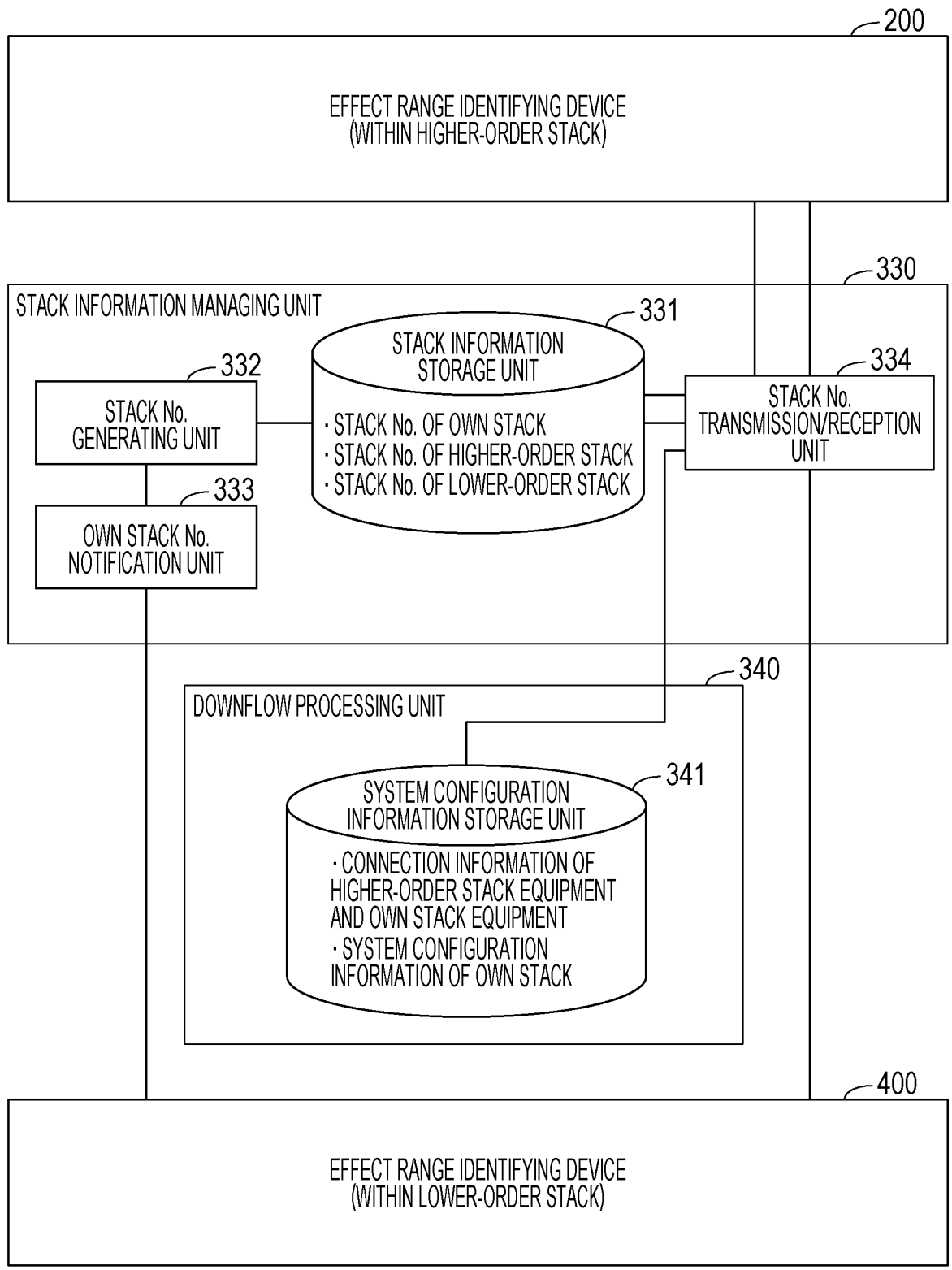
FIG. 10 is a diagram illustrating an example of functions of a stack information management unit.

FIG. 10 is a diagram illustrating an example of the functions of the stack information managing unit 330. The stack information managing unit 330 includes a stack information storage unit 331, a stack No. generating unit 332, an own stack No. notification unit 333, and a stack No. transmission/reception unit 334.

The stack information storage unit 331 stores the stack No. of the stack 52 (Paas) to which it belongs, the stack No. of the lower-order stack 51 (IaaS), and the stack No. of the higher-order stack 53 (SaaS).

The stack No. generating unit 332 generates the stack No. of the stack 52. The own stack No. notification unit 333 transmits its own stack No. to the effect range identifying device 400 of the lower-order stack 51. The stack No. transmission/reception unit 334 obtains the stack Nos. of the lower-order stack 51 and the higher-order stack 53.

The procedures for own stack No. registration processing by the stack No. generating unit 332 and own stack No. notification unit 333 will be described below with reference to FIGS. 11 and 12.

Figure 11:
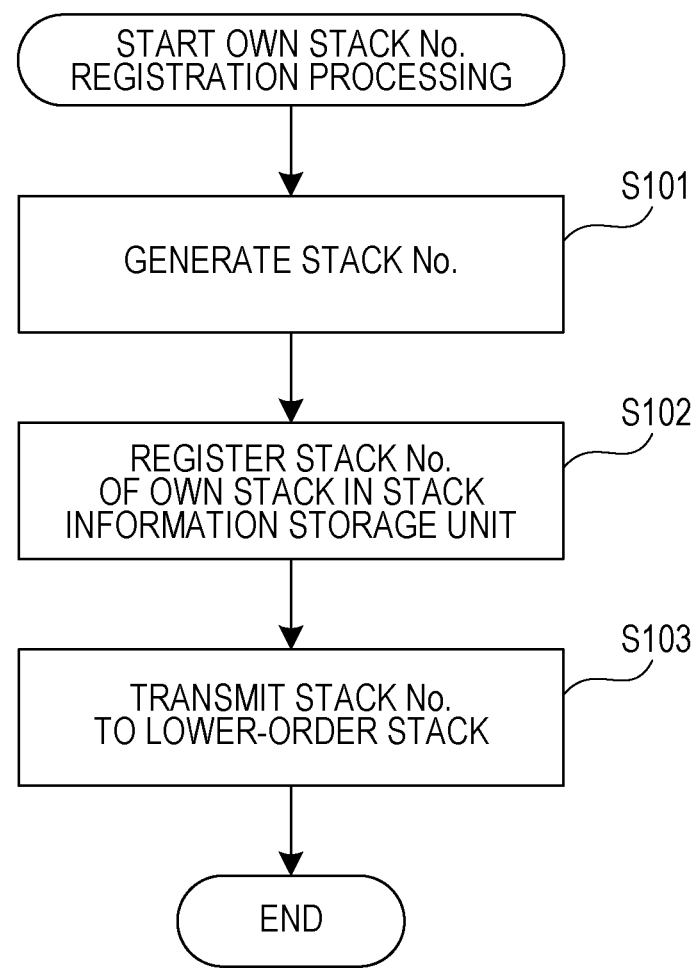
FIG. 11 is a flowchart illustrating an example of procedures for own stack No. registration processing.

FIG. 11 is a flowchart illustrating an example of procedures of the own stack No. registration processing. Description will be made of the processing illustrated in FIG. 11 following the step numbers.

(Step S101) The stack No. generating unit 332 generates a stack No. for its own stack. For example, when the effect range identifying device 300 is introduced to the stack 52 (when software for the effect range identifying device 300 is installed to the VM for the stack 52), the stack No. generating unit 332 generates a unique stack No. An example of a unique stack No. is a number including identifiers of all stacks of the entire system. A unique number may also be made by including in the stack No. the time at which the stack No. was generated.

(Step S102) The stack No. generating unit 332 stores the generated stack No. in the stack information storage unit 331 as the stack No. of the stack 52. The stack No. generating unit 332 also transmits the generated stack No. to the own stack No. notification unit 333.

(Step S103) The own stack No. notification unit 333 transmits the obtained stack No. to the effect range identifying device 400 of the lower-order stack 51.

Figure 12:
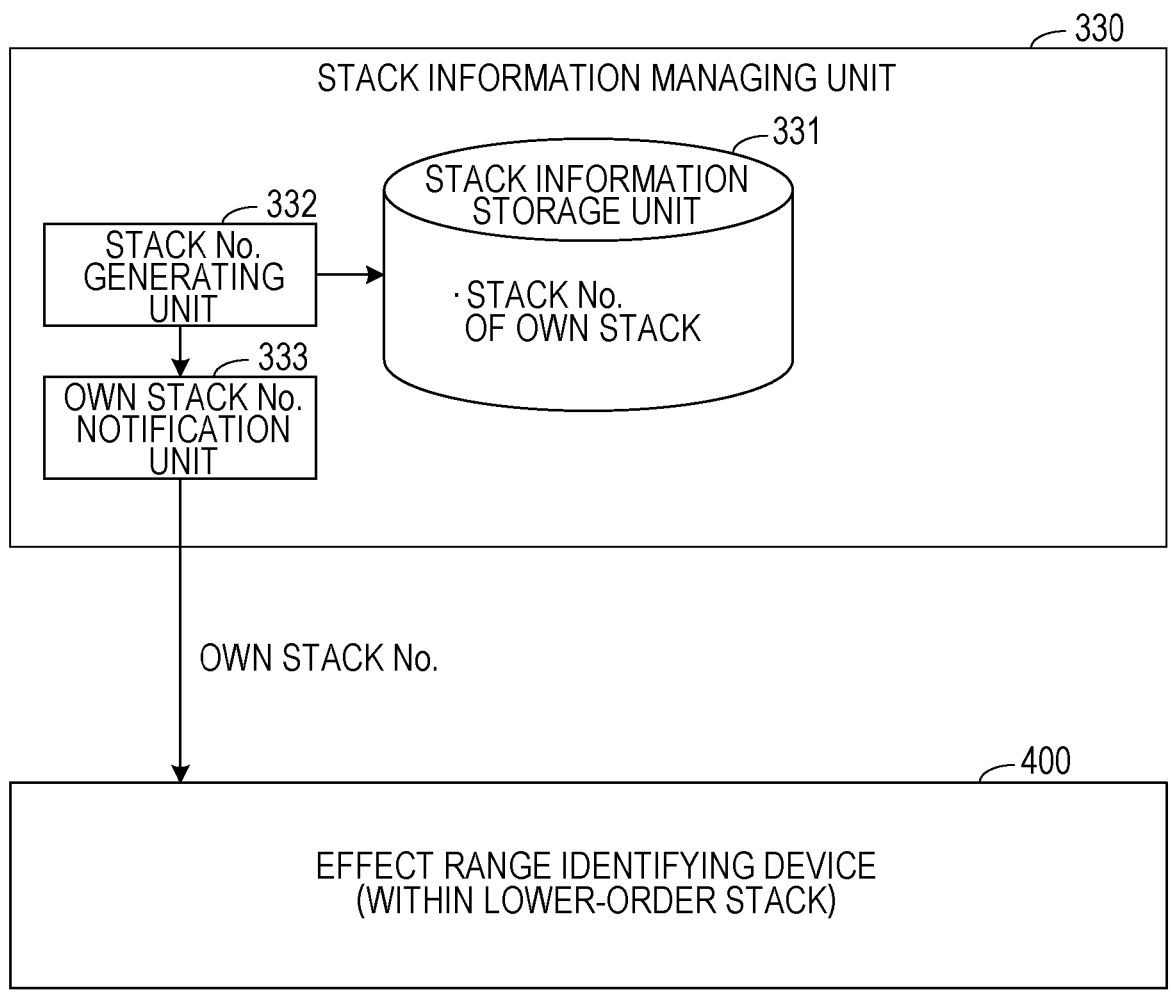
FIG. 12 is a diagram illustrating an example of own stack No. registration processing results.

FIG. 12 is a diagram illustrating an example of the results of own stack No. registration processing. The stack No. generated at the stack No. generating unit 332 is stored in the stack information storage unit 331 within the stack information managing unit 330 as the stack No. of its own stack, as illustrated in FIG. 12. The generated stack No. of the own stack is also transmitted to the effect range identifying device 400 within the lower-order stack 51.

At the effect range identifying device 400, the stack No. of the own stack that is transmitted thereto is stored as the stack No. of the higher-order stack. As a result, the presence of the effect range identifying device 300 introduced to the stack 52 is recognized by the effect range identifying device 400 within the lower-order stack 51.

Next, the procedures of other stack No. registration processing by the stack No. transmission/reception unit 334 will be described with reference to FIGS. 13 and 14.

Figure 13:
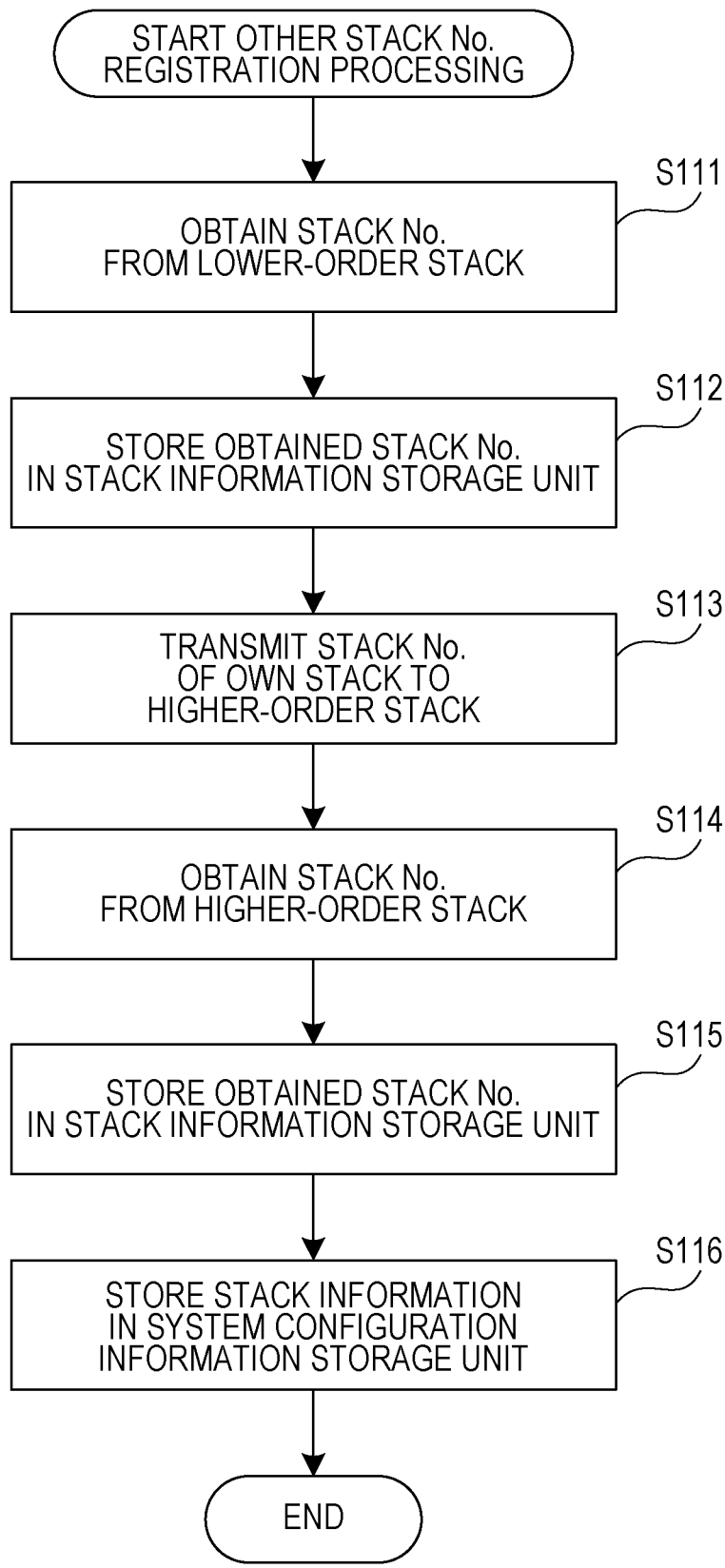
FIG. 13 is a flowchart illustrating an example of procedures for other stack No. registration processing.

FIG. 13 is a flowchart illustrating an example of the procedures of other stack No. registration processing. The processing illustrated in FIG. 13 will be described below following the step numbers.

(Step S111) The stack No. transmission/reception unit 334 obtains the stack No. of the lower-order stack 51, from the effect range identifying device 400 within the lower-order stack 51.

(Step S112) The stack No. transmission/reception unit 334 stores the obtained stack No. in the stack information storage unit 331 as a lower-order stack No.

(Step S113) The stack No. transmission/reception unit 334 obtains its own stack No. from the stack information storage unit 331, and transmits its own stack No. to the effect range identifying device 200 within the higher-order stack 53.

(Step S114) The stack No. transmission/reception unit 334 obtains the stack No. of the higher-order stack 53 from the effect range identifying device 200 within the higher-order stack 53.

(Step S115) The stack No. transmission/reception unit 334 stores the obtained stack No. in the stack information storage unit 331 as the higher-order stack No.

(Step S116) The stack No. transmission/reception unit 334 stores the stack information (stack Nos. of the stacks) stored in the stack information storage unit 331, in a system configuration information storage unit 341 within the downflow processing unit 340. Accordingly, the downflow processing unit 340 may recognize the higher-order and lower-order effect range identifying devices 200 and 400 within the higher-order and lower-order stacks by their stack Nos. Thereafter the series of processing of stack information management (processing at the time of introducing effect range identifying device) ends.

Note that the other stack No. registration processing may end at the point of having notified the higher-order stack 53 of the stack No. of the stack 52. In this case, the stack No. transmission/reception unit 334 obtains the stack No. of the higher-order stack 53 when searching effects of failure, and stores the obtained stack No. in the stack information storage unit 331 and also stores in the system configuration information storage unit 341.

Figure 14:
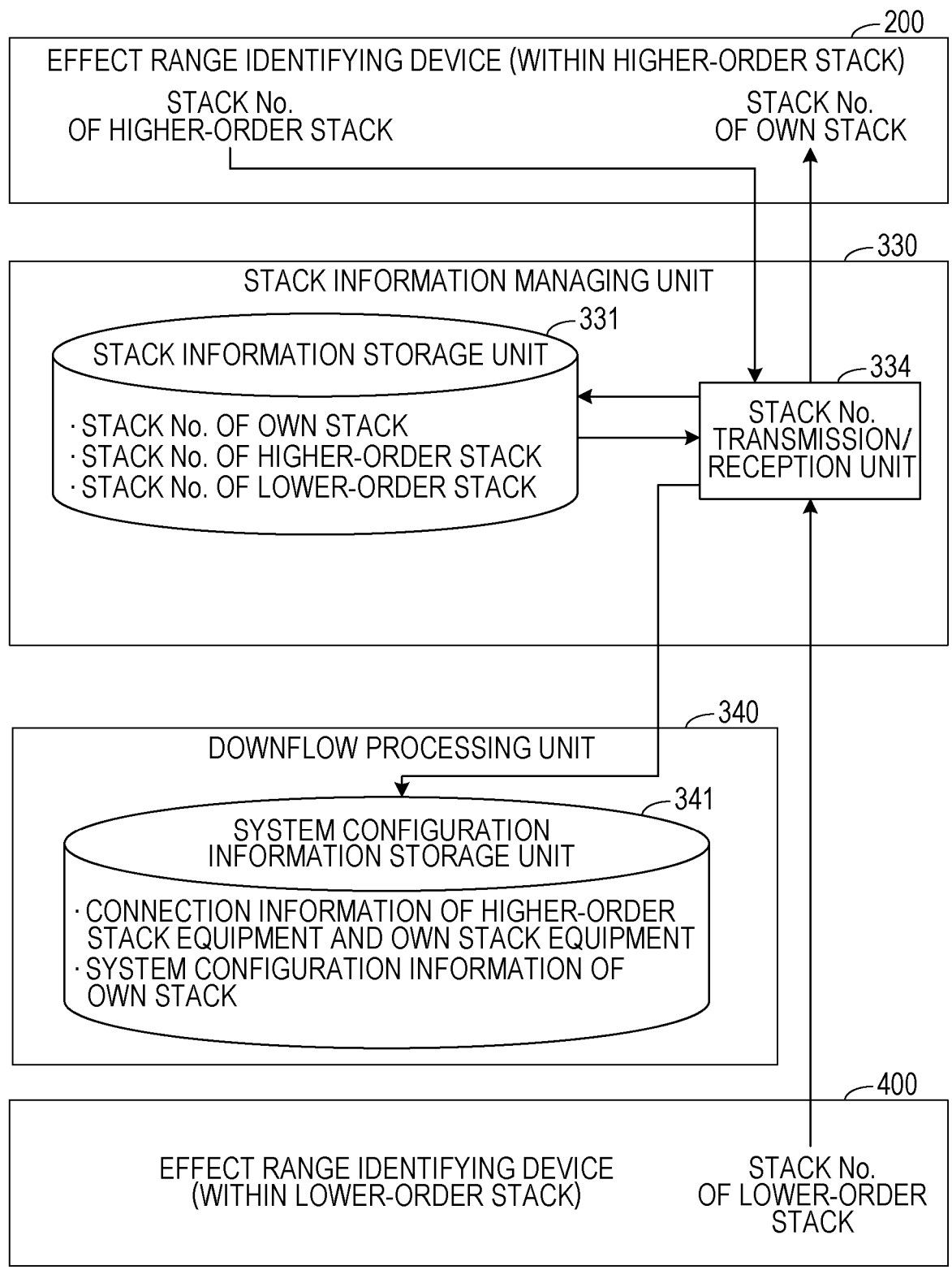
FIG. 14 is a diagram illustrating an example of other stack No. registration processing results.

FIG. 14 is a diagram illustrating an example of results of other stack No. registration processing. The stack No. obtained from the effect range identifying device 400 in the lower-order stack 51 is stored in the stack information managing unit 330 as a lower-order stack No., as illustrated in FIG. 14. Also, the stack No. obtained from the effect range identifying device 200 within the higher-order stack 53 is stored in the stack information managing unit 330 as a higher-order stack No. The stack Nos. stored in the stack information storage unit 331 are also stored in the system configuration information storage unit 341 of the downflow processing unit 340.

Thus, in a case where the effect range identifying device 300 is introduced to the stack 52, the stack information managing unit 330 exchanges stack Nos. with the effect range identifying devices 200 and 400 of the higher-order stack 53 and lower-order stack 51. Accordingly, the effect range identifying device among stacks of different layers may identify each other.

Next, details of downflow processing will be described.

Figure 15:
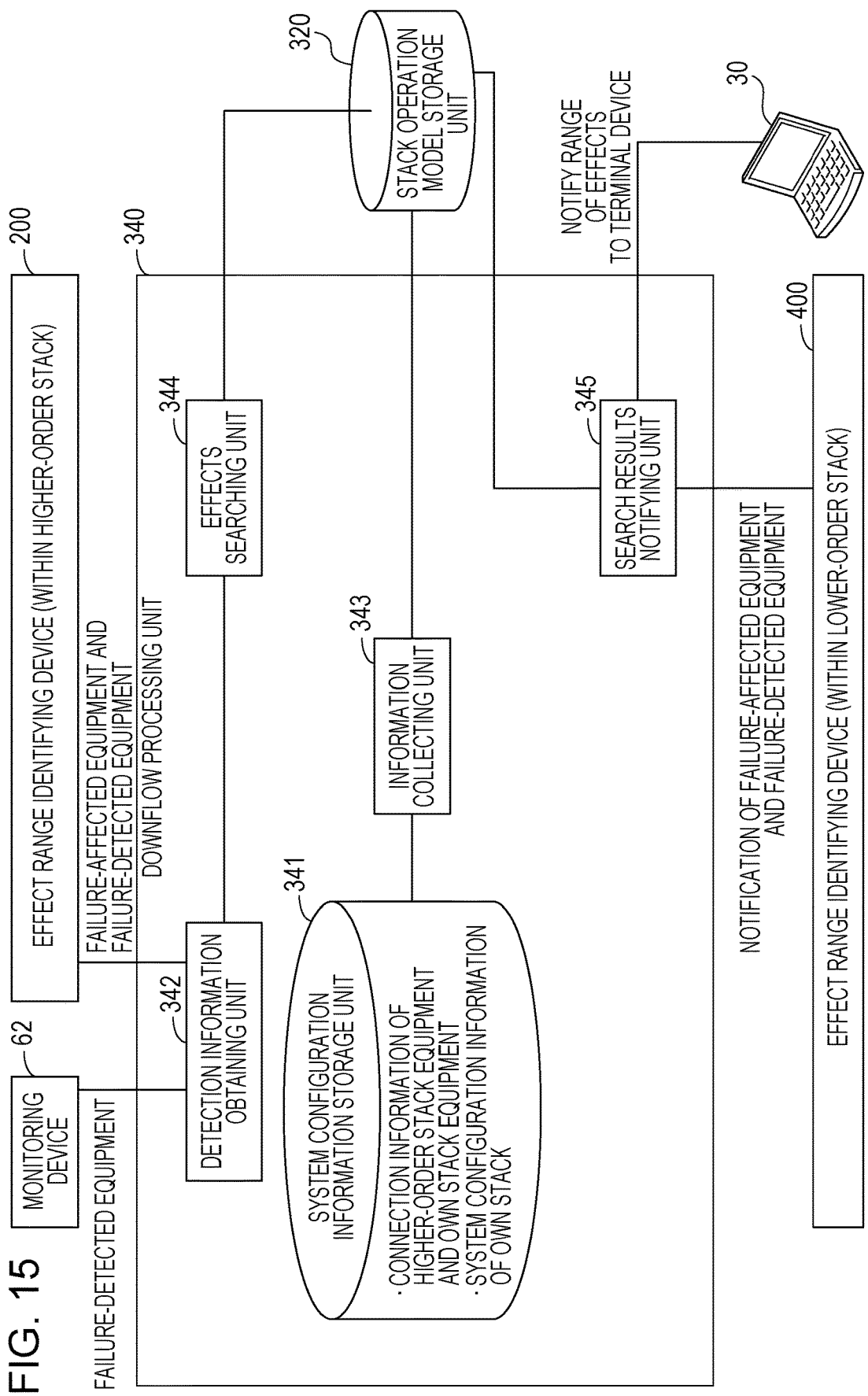
FIG. 15 is a diagram illustrating an example of functions of a downflow processing unit.

FIG. 15 is a diagram illustrating an example of function in a downflow processing unit. The downflow processing unit 340 includes the system configuration information storage unit 341, a detection information obtaining unit 342, an information collecting unit 343, an effects searching unit 344, and a search results notifying unit 345.

The system configuration information storage unit 341 stores connection information of equipment within the higher-order stack 53 and equipment within the stack 52, and system configuration information of the stack 52. The connection information of equipment within the higher-order stack 53 and equipment within the stack 52 includes sets of an identifier of equipment within the stack 52, and an identifier of equipment within the higher-order stack 53 that is operating dependently on that equipment. The system configuration information of the stack 52 includes sets of identifiers of two pieces of equipment operating in cooperation, among the equipment within the stack 52.

The detection information obtaining unit 342 obtains information indicating failure-detected equipment and failure-affected equipment from the effect range identifying device 200 of the higher-order stack 53 (higher-order stack detection information). The detection information obtaining unit 342 also obtains information indicating failure-detected equipment from a monitoring device 62 within the stack 52 (own stack detection information). The information collecting unit 343 creates a stack operation model based on the information within the system configuration information storage unit 341. The effects searching unit 344 searches for the range of effects of failure, with a failure-detected equipment or failure-affected equipment as a start point. The search results notifying unit 345 transmits information of the failure-detected equipment and failure-affected equipment detected in the stack 52 to the effect range identifying device 400 of the lower-order stack 51. The search results notifying unit 345 also notifies the terminal device 30 that the administrator of the stack 52 uses, regarding the range of effects of the failure.

In a case of the downflow processing unit 340 having detected that a failure has occurred somewhere in the cloud computing system 20, downflow processing is started. For example, the downflow processing unit 340 detects occurrence of a failure by receiving higher-order stack detection information including the identifiers of failure-detected equipment where a failure has occurred and failure-affected equipment, from the effect range identifying device 200 of the higher-order stack 53. The downflow processing unit 340 also detects occurrence of a failure by receiving own stack detection information including identifiers of failure-detected equipment from the monitoring device 62.

Figure 16:
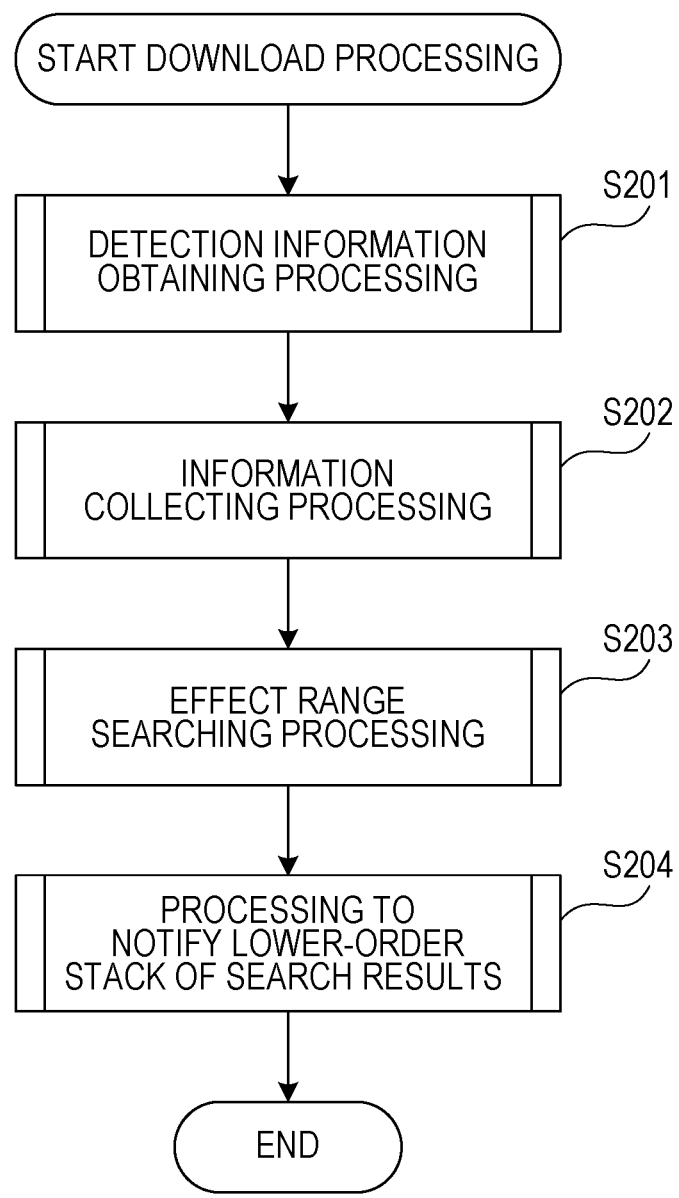
FIG. 16 is a diagram illustrating an example of procedures of downflow processing.

FIG. 16 is a diagram illustrating an example of procedures of downflow processing. Description of the processing illustrated in FIG. 16 will be made below following the step numbers.

(Step S201) The detection information obtaining unit 342 performs detection information obtaining processing. Details of the detection information obtaining processing will be described later (see FIG. 19).

(Step S202) The information collecting unit 343 performs information collection processing. A stack operation model is generated by the information collection processing. Details of the information collection processing will be described later (see FIG. 21).

(Step S203) The effects searching unit 344 performs effect range searching processing. Details of the effect range searching processing will be described later (see FIG. 25).

(Step S204) The search results notifying unit 345 performs processing to notify the lower-order stack 51 of the search results. Details of the processing to notify the lower-order stack 51 of the search results will be described later (see FIG. 27).

Downflow processing is executed by these procedures at the time of having obtained higher-order stack detection information. The higher-order stack detection information is transmitted from the effect range identifying device 200 of the higher-order stack 53 that has detected failure-detected equipment when a failure has occurred. Note that equipment within the stack 52 may also be detected as failure-detected equipment when a failure has occurred.

Figure 17:
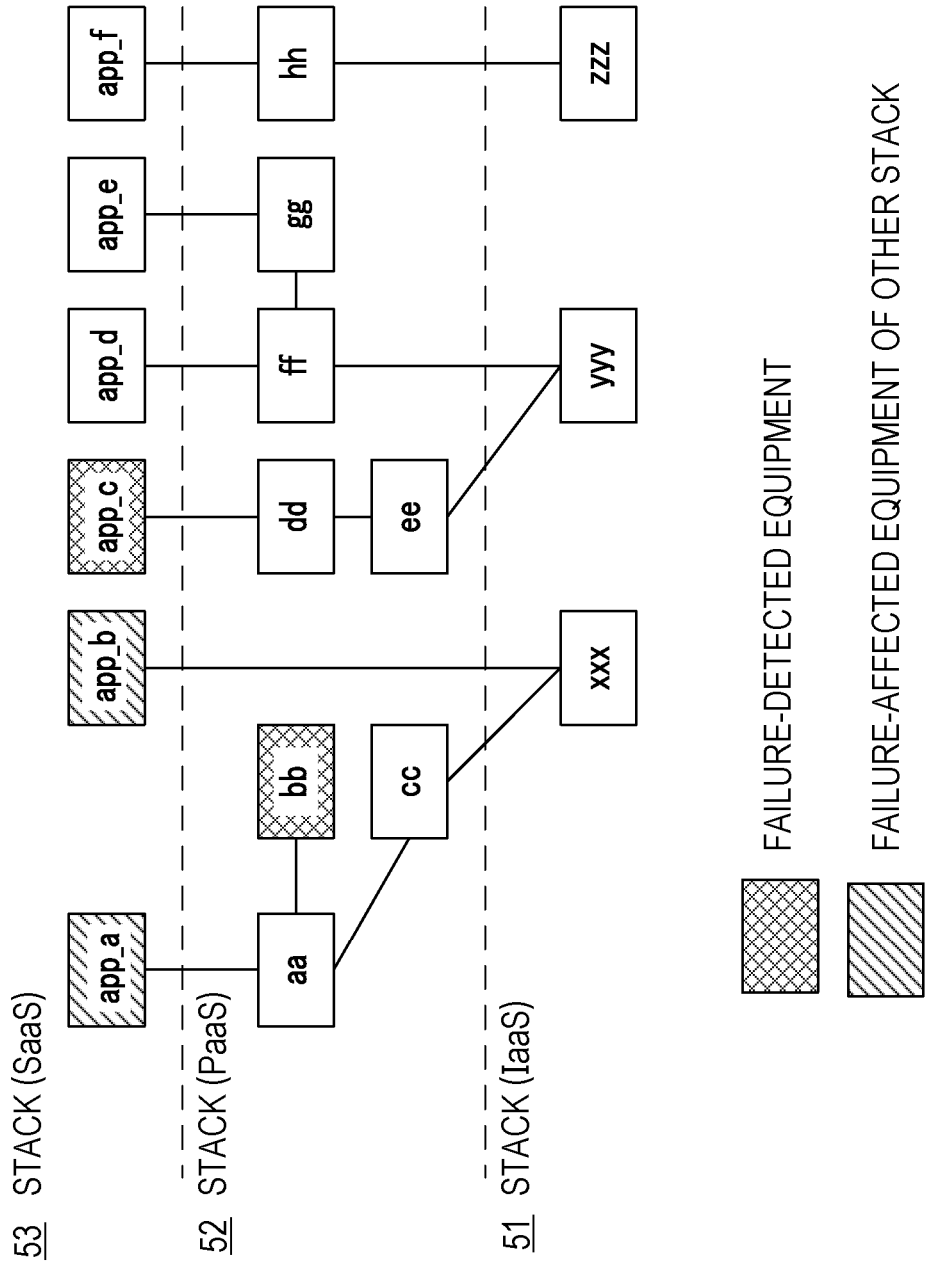
FIG. 17 is a diagram illustrating detection examples of failure-detected equipment and failure-affected equipment.

FIG. 17 is a diagram illustrating a detection example of failure-detected equipment and failure-affected equipment. In the example in FIG. 17, detecting has been made that a failure has occurred at equipment "app_c" in the stack 53 and equipment "bb" in the stack 52. Note that occurrence of a failure in equipment in the stack 53 is detected by a monitoring device 63, and the identifier of the equipment at which the failure has occurred is notified from the monitoring device 63 to the effect range identifying device 200 (see FIG. 4). Occurrence of a failure at equipment within the stack 52 is detected by the monitoring device 62, and the identifier of the equipment at which the failure has occurred is notified from the monitoring device 62 to the effect range identifying device 300 (see FIG. 4).

In the example in FIG. 17, as a result of the effect range search by the effect range identifying device 200 within the stack 53 with equipment "app_a" as a start point, equipment "app_a" and equipment "app_b" have been detected as being failure-affected equipment. In this case, higher-order stack detection information indicating failure-detected equipment "app_c" and failure-affected equipment "app_a, app_b" is transmitted from the effect range identifying device 200 within the stack 53 to the effect range identifying device 300 within the stack 52.

Figure 18:
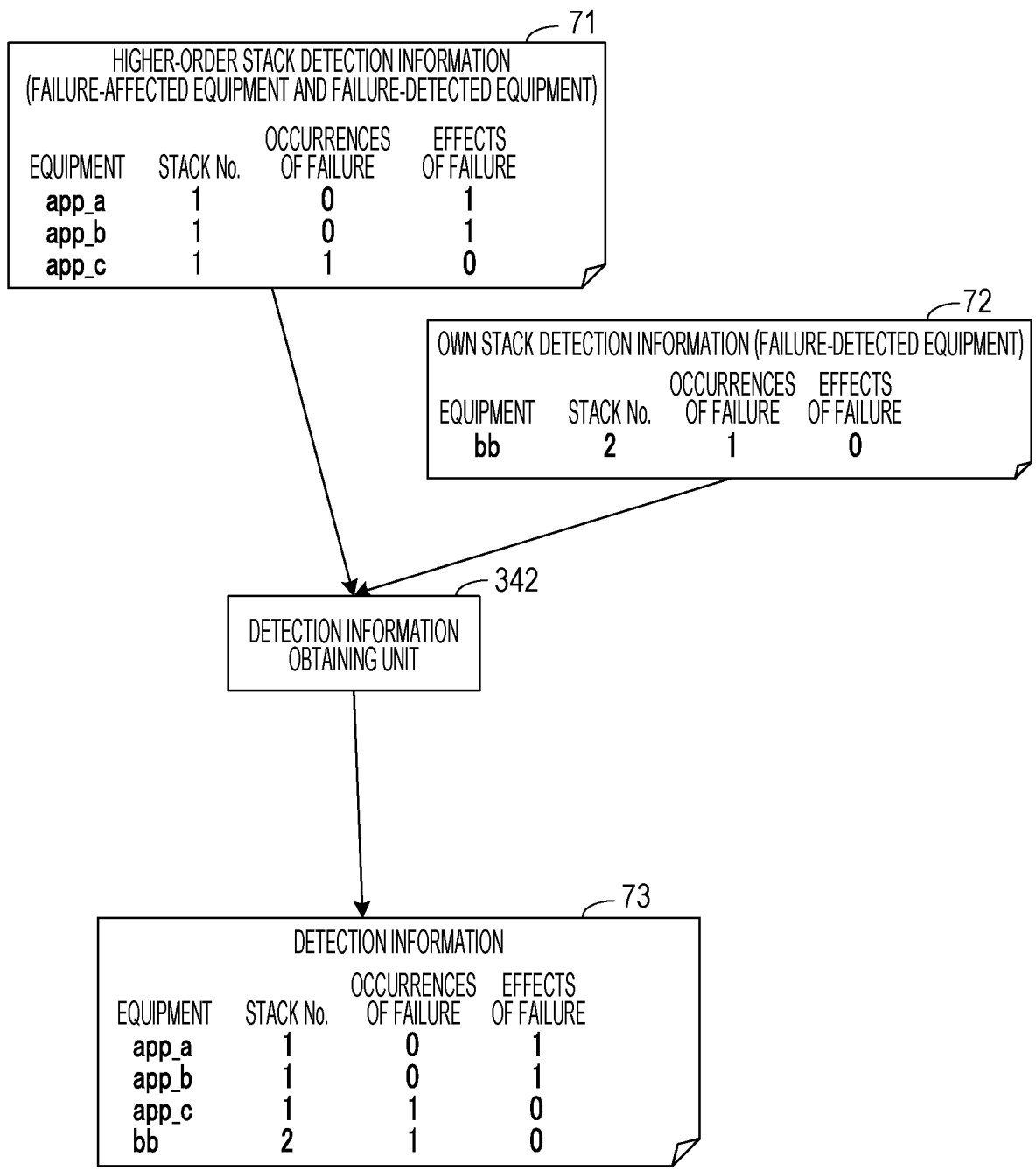
FIG. 18 is a diagram illustrating an example of detection information obtaining processing.

FIG. 18 is a diagram illustrating an example of detection information obtaining processing. The detection information obtaining unit 342 obtains higher-order stack detection information 71 and own-stack detection information 72, as illustrated in FIG. 18.

The higher-order stack detection information 71 has set, in correlation with the identifier of equipment (equipment name) within the higher-order stack 53, the stack No. of the stack to which the equipment belongs, information indicating whether or not a failure has occurred, and information of whether or not there are effects of a failure. The information indicating whether or not a failure has occurred is set in the "occurrence of failure" column, and information indicating whether or not there are effects of failure is set in the "effects of failure" column. The value of the occurrence of failure column for the "app_c" that is the failure-detected equipment is "1", and the value of the effects of failure column is "0". The value of the occurrence of failure column is "0" for the "app_a" and "app_b" that are failure-affected equipment, and the value of the effects of failure column is "1".

In the own-stack detection information 72 are set, in correlation with the identifier of equipment (equipment name) within the stack 52 to which the effect range identifying device 300 belongs, the stack No. of the stack to which the equipment belongs, failure occurrence information, and failure effects information. The value of the failure occurrence column is "1" for the equipment "bb" that is a failure-detected equipment, and the value of the failure effects column is "0".

The detection information obtaining unit 342 generates detection information 73 in which the higher-order stack detection information 71 and own-stack detection information 72 have been integrated, and transmits the generated detection information 73 to the effects searching unit 344.

Figure 19:
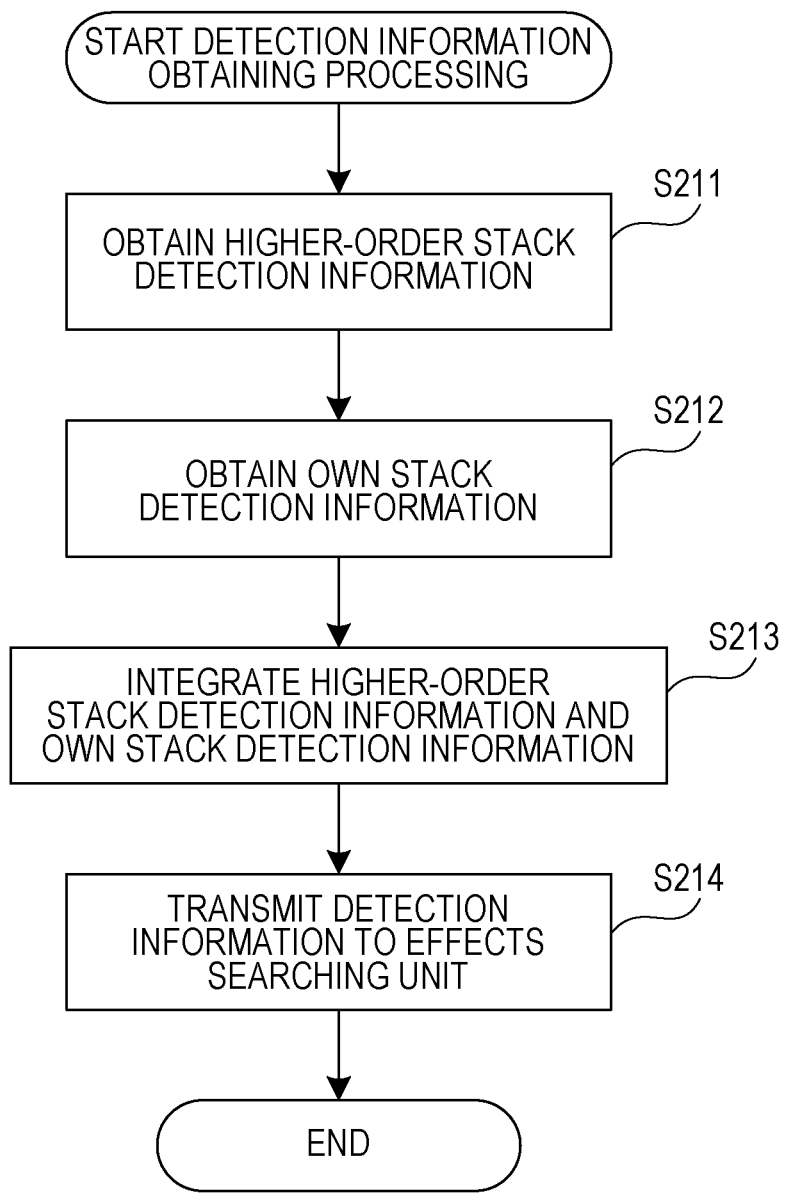
FIG. 19 is a flowchart illustrating an example of procedures of detection information obtaining processing.

FIG. 19 is a flowchart illustrating an example of procedures for detection information obtaining processing. The processing illustrated in FIG. 19 will be described below following the step numbers.

(Step S211) The detection information obtaining unit 342 obtains the higher-order stack detection information 71 from the effect range identifying device 200 within the higher-order stack 53.

(Step S212) The detection information obtaining unit 342 obtains the own-stack detection information 72 from the monitoring device 62 within the stack 52 to which the effect range identifying device 300 belongs.

(Step S213) The detection information obtaining unit 342 integrates the higher-order stack detection information 71 and the own-stack detection information 72. For example, the detection information obtaining unit 342 generates new detection information 73 that includes records for each piece of equipment within the higher-order stack detection information 71, and records for each piece of equipment within the own-stack detection information 72.

(Step S214) The detection information obtaining unit 342 transmits the generated detection information 73 to the effects searching unit 344.

Thus, detection information 73 where the higher-order stack detection information 71 and own-stack detection information 72 have been integrated is generated.

Next, information collecting processing will be described in detail.

Figure 20:
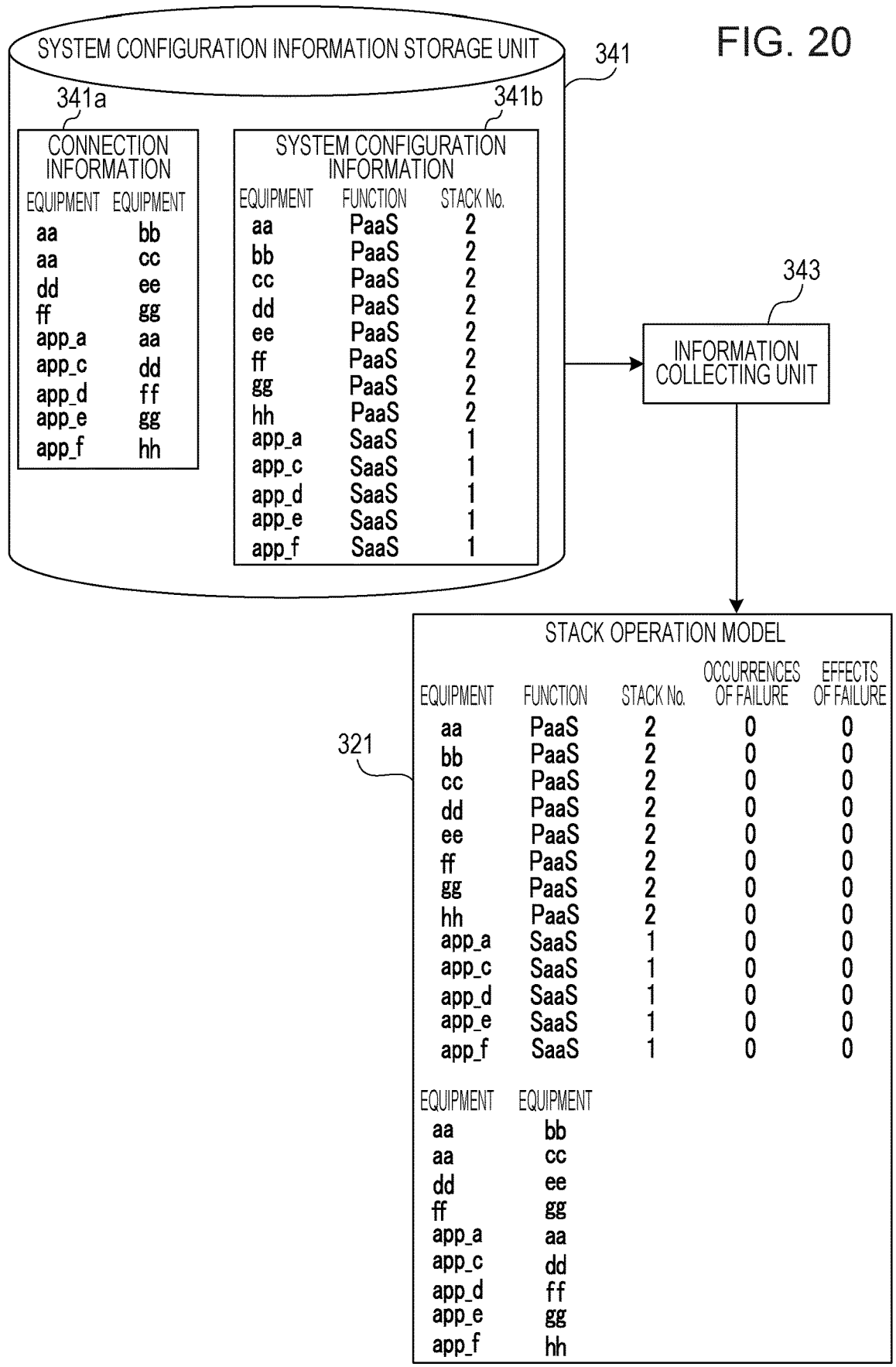
FIG. 20 is a diagram illustrating an example of information collection processing.

FIG. 20 is a diagram illustrating an example of information collecting processing. The information collecting unit 343 generates a stack operation model 321 based on information stored in the system configuration information storage unit 341. For example, the system configuration information storage unit 341 includes connection information 341a and system configuration information 341b. The connection information 341a includes information indicating the connection relation of equipment within the stack 52, and connection information between equipment in the stack 52 and equipment in the higher-order stack 53. The system configuration information 341b has registered therein equipment within the stacks 52 and 53. The equipment illustrated in the system configuration information 341b is imparted information indicating the equipment function (VM, Data storage, PaaS, SaaS, or the like).

The information collecting unit 343 obtains the identifiers of equipment making up the system of the stack 52, and the functions of each piece of equipment, from the system configuration information 341b. The information collecting unit 343 also obtains the identifiers of equipment within the higher-order stack 53 connected to equipment within the stack 52, from the connection information 341a. The information collecting unit 343 then obtains the functions of each piece of equipment within the higher-order stack 53 connected to equipment within the stack 52 from the system configuration information 341b.

The information collecting unit 343 creates the stack operation model 321 as connection information, where the connection relation among equipment of the stack 52 and between equipment of the stack 52 and equipment of the higher-order stack 53 are in a one-on-one relation, based on the obtained information. Creating of the stack operation model 321 by the information collecting unit 343 is performed when a failure occurs (when obtaining at least one of the higher-order stack detection information 71 and own-stack detection information 72), for example. Note that the information collecting unit 343 is not restricted to generating the stack operation model 321 when trouble occurs, and may periodically create the stack operation model 321, such as once a day. Creating the stack operation model 321 periodically enables the newest stack operation model 321 to be constantly available. The information collecting unit 343 may also create the stack operation model 321 when there is change in the connection information 341a or the system configuration information 341b.

Note that FIG. 20 illustrates the stack operation model 321 in the initial state. In the initial state, the value for failure occurrence information is "0" for each piece of equipment, and the value for failure effects information is also "0" for each piece of equipment, in the stack operation model 321.

Figure 21:
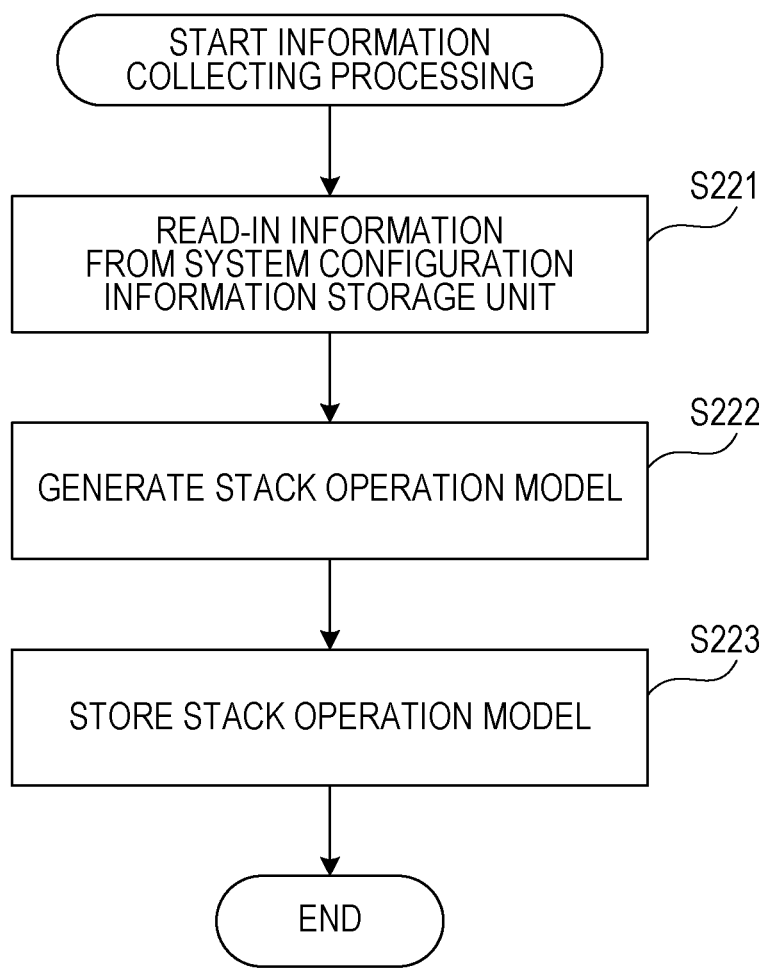
FIG. 21 is a flowchart illustrating an example of information collection processing.

FIG. 21 is a flowchart illustrating an example of the procedures for information collecting processing. The processing illustrated in FIG. 21 will be described below following the step numbers.

(Step S221) The information collecting unit 343 reads in the connection information 341a and system configuration information 341b from the system configuration information storage unit 341.

(Step S222) The information collecting unit 343 generates the stack operation model 321.

(Step S223) The information collecting unit 343 stores the generated stack operation model 321 in the stack operation model storage unit 320.

The stack operation model 321 generated in this way is used to perform effect range searching processing by the effects searching unit 344.

Figure 22:
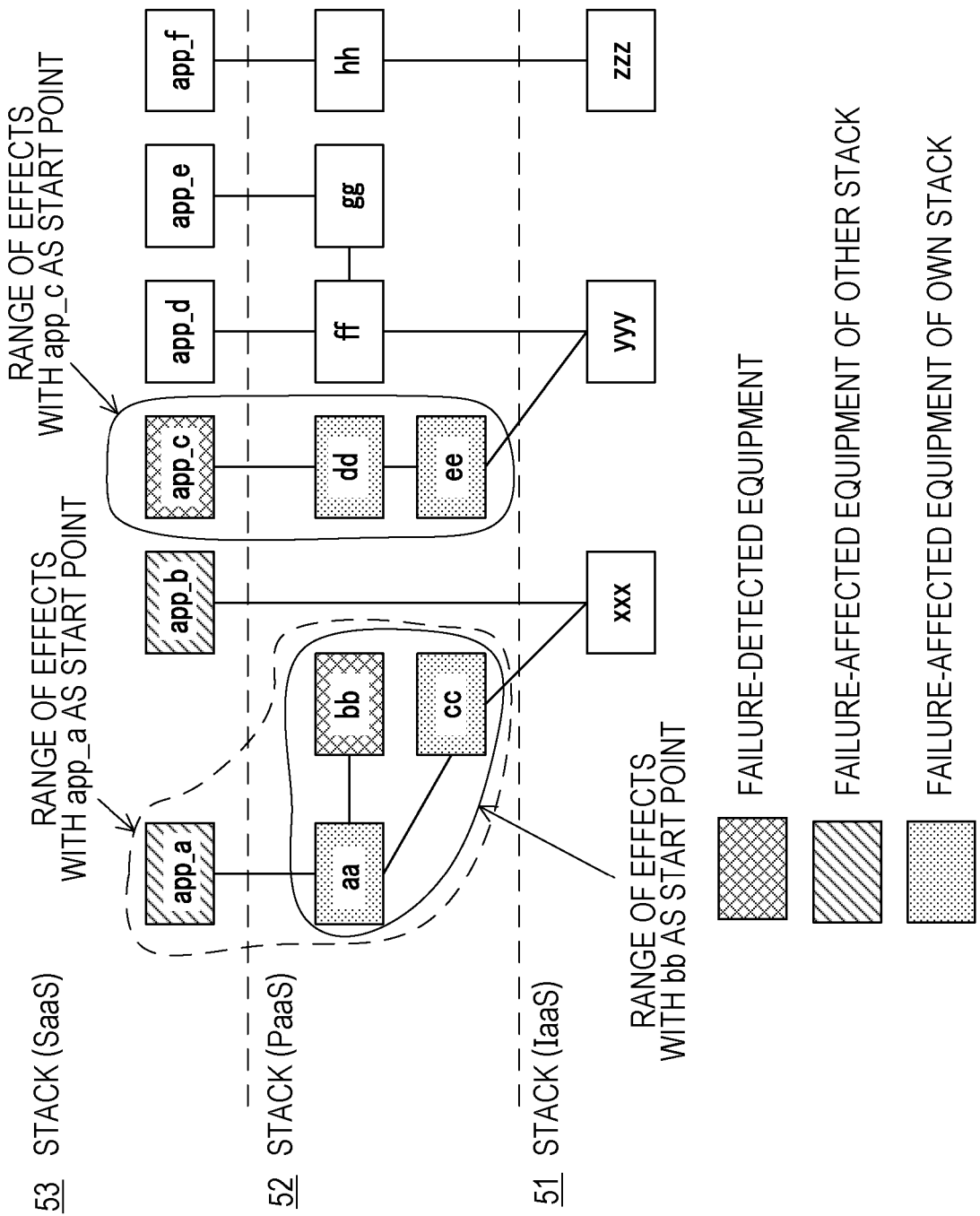
FIG. 22 is a diagram illustrating an example of effect range searching processing in downflow processing.

FIG. 22 is a diagram illustrating an example of effect range searching processing in downflow processing. The effects searching unit 344 searches the range of effects of failure with each of the failure-affected equipment in the higher-order stack 53 and the failure-detected equipment in the higher-order stack 53 and stack 52 as start points. The effects searching unit 344 uses the effect range search route information 311 defined beforehand in searching for the range of effects of failure. The effects searching unit 344 also updates the stack operation model 321 in accordance with the results of the effect range search.

In the example in FIG. 22, the range of effects of failure was searched with the failure-affected equipment "app_a" within the stack 53 as a start point, and as a result, equipment "aa", equipment "bb", and equipment "cc" within stack 52 have been detected as failure-detected equipment. Also, the range of effects of failure was searched with the failure-affected equipment "app_c" within the stack 53 as a start point, and as a result, equipment "dd" and equipment "ee" within stack 52 have been detected as failure-detected equipment. Further, the range of effects of failure was searched with the failure-affected equipment "bb" within the stack 52 as a start point, and as a result, equipment "aa" and equipment "cc" within stack 52 have been detected as failure-affected equipment. Note that the failure-affected equipment "app_b" within the stack 53 is not connected to any equipment in the stack 52, so the effects searching unit 344 does not perform a search for the range of effects with the failure-affected equipment "app_b" as a start point.

An update state of the stack operation model 321 will be described below with reference to FIGS. 23 and 24.

Figure 23:
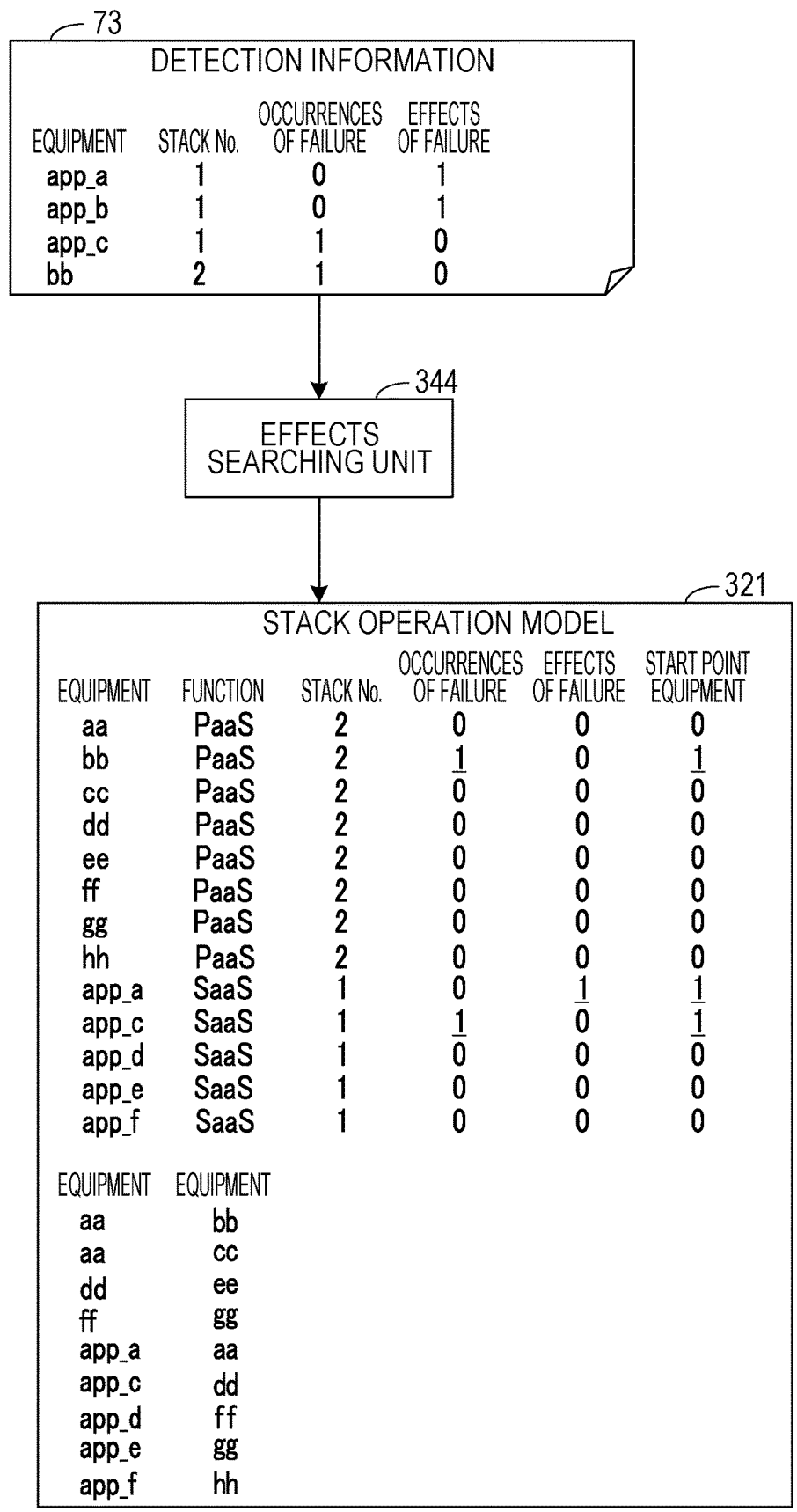
FIG. 23 is a diagram illustrating an example of stack operation model reflecting detection information.

FIG. 23 is a diagram illustrating an example of a stack operation model in which detection information has been reflected. The effects searching unit 344 that has obtained the detection information 73 adds information indicating whether or not the equipment will serve as a start point in a search (the value of the "start point equipment "column"), to each record within the stack operation model 321. The initial value of information indicating whether or not the equipment will serve as a start point in a search is "0". The effects searching unit 344 then reflects information of equipment where a failure has occurred and information of equipment that possibly may be affected by failure in the stack operation model 321 indicated in the detection information 73. The effects searching unit 344 further sets information indicating that equipment where a failure has occurred and information of equipment that possibly may be affected by failure is equipment that serves as a start point for a search, in the stack operation model 321.

In the example in FIG. 23, the value of information indicating whether or not there has been occurrence of failure is changed to "1" for the record of equipment "bb", and the value if information indicating whether or not to be start point equipment for a search is changed to "1". The value of information indicating whether or not there are effects of failure is changed to "1" for the record of equipment "app_a", and the value of information indicating whether or not the equipment will be a start point for a search is changed to "1". The value of information indicating whether or not there has been occurrence of failure is changed to "1" for the record of equipment "app_c", the value of information indicating whether or not the equipment will be a start point for a search is changed to "1".

Thereafter, the range of effects of failure is searched for by the effects searching unit 344, upon which the stack operation model 321 is updated in accordance with the search results.

Figure 24:
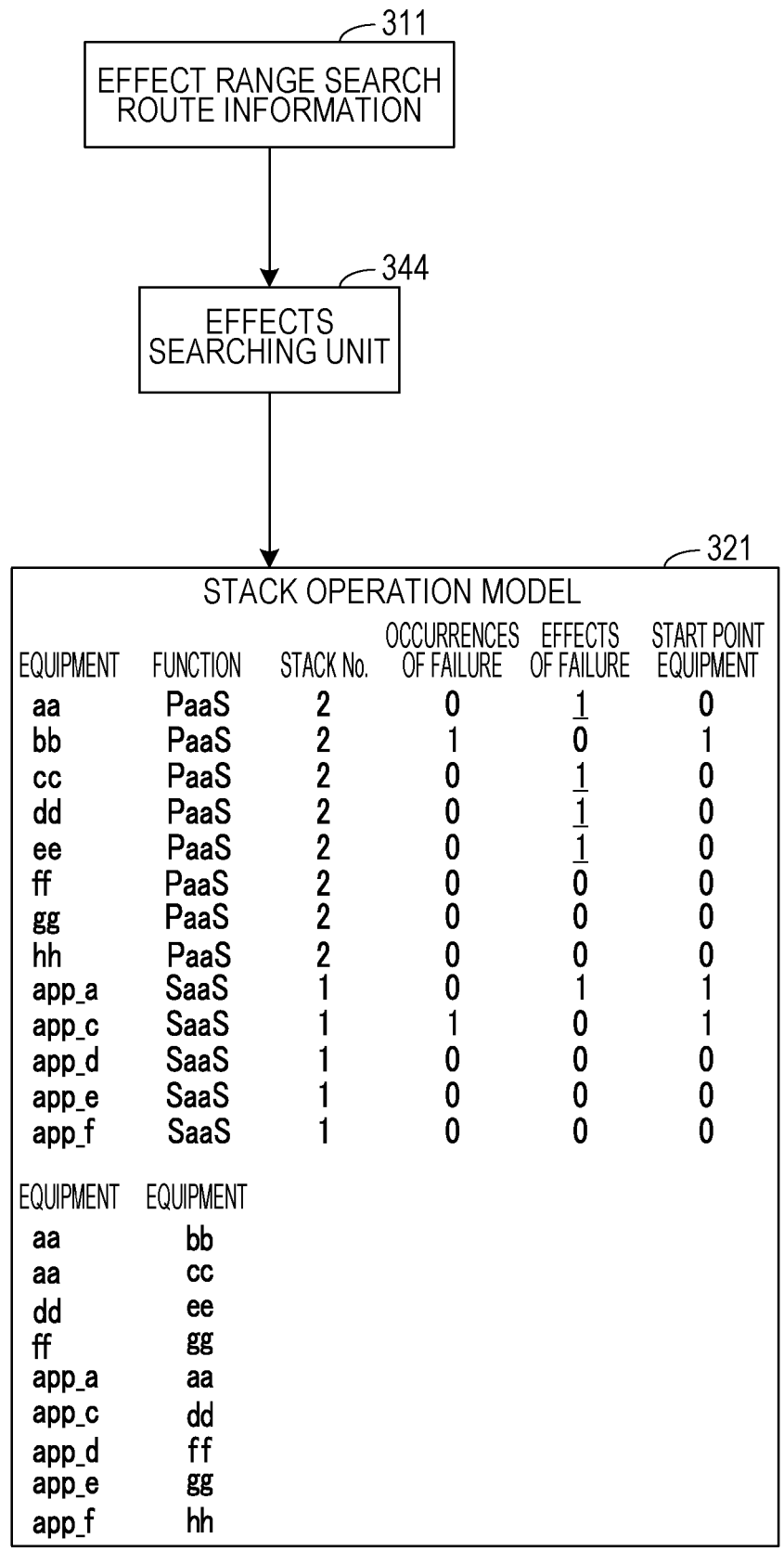
FIG. 24 is a diagram illustrating an example of a stack operation model reflecting search results of a range of effects in downflow processing.

FIG. 24 is a diagram illustrating an example of a stack operation model in which the search results of the range of effects in downflow processing have been reflected. FIG. 24 illustrates the stack operation model 321 in which the search results such as illustrated in FIG. 22 have been reflected. In the example in FIG. 24, the value of information indicating whether or not there are effects of failure has been changed to "1" for the records of each of equipment "aa", "cc", "dd", and "ee".

Next, the procedures of effect range searching processing will be described with reference to a flowchart.

Figure 25:
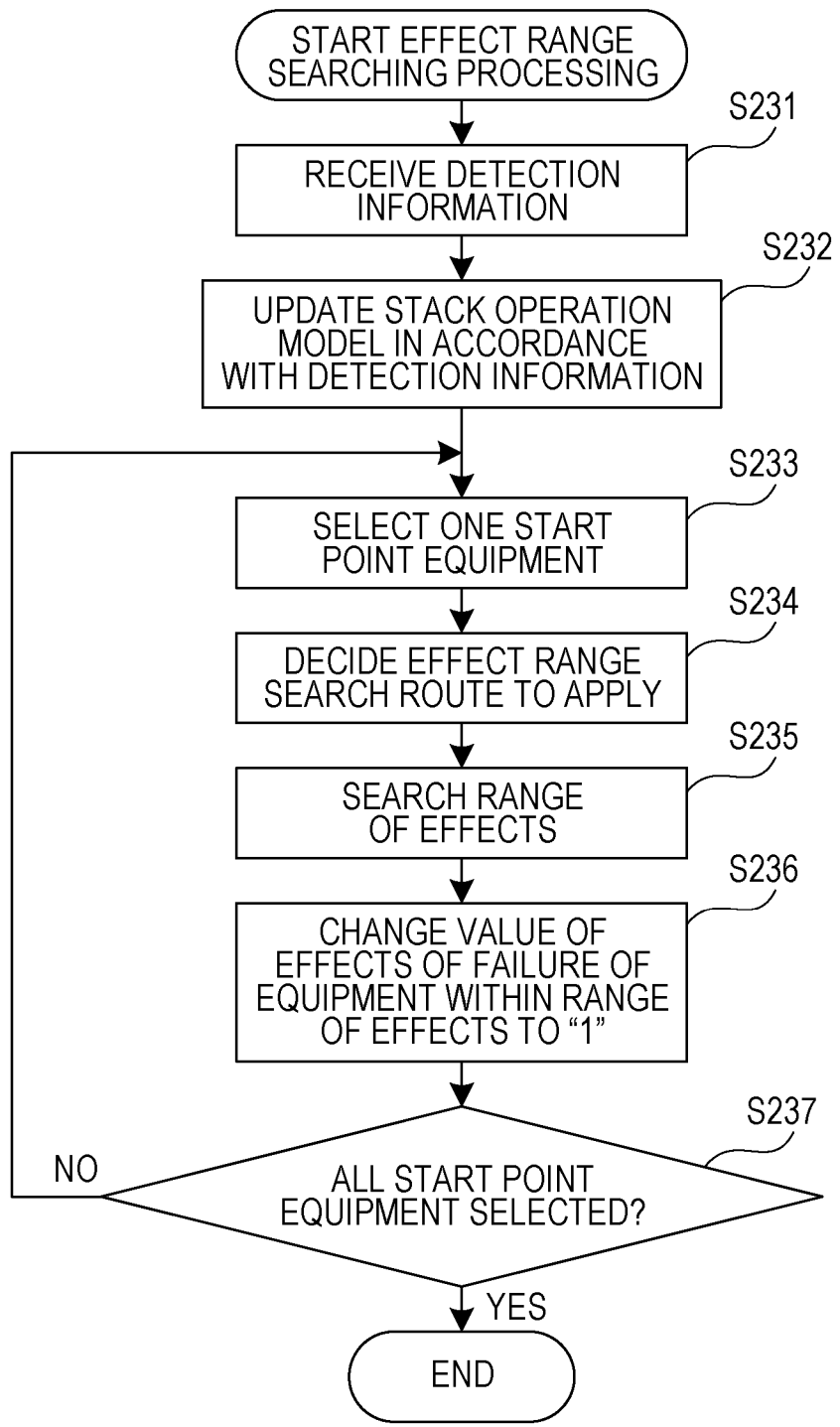
FIG. 25 is a flowchart illustrating procedures for effect range searching processing in downflow processing.

FIG. 25 is a flowchart illustrating an example of procedures for effect range searching processing in downflow processing. The processing illustrated in FIG. 25 will be described below following the step numbers.

(Step S231) The effects searching unit 344 receives the detection information 73 from the detection information obtaining unit 342.

(Step S232) The effects searching unit 344 updates the stack operation model 321 based on the received detection information 73. For example, the effects searching unit 344 sets information indicating failure-detected equipment and failure-affected equipment to the stack operation model 321, and sets in the stack operation model 321 that the failure-detected equipment and failure-affected equipment will be start points for an effect range search.

(Step S233) The effects searching unit 344 selects one unselected start point device out of the devices regarding which the stack operation model 321 indicates as being a start point for a search (start point equipment).

(Step S234) The effects searching unit 344 decides an effect range search route to apply. For example, in a case where the start point equipment is equipment within the stack 52, the effects searching unit 344 references the failure and search route correlation table 311*a* of the stack in the effect range search route information 311 (see FIG. 7), and obtains an identifier for the search route corresponding to the set of the type of failure that has occurred and the function of the failure-detected equipment. The effects searching unit 344 then references the search route information 311*c* and identifies the search route corresponding to the obtained identifier to be the effect range search route to apply.

In a case where the start point equipment is equipment within the higher-order stack 53, the effects searching unit 344 references the failure and search route correlation table 311*b* of the stack in the effect range search route information 311 (see FIG. 7), and obtains an identifier for the search route corresponding to the set of the type of failure that has occurred and the function of the failure-detected equipment. The effects searching unit 344 then references the search route information 311*c* and identifies the search route corresponding to the obtained identifier to be the effect range search route to apply.

(Step S235) The effects searching unit 344 searches for equipment within the range of effects, based on the effect range search route to apply. For example, the effects searching unit 344 starts searching from the start point equipment, and searches adjacent equipment of the function indicated in the effect range search route, in the order indicated by the effect range search route. The effects searching unit 344 judges equipment reached by the search to be equipment within the range of effects.

(Step S236) The effects searching unit 344 changes the value to "1" for information indicating whether or not there are effects of the failure, for equipment within the range of effects in the stack operation model 321.

(Step S237) The effects searching unit 344 judges whether or not all start point equipment has been selected. In a case where all start point equipment has been selected, the effects searching unit 344 ends the effect range searching processing. If there is unselected start point equipment, the effects searching unit 344 advances the flow to step S233.

Thus, failure effect range searching processing within the stack 52 is performed, and the stack operation model 321 is updated in accordance with the results of processing. Thereafter, search results notification processing is performed by the search results notifying unit 345.

Figure 26:
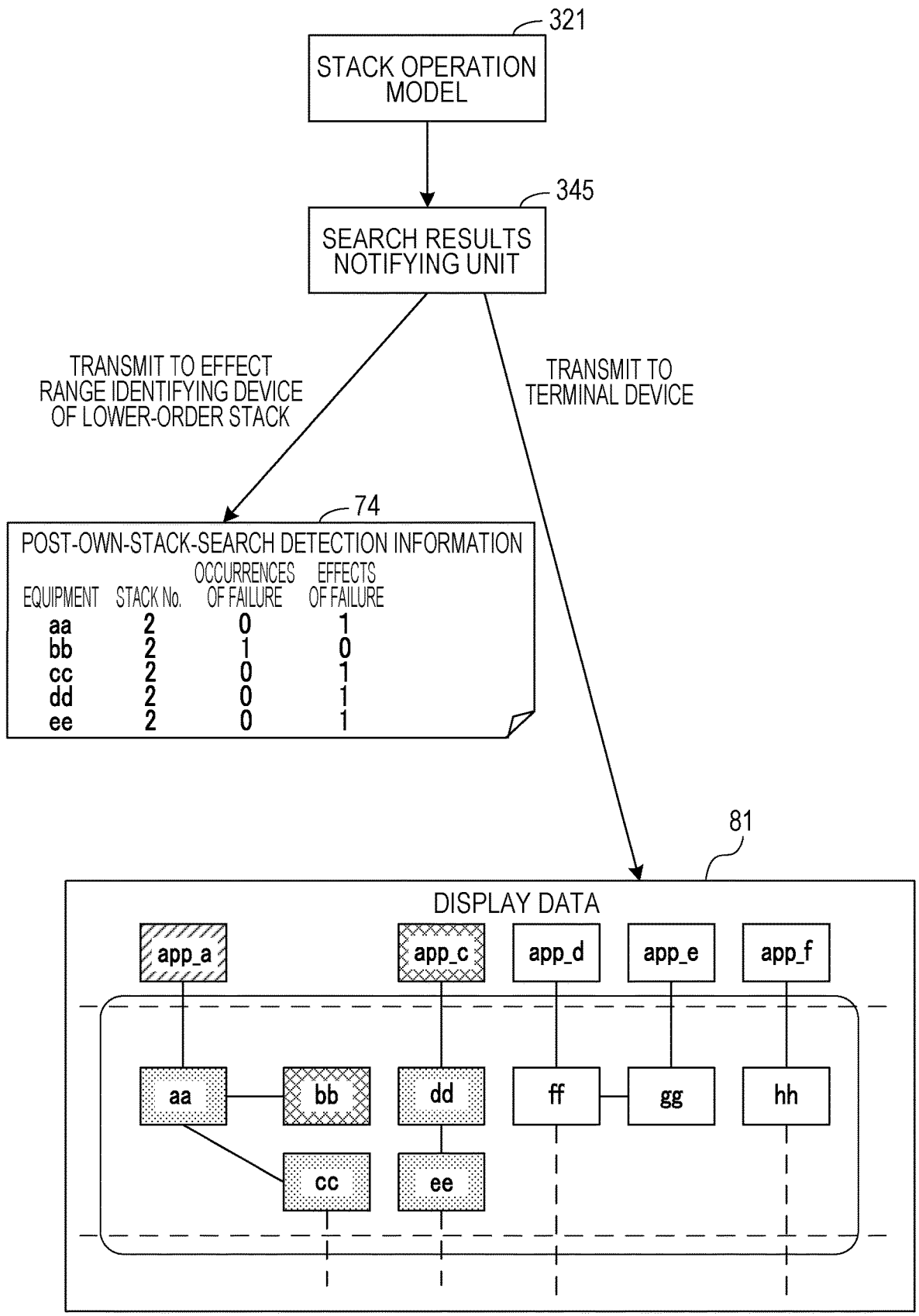
FIG. 26 is a diagram illustrating an example of search results notification processing in downflow processing.

FIG. 26 is a diagram illustrating an example of search results notification processing in downflow processing. The search results notifying unit 345 references the stack operation model 321, and generates post-own-stack-search detection information 74 indicating failure-detected equipment and failure-affected equipment in the stack 52. The search results notifying unit 345 then transmits the generated post-own-stack-search detection information 74 to the effect range identifying device 400 of the lower-order stack 51.

The search results notifying unit 345 also references the stack operation model 321 and generates display data 81 indicating the failure-detected equipment and failure-affected equipment at the higher-order stack 53 and the stack 52 to which it belongs, respectively. The search results notifying unit 345 then transmits the display data 81 to the terminal device 30 that the administrator of the stack 52 uses. Thus, an image corresponding to the display data 81 is displayed on the terminal device 30.

The display data 81 indicates the connection relation among equipment within the stack 52, and the connection relation between equipment in the stack 52 and equipment in the higher-order stack 53, for example. The display data 81 indicates the failure-detected equipment and failure-affected equipment in a highlighted display. For example, settings are made in the display data 81 so that the failure-detected equipment and failure-affected equipment are displayed in different colors.

Figure 27:
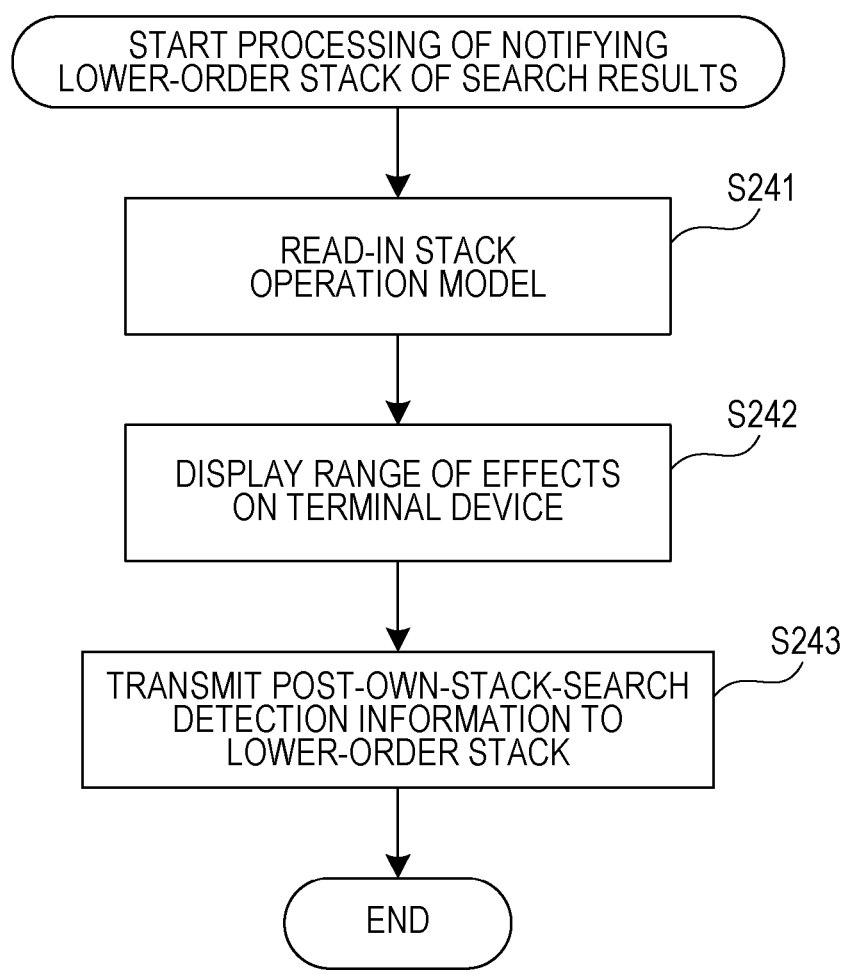
FIG. 27 is a flowchart illustrating an example of procedures of search results notification processing as to a lower-order stack.

FIG. 27 is a flowchart illustrating an example of procedures of search results notification processing to a lower-order stack. The processing illustrated in FIG. 27 will be described following the step numbers.

(Step S241) The search results notifying unit 345 reads in the stack operation model 321 from the stack operation model storage unit 320.

(Step S242) The search results notifying unit 345 transmits the display data 81 to the terminal device 30, so that the range of effects of failure at the stack 52 is displayed on the terminal device 30.

(Step S243) The search results notifying unit 345 transmits the post-own-stack-search detection information 74 indicating the search results of the range of effects at the stack 52, to the lower-order stack 51. Note that in a case where the stack 52 is the lowest-layer stack, transmission of the post-own-stack-search detection information 74 to the lower-order stack 51 is not performed.

Downflow processing is performed in this way. The post-own-stack-search detection information 74 transmitted in the downflow processing at the stack 52 is received by the effect range identifying device 400 of the lower-order stack 51. Downflow processing is then performed in the same way at the effect range identifying device 400. The downflow processing at the effect range identifying device 400 detects devices in the stack 51 that are in the range of effects of failure.

Figure 28:
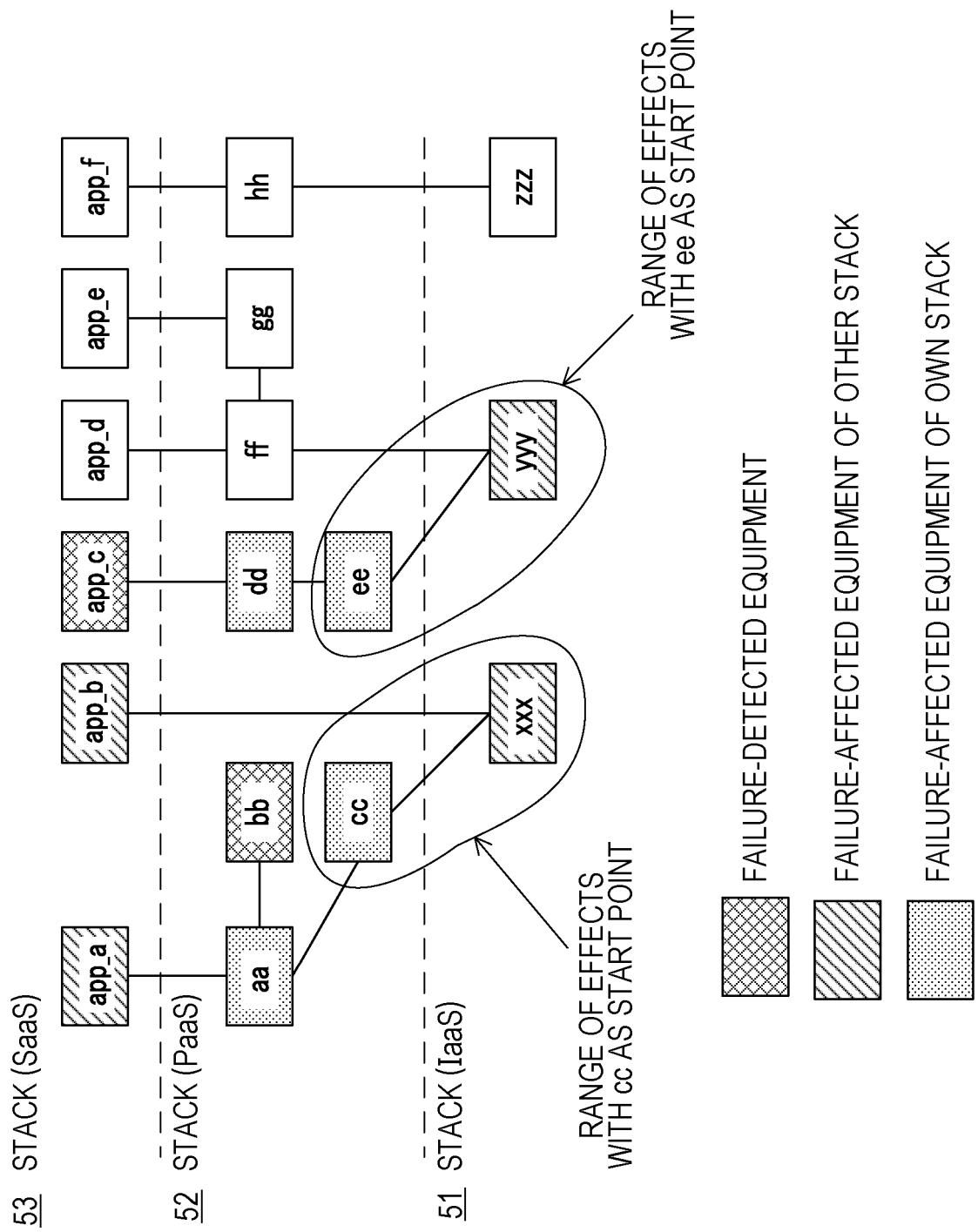
FIG. 28 is a diagram illustrating an example of a range of effects of failure at a lowest-order stack.

FIG. 28 is a diagram illustrating an example of the range of effects of failure at the lowest-layer stack. Effect range searching processing with equipment "cc" as the start point is executed at the effect range identifying device 400 of the stack 51, and equipment "xxx" is detected as failure-affected equipment, as illustrated in FIG. 28. Effect range searching processing with equipment "ee" as the start point is also executed, and equipment "yyy" is detected as failure-affected equipment.

After the downflow processing, the effect range identifying devices 200, 300, and 400 of the respective stacks execute upflow processing at a predetermined timing. The effect range identifying device 400 within the lowest-layer stack 51 starts the upflow processing when the downflow processing ends. The effect range identifying devices 200 and 300 of the stacks 52 and 53 other than the lowest-layer stack execute upflow processing upon receiving information indicating the search results of the range of effects at the lower-order stack. For example, at the stack 52, the upflow processing unit 350 performs upflow processing.

Figure 29:
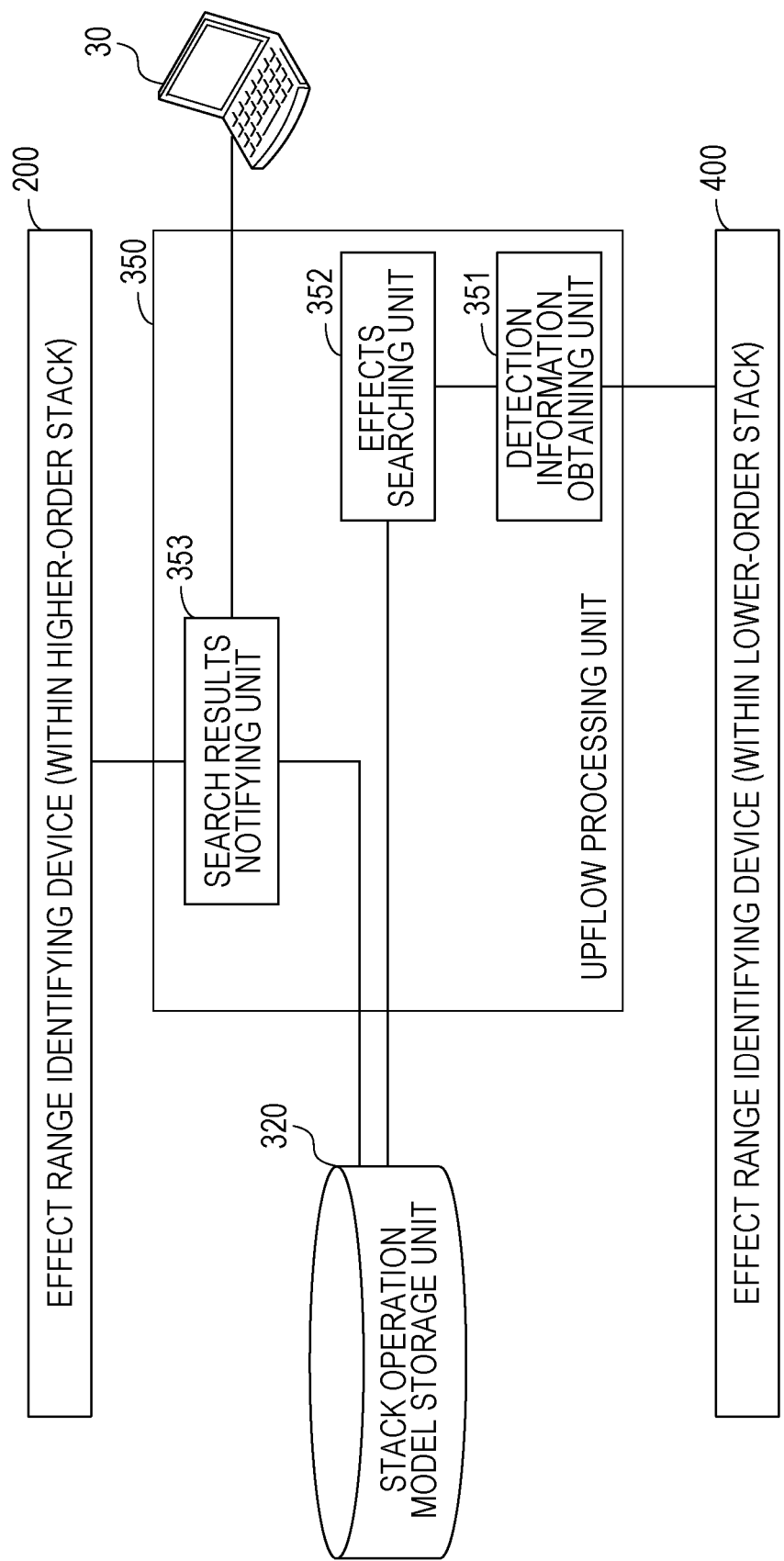
FIG. 29 is a diagram illustrating an example of functions of an upflow processing unit.

FIG. 29 is a diagram illustrating an example of functions of an upflow processing unit. The upflow processing unit 350 has a detection information obtaining unit 351, an effects searching unit 352, and a search results notifying unit 353.

The detection information obtaining unit 351 obtains information indicating failure-detected equipment and failure-affected equipment (lower-order stack detection information) from the effect range identifying device 400 of the lower-order stack 51. The effects searching unit 352 searches the range of effects of failure with the failure-detected equipment and failure-affected equipment indicated by the lower-order stack detection information as start points. The search results notifying unit 353 transmits information of the failure-detected equipment and failure-affected equipment detected at the stack 52, to the effect range identifying device 200 of the higher-order stack 53. The search results notifying unit 353 also notifies the terminal device 30 that the administrator of the stack 52 uses of the range of effects of failure.

Upon the upflow processing unit 350 receiving identifiers of the failure-detected equipment and failure-affected equipment regarding the failure that has occurred (lower-order stack detection information) from the effect range identifying device 400 of the lower-order stack 51, upflow processing is started.

Figure 30:
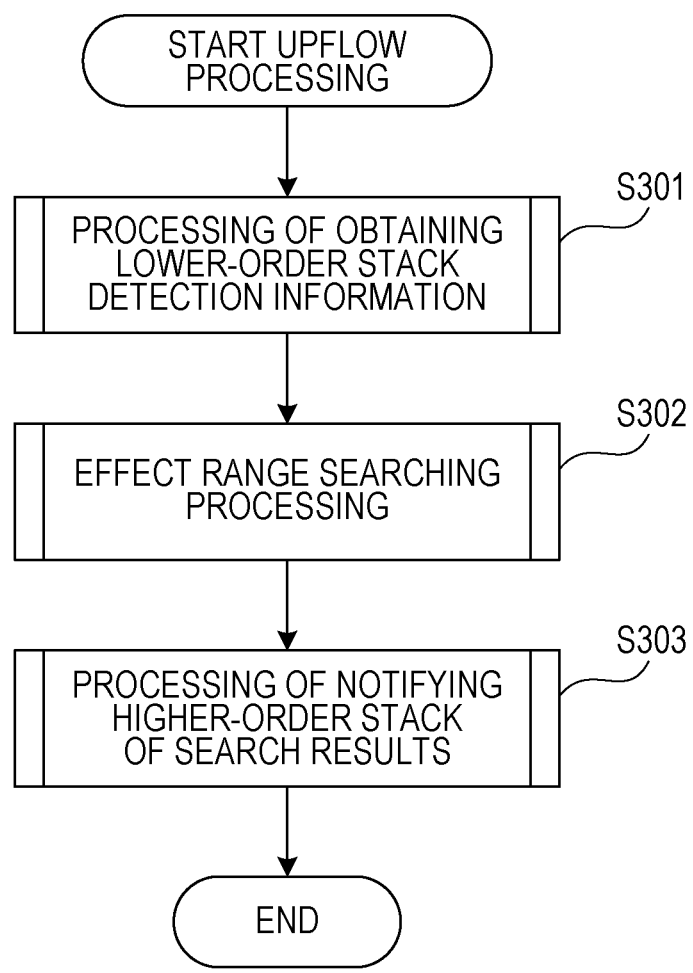
FIG. 30 is a diagram illustrating an example of procedures of upflow processing.

FIG. 30 is a diagram illustrating an example of procedures for upflow processing. The processing illustrated in FIG. 30 will be described below following the step numbers.

(Step S301) The detection information obtaining unit 351 performs processing of obtaining lower-order stack detection information. Details of the processing of obtaining detection information from the lower-order stack 51 will be described later (see FIG. 32).

(Step S302) The effects searching unit 352 performs effect range searching processing in the upflow. Details of effect range searching processing in the upflow will be described later (see FIG. 36).

(Step S303) The search results notifying unit 353 performs search results notification processing to the higher-order stack 53. Details of search results notification processing to the higher-order stack 53 will be described later (see FIG. 38).

When obtaining lower-order stack detection information, upflow processing is performed by these procedures.

Figure 31:
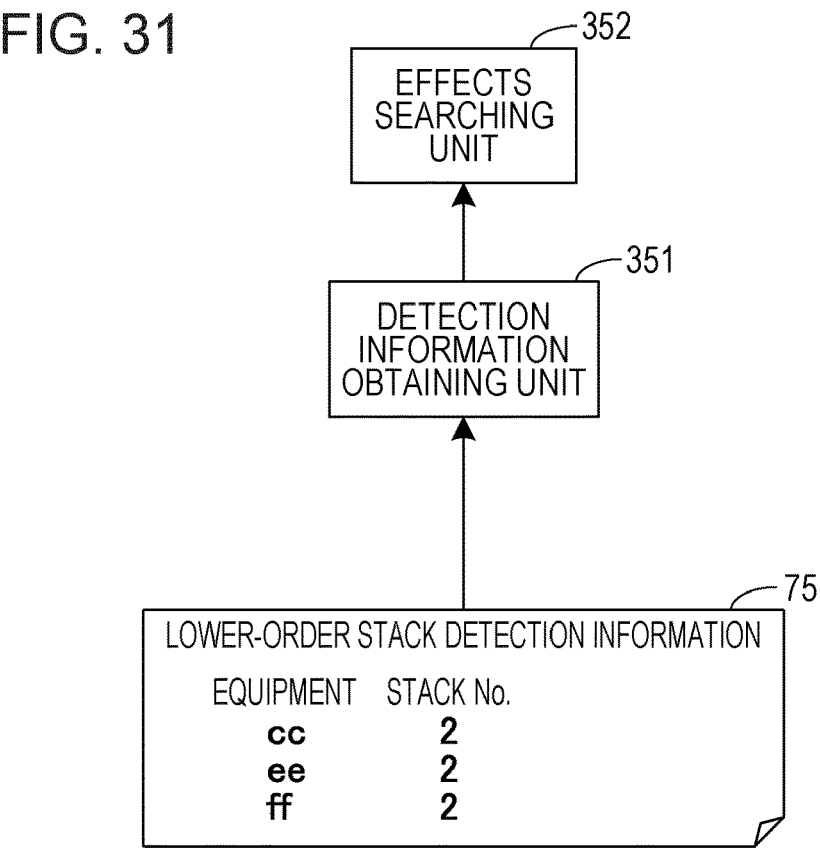
FIG. 31 is a diagram illustrating an example of lower-order stack detection information obtaining processing.

FIG. 31 is a diagram illustrating an example of the processing for obtaining lower-order stack detection information. In a case where failure-affected equipment such as illustrated in FIG. 28 is detected at the lower-order stack 51, the effect range identifying device 400 generates lower-order stack detection information 75 indicating equipment in the stack 52 connected to failure-affected equipment in the stack 51. The generated lower-order stack detection information 75 is transmitted from the effect range identifying device 400 to the effect range identifying device 300, whereupon the detection information obtaining unit 351 executes the processing for obtaining lower-order stack detection information.

Figure 32:
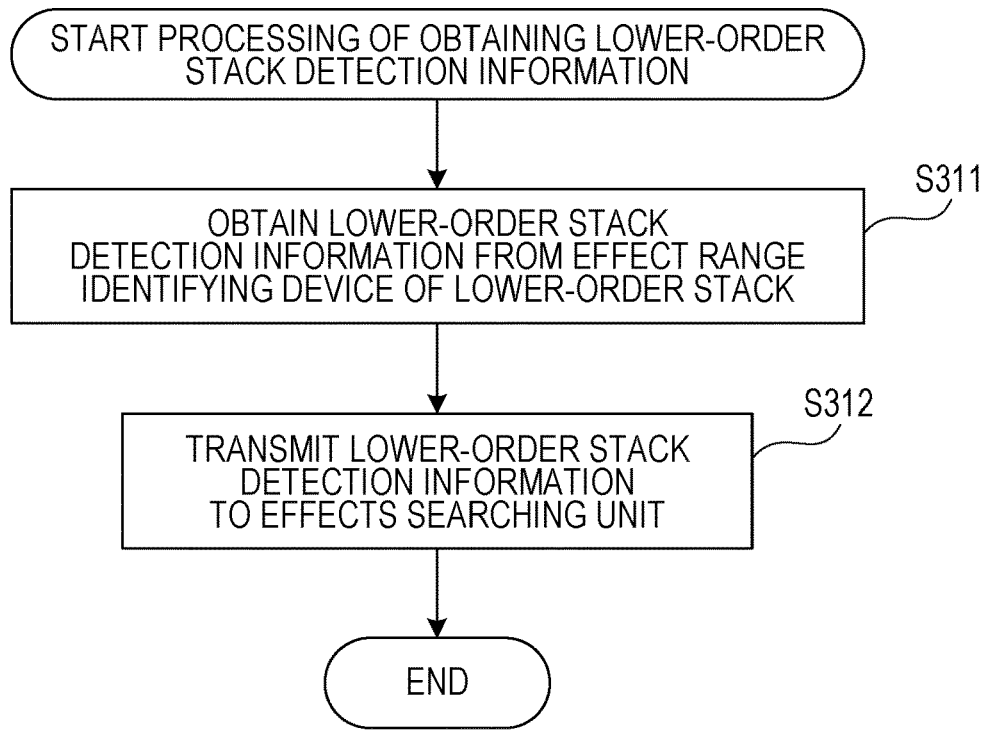
FIG. 32 is a flowchart illustrating an example of procedures of lower-order stack detection information obtaining processing.

FIG. 32 is a flowchart illustrating an example of procedures for processing for obtaining lower-order stack detection information. The processing illustrated in FIG. 32 will be described below following the step numbers.

(Step S311) The detection information obtaining unit 351 obtains the lower-order stack detection information 75 indicating equipment within the higher-order stack 52 dependent on the failure-affected equipment within the stack 51, from the effect range identifying device 400.

(Step S312) The detection information obtaining unit 351 transmits the obtained lower-order stack detection information 75 to the effects searching unit 352.

The effects searching unit 352 that has received the lower-order stack detection information 75 performs effect range searching processing.

Figure 33:
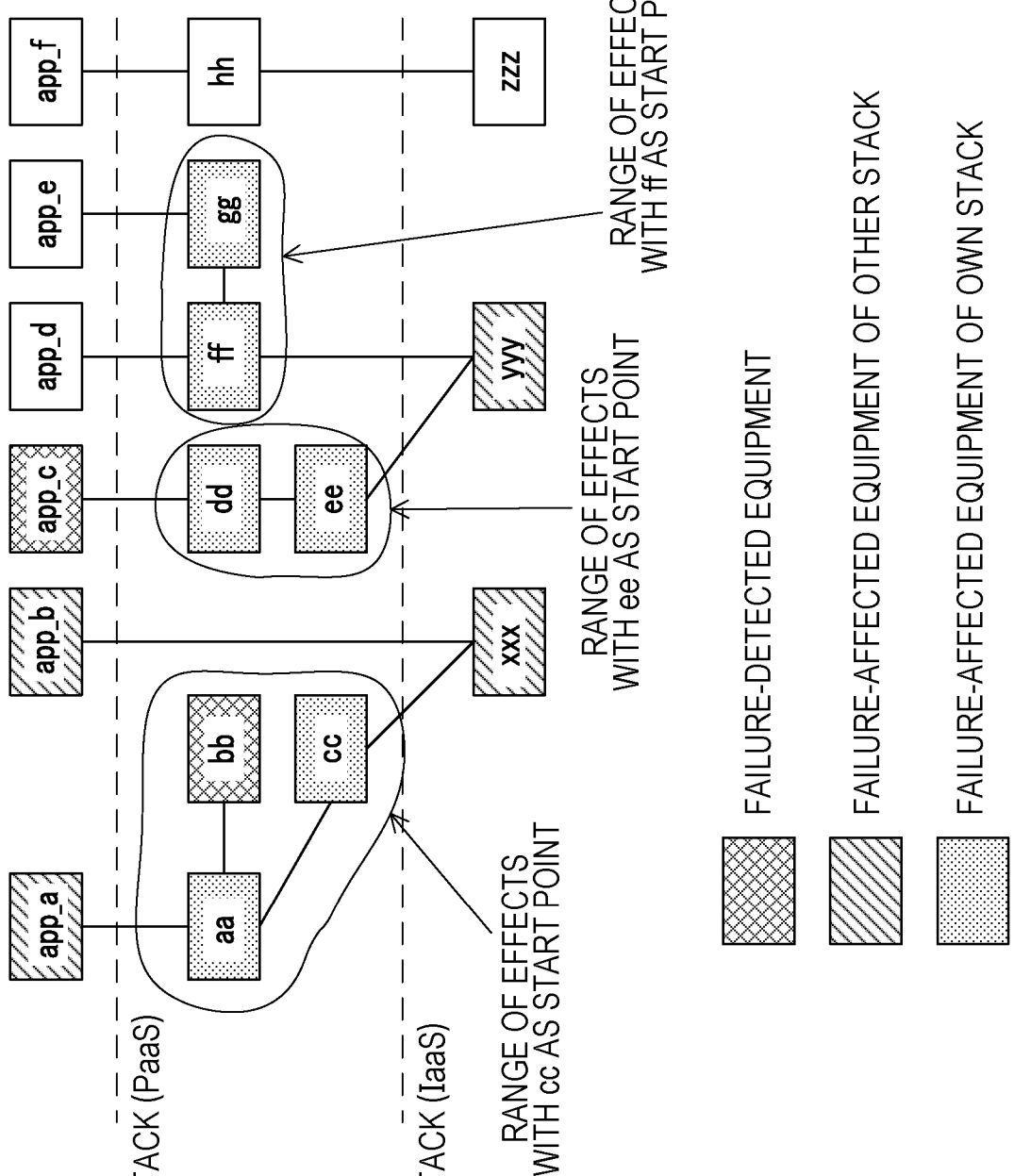
FIG. 33 is a diagram illustrating an example of effect range searching processing in an upflow.

FIG. 33 is a diagram illustrating an example of effect range searching processing in the upflow. The effects searching unit 352 searches for the range of effects of failure of equipment in the stack 52 connected to the failure-affected equipment in the lower-order stack 51 as the start point, based on the lower-order stack detection information 75. The effects searching unit 352 uses the effect range search route information 311 defined beforehand in the searching for the range of effects of failure. The effects searching unit 352 also updates the stack operation model 321 in accordance with the results of effect range searching.

In the example in FIG. 33, equipment "aa" and equipment "bb" in the stack 52 have been detected as being failure-affected equipment as a result of searching for the range of effects of failure with the equipment "cc" in the stack 52 as the start point. Also, equipment "dd" in the stack 52 has been detected as being failure-affected equipment as a result of searching for the range of effects of failure with the equipment "ee" in the stack 52 as the start point. Further, equipment "gg" in the stack 52 has been detected as being failure-affected equipment as a result of searching for the range of effects of failure with the equipment "ff" in the stack 52 as the start point.

The update state of the stack operation model 321 will be described below with reference to FIGS. 34 and 35.

Figure 34:
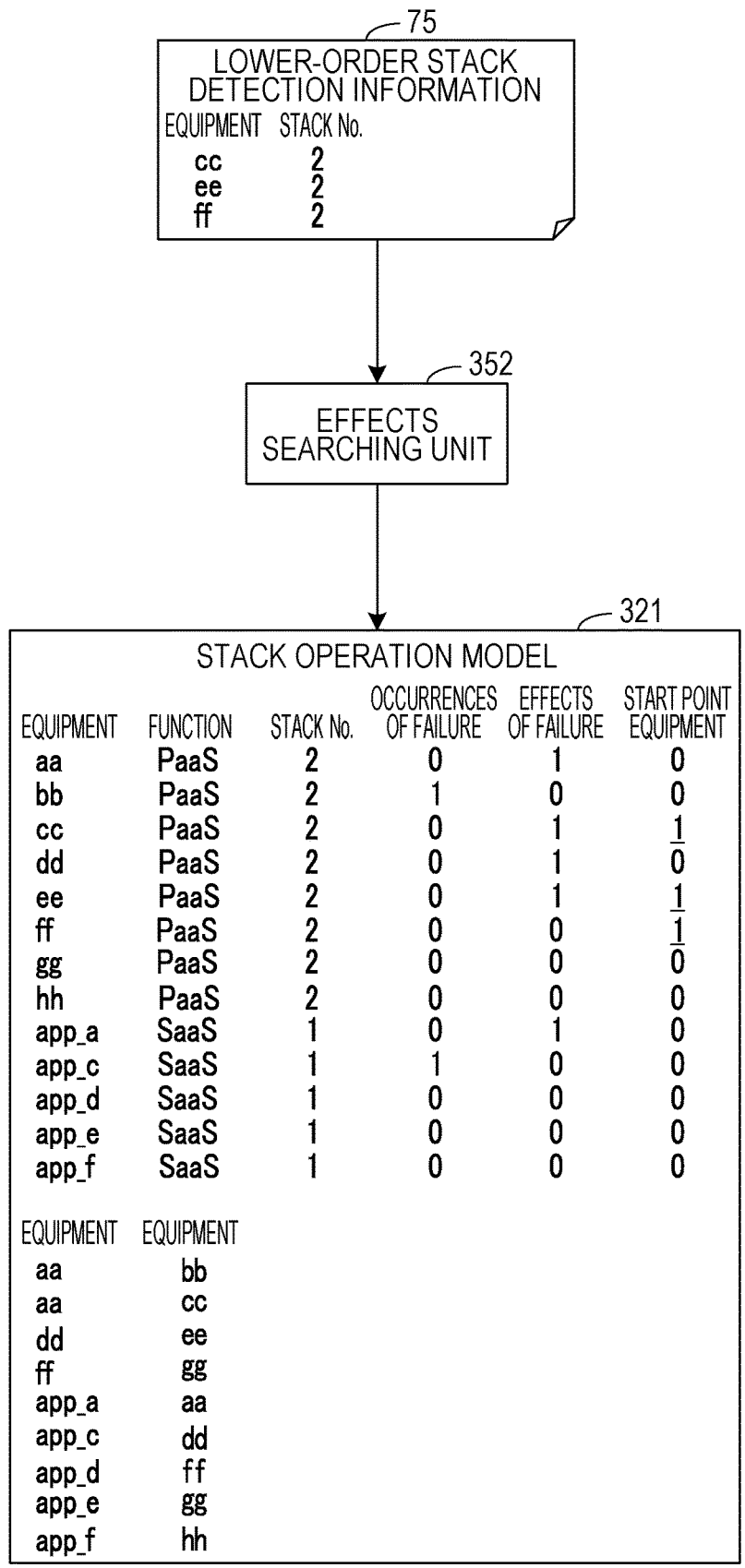
FIG. 34 is a diagram illustrating an example of a stack operation model in which lower-order stack detection information has been reflected.

FIG. 34 is a diagram illustrating an example of a stack operation model in which is reflected lower-order stack detection information. The effects searching unit 352 that has obtained the lower-order stack detection information 75 initializes the column of start point equipment in the stack operation model 321. The effects searching unit 352 sets information, indicating that the equipment in the stack 52 connected to the failure-affected equipment in the lower-order stack 51 is equipment to serve as a start point of a search, indicated in the lower-order stack detection information 75, to the stack operation model 321. In the example in FIG. 34, information indicating whether or not a device to serve as a start point of a search is changed to "1" for each of equipment "cc", "ee", and "ff".

Thereafter, the effects searching unit 352 searches the range of effects of failure, whereupon the stack operation model 321 is updated in accordance with the search results.

Figure 35:
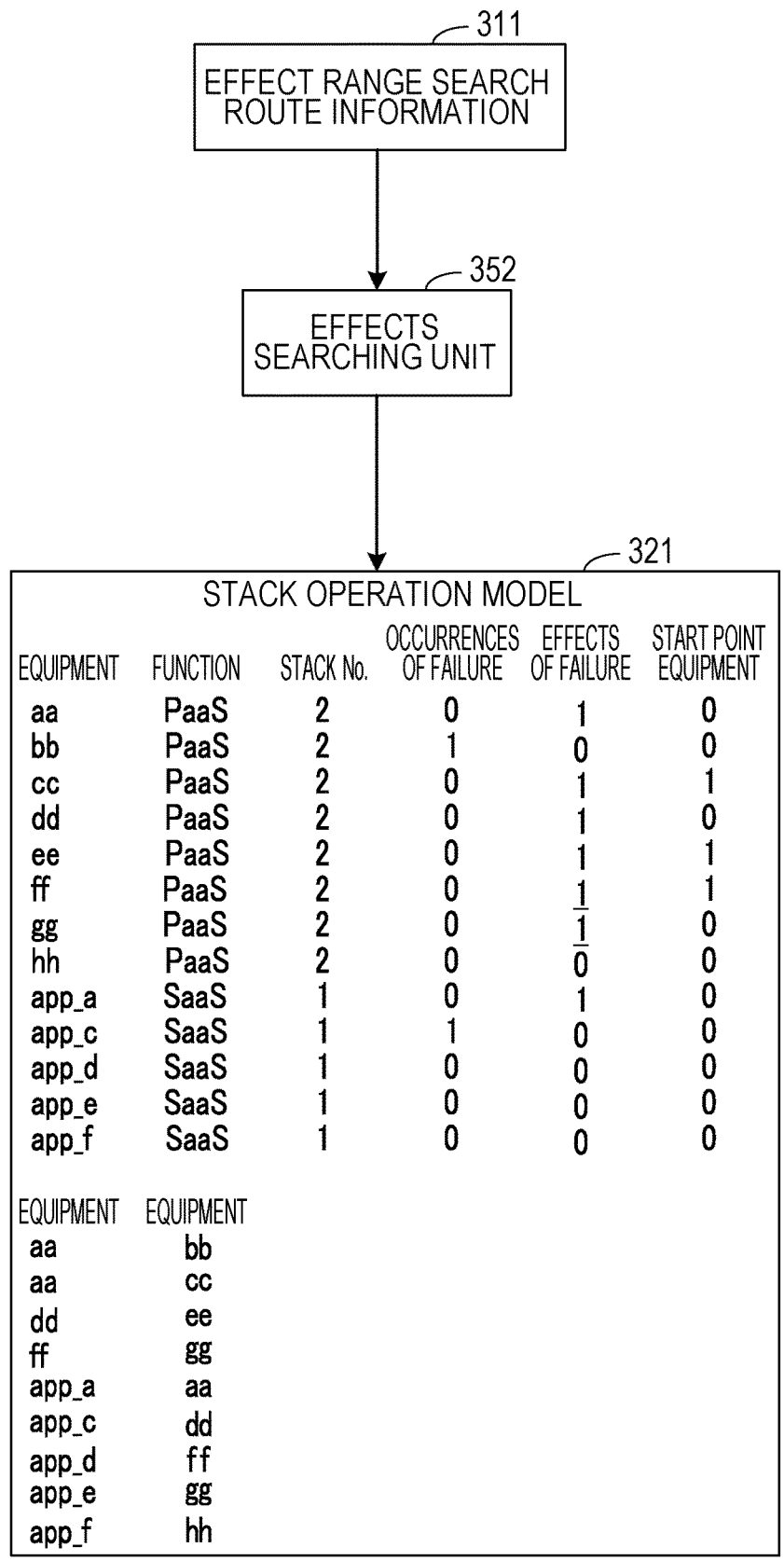
FIG. 35 is a diagram illustrating an example of a stack operation model in which search results of a range of effects in upflow processing have been reflected.

FIG. 35 is a diagram illustrating an example of a stack operation model in which is reflected the search results of the range of effects in upflow processing. The stack operation model 321 reflecting the search results illustrated in FIG. 33 is illustrated in FIG. 35. In the example in FIG. 35, the value of information indicating whether or not there are effects of the failure is changed to "1" for the records of each equipment "ff" and "gg".

Next, the procedures of effect range searching processing will be described with reference to a flowchart.

Figure 36:
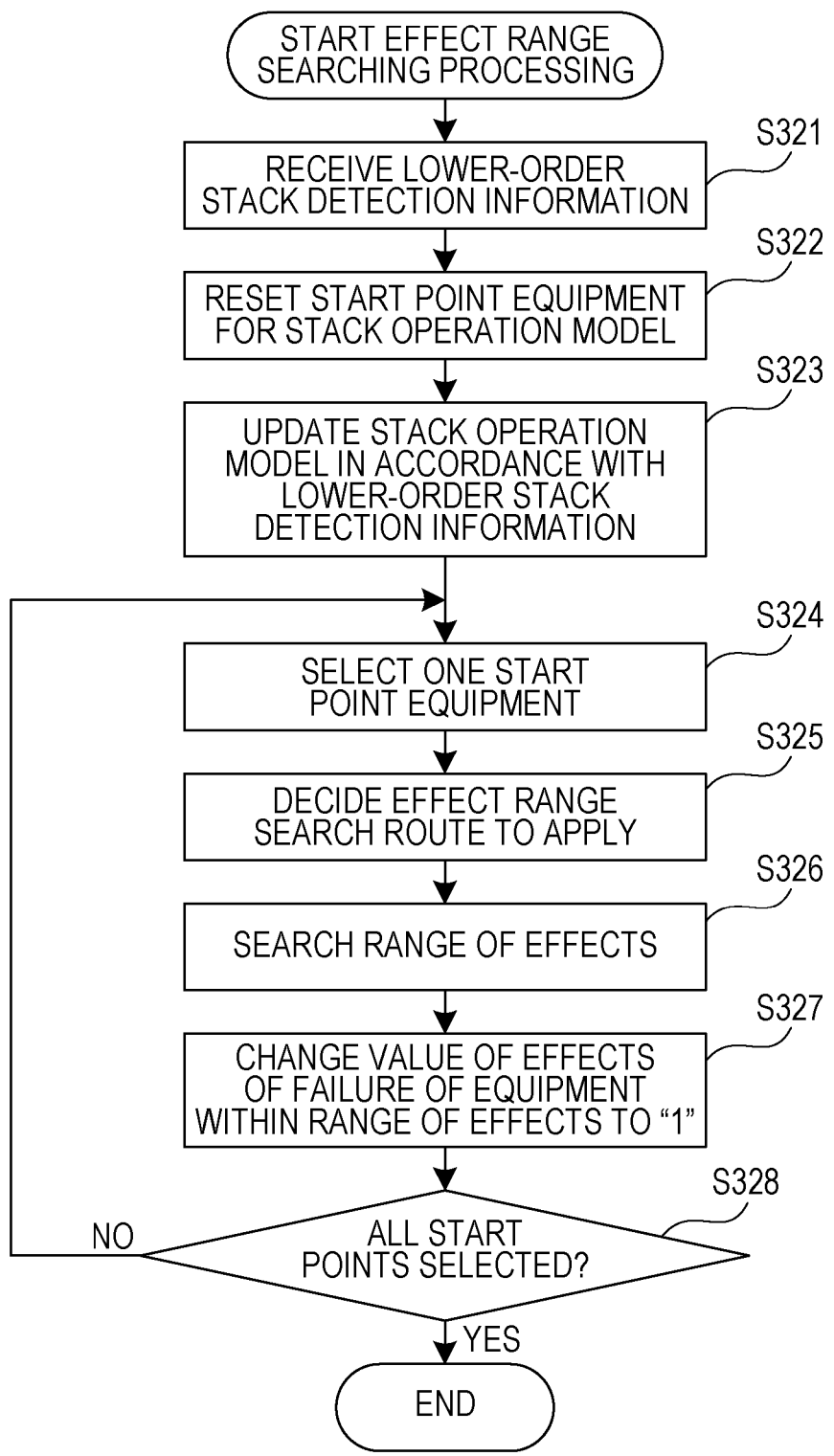
FIG. 36 is a flowchart illustrating an example of procedures of effect range searching processing in upflow processing.

FIG. 36 is a flowchart illustrating an example of procedures for effect range searching processing in upflow processing. The processing illustrated in FIG. 36 will be described below following the step numbers.

(Step S321) The effects searching unit 352 receives the lower-order stack detection information 75 from the detection information obtaining unit 351.

(Step S322) The effects searching unit 352 resets the value for start point equipment to "0" for all records of the stack operation model 321.

(Step S323) The effects searching unit 352 updates the stack operation model 321 based on the received lower-order stack detection information 75. For example, the effects searching unit 352 makes settings to the stack operation model 321 to the effect that equipment connected to the failure-affected equipment in the lower-order stack 51 will serve as start point equipment for effect range searching, as illustrated in FIG. 34.

(Step S324) The effects searching unit 352 selects one of the unselected start point equipment out of the equipment indicated in the stack operation model 321 to be a start point for searching (start point equipment).

(Step S325) The effects searching unit 352 decides an effect range search route to apply. For example, the effects searching unit 352 references the failure and search route correlation table 311a of the stack in the effect range search route information 311 (see FIG. 7), and obtains an identifier for the search route corresponding to the set of the type of failure that has occurred and the function of the failure-detected equipment. The effects searching unit 352 then references the search route information 311c and identifies the search route corresponding to the obtained identifier to be the effect range search route to apply.

(Step S326) The effects searching unit 352 searches for equipment within the range of effects, based on the effect range search route to apply. For example, the effects searching unit 352 starts searching from the start point equipment, and searches adjacent equipment of the function indicated in the effect range search route, in the order indicated by the effect range search route. The effects searching unit 352 judges equipment reached by the search to be equipment within the range of effects.

(Step S327) The effects searching unit 352 changes the value to "1" for information indicating whether or not there are effects of the failure, for equipment within the range of effects in the stack operation model 321.

(Step S328) The effects searching unit 352 judges whether or not all start point equipment has been selected. In a case where all start point equipment has been selected, the effects searching unit 352 ends the effect range searching processing. If there is unselected start point equipment, the effects searching unit 352 advances the flow to step S324.

Thus, failure effect range searching processing within the stack 52 is performed, and the stack operation model 321 is updated in accordance with the results of processing. Thereafter, search results notification processing is performed by the search results notifying unit 353.

Figure 37:
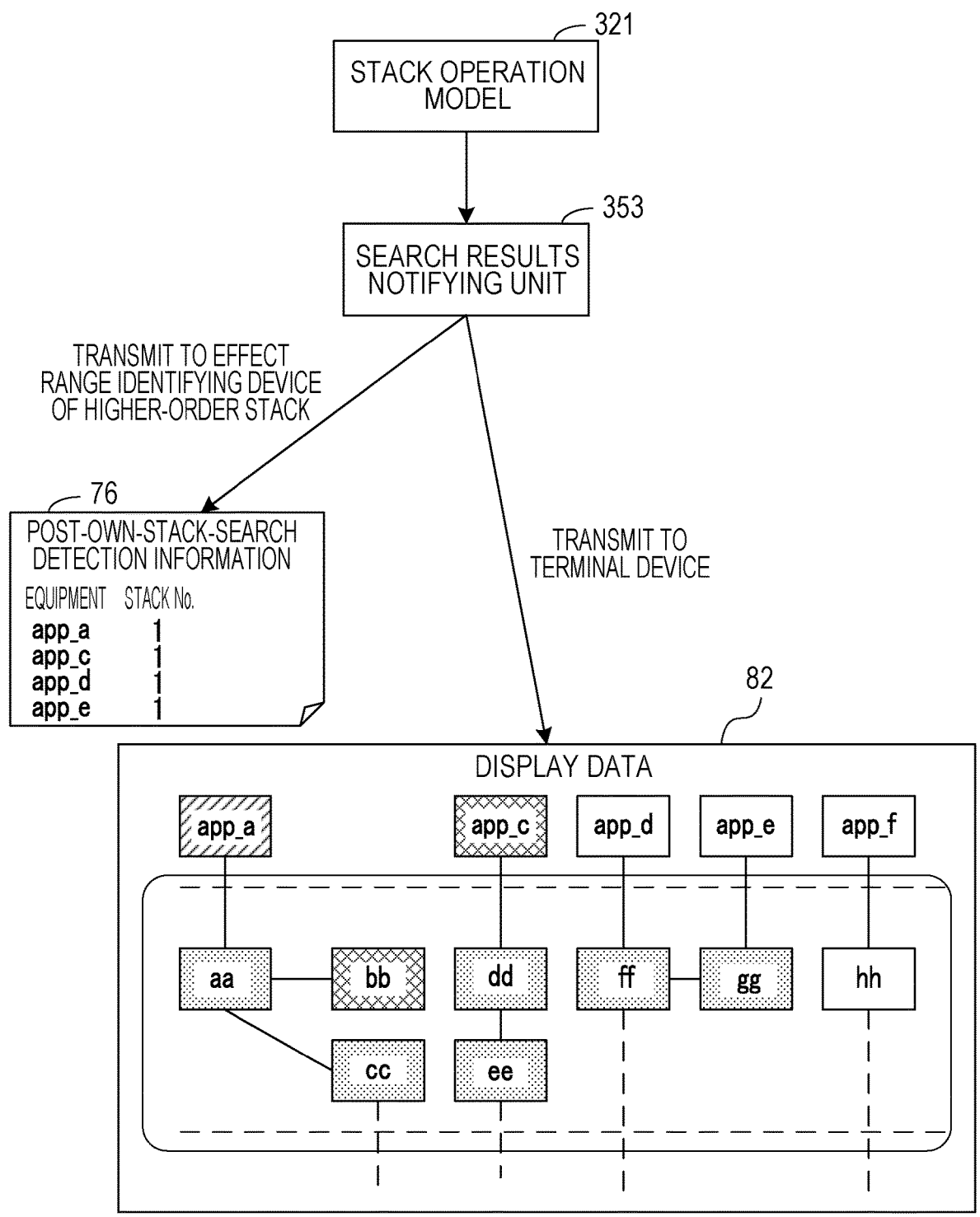
FIG. 37 is a diagram illustrating an example of search results notification processing in upflow processing.

FIG. 37 is a diagram illustrating an example of search results notification processing in upflow processing. The search results notifying unit 353 references the stack operation model 321, and generates post-own-stack-search detection information 76 indicating equipment in the higher-order stack 53 connected to any of the failure-detected equipment and failure-affected equipment in the stack 52. The search results notifying unit 353 then transmits the generated post-own-stack-search detection information 76 to the effect range identifying device 200 of the higher-order stack 53.

The search results notifying unit 353 also references the stack operation model 321 and generates display data 82 indicating the failure-detected equipment and failure-affected equipment at the higher-order stack 53 and the stack 52 to which it belongs, respectively. The search results notifying unit 353 then transmits the display data 82 to the terminal device 30 that the administrator of the stack 52 uses. Thus, an image corresponding to the display data 82 is displayed on the terminal device 30.

Figure 38:
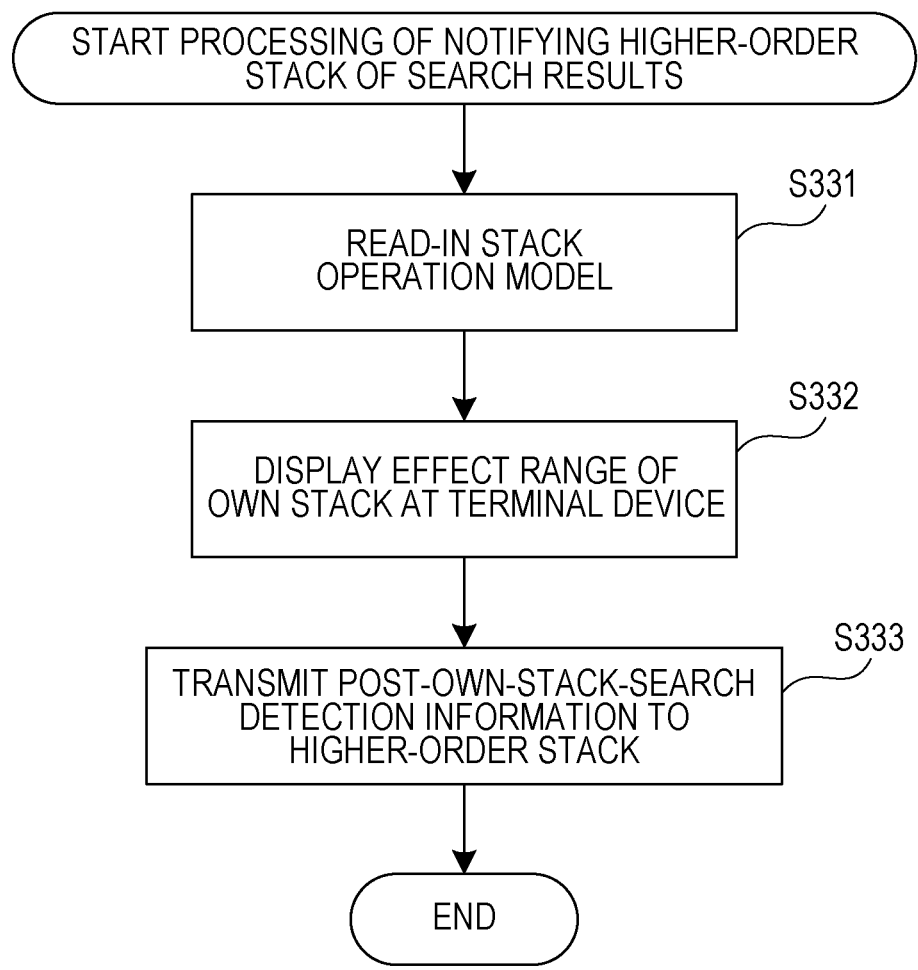
FIG. 38 is a flowchart illustrating an example of procedures of search results notification processing as to a higher-order stack.

FIG. 38 is a flowchart illustrating an example of procedures of search results notification processing to a higher-order stack. The processing illustrated in FIG. 38 will be described below following the step numbers.

(Step S331) The search results notifying unit 353 reads in the stack operation model 321 from the stack operation model storage unit 320.

(Step S332) The search results notifying unit 353 transmits the display data 82 to the terminal device 30, so that the range of effects of failure at the stack 52 is displayed on the terminal device 30.

(Step S333) The search results notifying unit 353 transmits the post-own-stack-search detection information 76 indicating the equipment of the higher-order stack 53 connected to the equipment in the stack 52 included in the range of effects (failure-detected equipment and failure-affected equipment), to the higher-order stack 53.

Upflow processing is performed in this way. Consequently, the range of effects of failure of equipment in the stack 52 is correctly displayed on the terminal device 30.

FIG. 39 is a diagram illustrating an example of a failure effect range display screen 83. The failure effect range display screen 83 is displayed at the terminal device 30, based on display data 81 and 82 transmitted from the effect range identifying device 300. In the example in FIG. 39, the display data 81 transmitted at the time of performing downflow processing is displayed as results of reflecting effects, from the higher-order stack 53. The display data 82 transmitted at the time of performing upflow processing also is displayed as results of reflecting effects, from the higher-order and lower-order stacks.

The administrator of the stack 52 may appropriately judge the range of effects of failure by referencing the failure effect range display screen 83. That is to say, the administrator may appropriately recognize not only propagation of effects of the failure within the stack 52, but also effects of the failure via the higher-order stack 53 or lower-order stack 51. As a result, when handling the failure, the administrator may minimize deterioration in quality of service due to the failure that has occurred, by handling, with priority, equipment that has a possibility of being affected by the failure.

Although display data has been described in the second embodiment as being output to the terminal device 30 in both downflow processing and upflow processing, output of display data in the downflow processing may be omitted, for example.

Third Embodiment

Next, a third embodiment will be described. The third embodiment involves overlaying search results of the range of effects of failure, thereby enabling distinguishing of the difference in the extent of effects of the failure that failure-affected equipment will receive.

For example, in the second embodiment, the effect range identifying device 300 of the stack 52 performs a search of the range of effects of failure with multiple pieces of equipment as start points in downflow processing and upflow processing. Thus, there will be equipment determined to be in the range of effects of failure from multiple different start points. The greater the number of times of having been determined to be in the range of effects in the effect range search, the greater the probability of being affected by the failure may be conceived to be. Accordingly, in the third embodiment, the number of times of having been determined to be in the range of effects is counted for each piece of equipment at each of the effect range identifying devices 200, 300, and 400, and the counted value is displayed as the severity for each piece of equipment. Accordingly, the administrator may comprehend the difference in the probability that each of the multiple pieces of failure-affected equipment will be affected by the failure. Consequently, a situation where the administrator starts researching and handling from equipment that is not important, while leaving the most important equipment unattended to, may be suppressed.

Points of difference between the third embodiment and the second embodiment will be described below.

A severity column is provided to the stack operation model in the third embodiment instead of the effects of failure column, and the number of times of having been determined to be in the range of effects of failure is set in the severity column.

Figure 40:
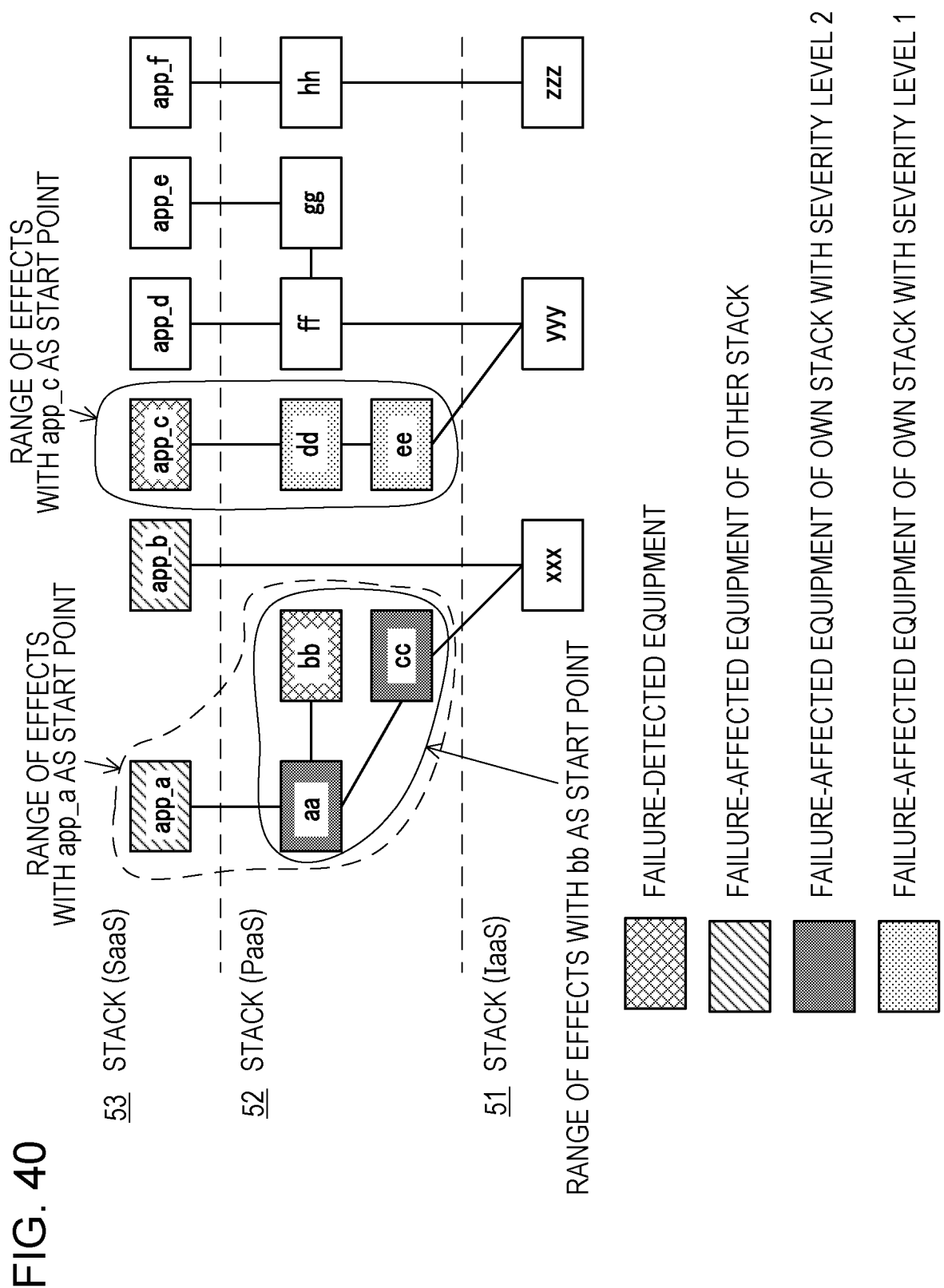
FIG. 40 is a diagram illustrating an example of effect range search processing in downflow processing according to a third embodiment.

FIG. 40 is a diagram illustrating an example of effect range searching processing in downflow processing according to the third embodiment. In the example in FIG. 40, the equipment "aa" and "cc" in the stack 52 are within the range of effects when the equipment "app_a" in the stack 53 is the start point, and also are in the range of effects when the equipment "bb" in the stack 52 is the start point. As a result, the severity for the equipment "aa" and "cc" is "2". On the other hand, the equipment "dd" and "cc" in the stack 52 are within the range of effects when the equipment "app_c" in the stack 53 is the start point, so the severity for the equipment "dd" and "cc" is "1".

Figure 41:
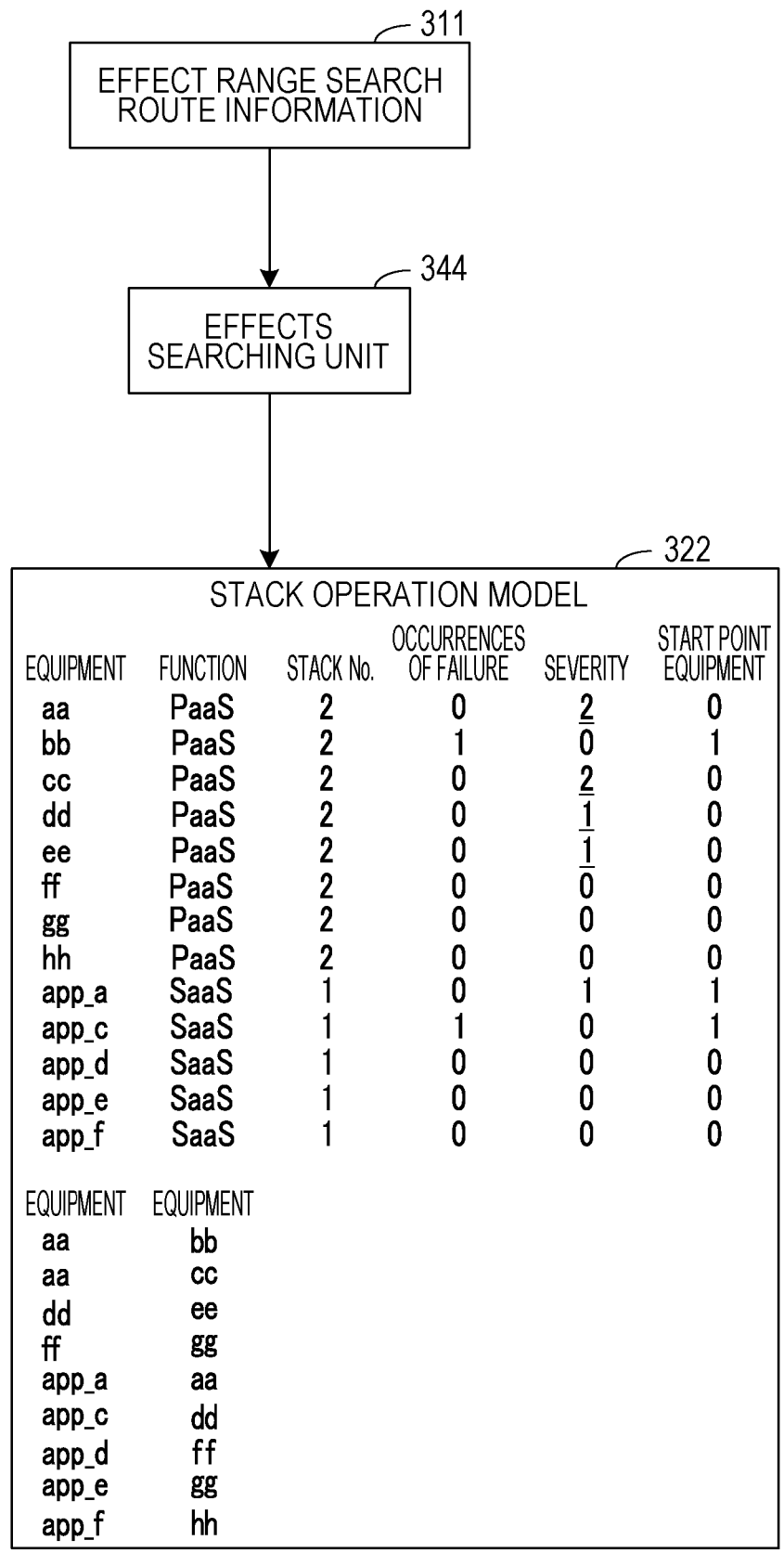
FIG. 41 is a diagram illustrating an example of a stack operation model in which there have been reflected search results of the range of effects in downflow processing according to a third embodiment.

FIG. 41 is a diagram illustrating an example of a stack operation model in which has been reflected the search results for the range of effects in the downflow processing according to the third embodiment. When updating a stack operation model 322 in accordance with the search results for the range of effects, the effects searching unit 344 sets the number of times that each piece of equipment has been detected as being within the range of effects (severity) as the value in the column of severity for the record corresponding to that equipment. In the example in FIG. 40, the value in the column for severity is "2" for the records of the equipment "aa" and "cc" in the stack operation model 322. The value in the column for severity is "1" for the records of the equipment "dd" and "cc" in the stack operation model 322.

Next, the procedures for effect range search processing in the downflow processing will be described.

Figure 42:
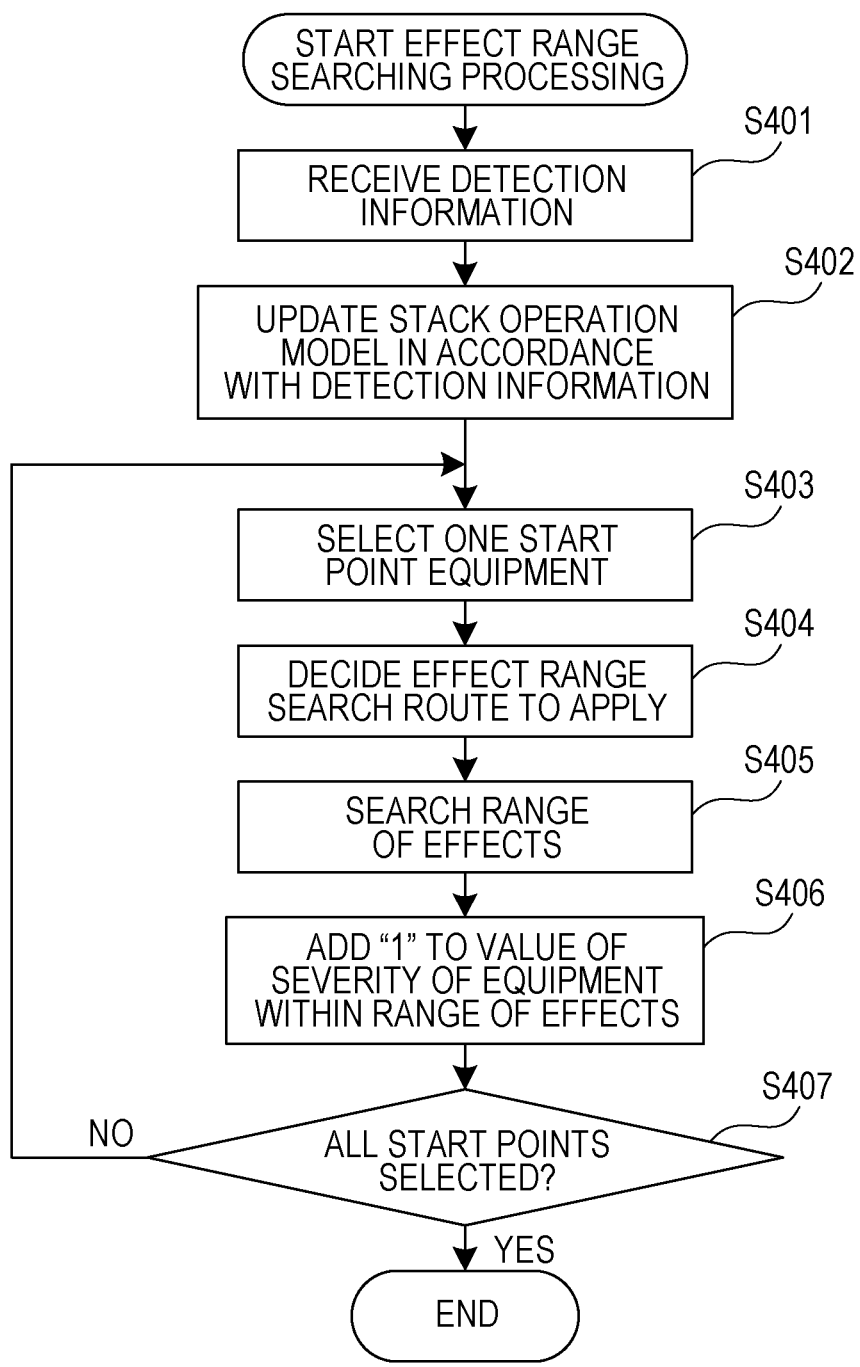
FIG. 42 is a flowchart illustrating an example of range of effects search processing in downflow processing according to the third embodiment.

FIG. 42 is a flowchart illustrating an example of procedures for downflow processing according to the third embodiment. Of the processes in FIG. 42, steps S401 through S405 and S407 are each the same as the steps S231 through S235 and S237 of the processes in the second embodiment illustrated in FIG. 25. Accordingly, the processing of step S406 that differs from the second embodiment will be described below.

(Step S406) The effects searching unit 344 increments by "1" the value in the column for severity of the record of equipment within the range of effects in the stack operation model 322.

Thus, each time equipment is detected as being in the range of effects in the effect range searching processing, the value in the column for severity is incremented by 1, so the number of times of each piece of equipment having been detected as being in the range of effects of failure may be counted. The search results notifying unit 345 then transmits information including the number of times of being within the range of effects as severity, to the effect range identifying device 400 of the lower-order stack 51 and the terminal device 30.

Figure 43:
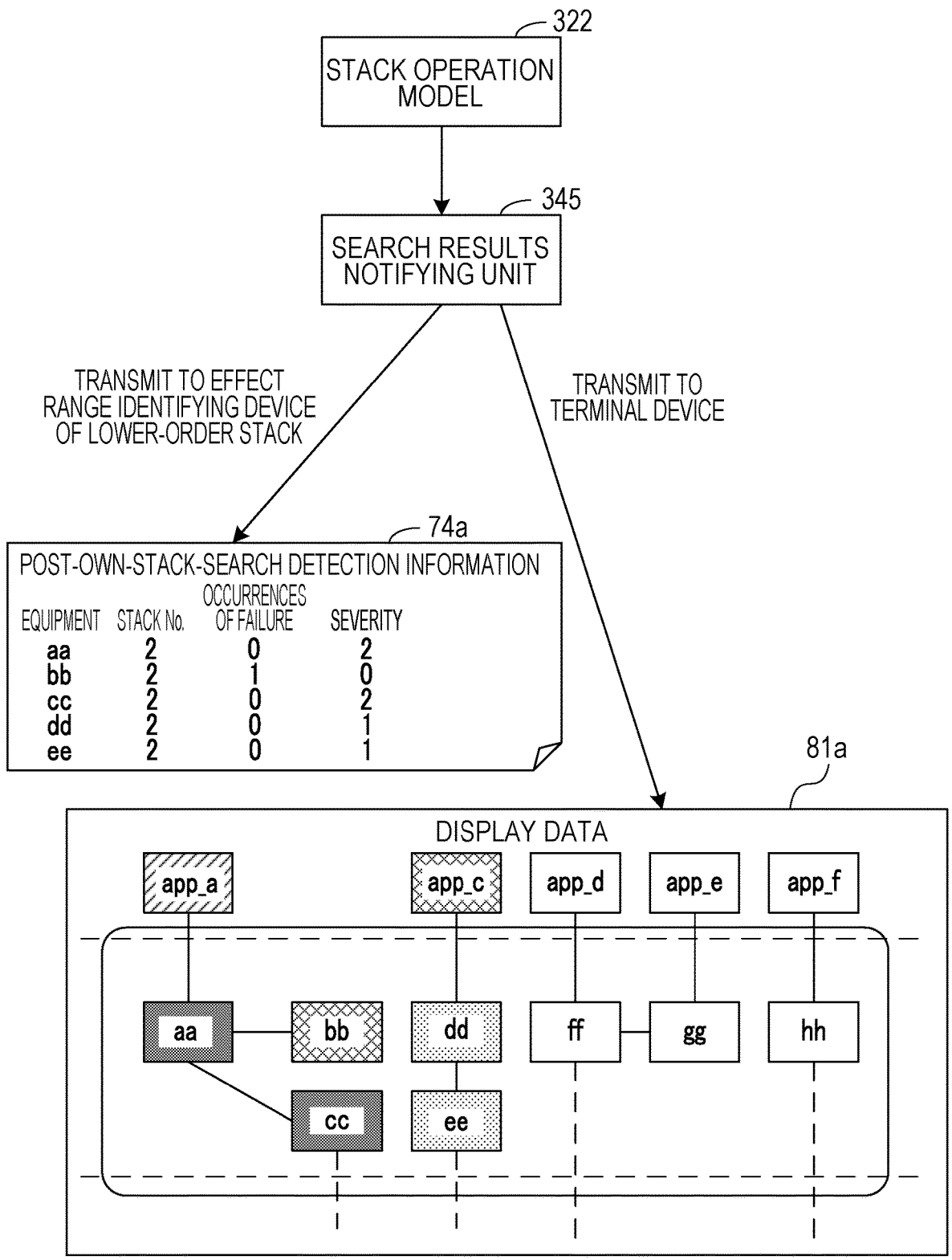
FIG. 43 is a diagram illustrating an example of search results notification processing in downflow processing according to the third embodiment.

FIG. 43 is a diagram illustrating an example of search results notification processing in the downflow processing according to the third embodiment. The search results notifying unit 345 references the stack operation model 322, and generates post-own-stack-search detection information 74a indicating failure-detected equipment and failure-affected equipment in the stack 52. The post-own-stack-search detection information 74a indicates the severity of the failure regarding failure-affected equipment. The search results notifying unit 345 then transmits the generated post-own-stack-search detection information 74a to the effect range identifying device 400 of the lower-order stack 51.

The search results notifying unit 345 also references the stack operation model 322 and generates display data 81a indicating the failure-detected equipment and failure-affected equipment at the higher-order stack 53 and the stack 52 to which it belongs, respectively. The display data 81a has the display form for failure-affected equipment set to a display form corresponding to the severity. For example, the color of an object indicating failure-affected equipment is set to a different color for each severity.

The search results notifying unit 345 then transmits the display data 81a to the terminal device 30 that the administrator of the stack 52 uses. Thus, an image corresponding to the display data 81a is displayed on the terminal device 30.

This so far is the downflow processing according to the third embodiment. The severity is also updated in upflow processing as well. The processing of obtaining lower-order stack detection information in the upflow processing according to the third embodiment is the same as in the second embodiment. Accordingly, the lower-order stack detection information 75 illustrated in FIG. 31 is transmitted to the effects searching unit 352. The effects searching unit 352 then performs effect range searching processing in the upflow processing, with equipment indicated by the lower-order stack detection information 75 as start points.

Figure 44:
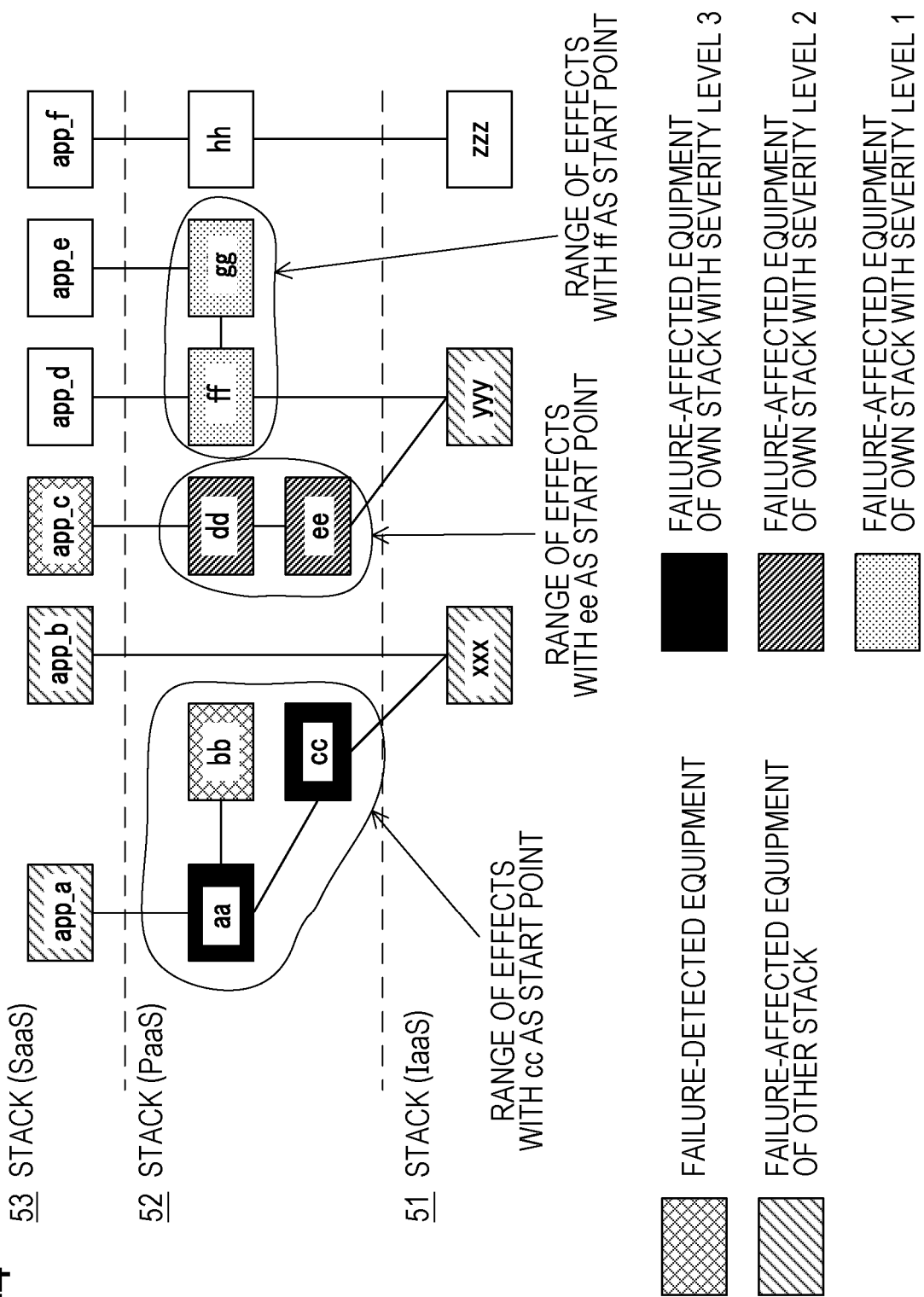
FIG. 44 is a diagram illustrating an example of effect range search processing in an upflow in the third embodiment.

FIG. 44 is a diagram illustrating an example of effect range searching processing in the upflow according to the third embodiment. The effects searching unit 352 increments the value of severity within the stack operation model 322 regarding equipment within the range of effects detected by the effect range searching processing, as illustrated in FIG. 44.

The update state of the stack operation model 322 will be described below with reference to frigs. 45 and 46.

Figure 45:
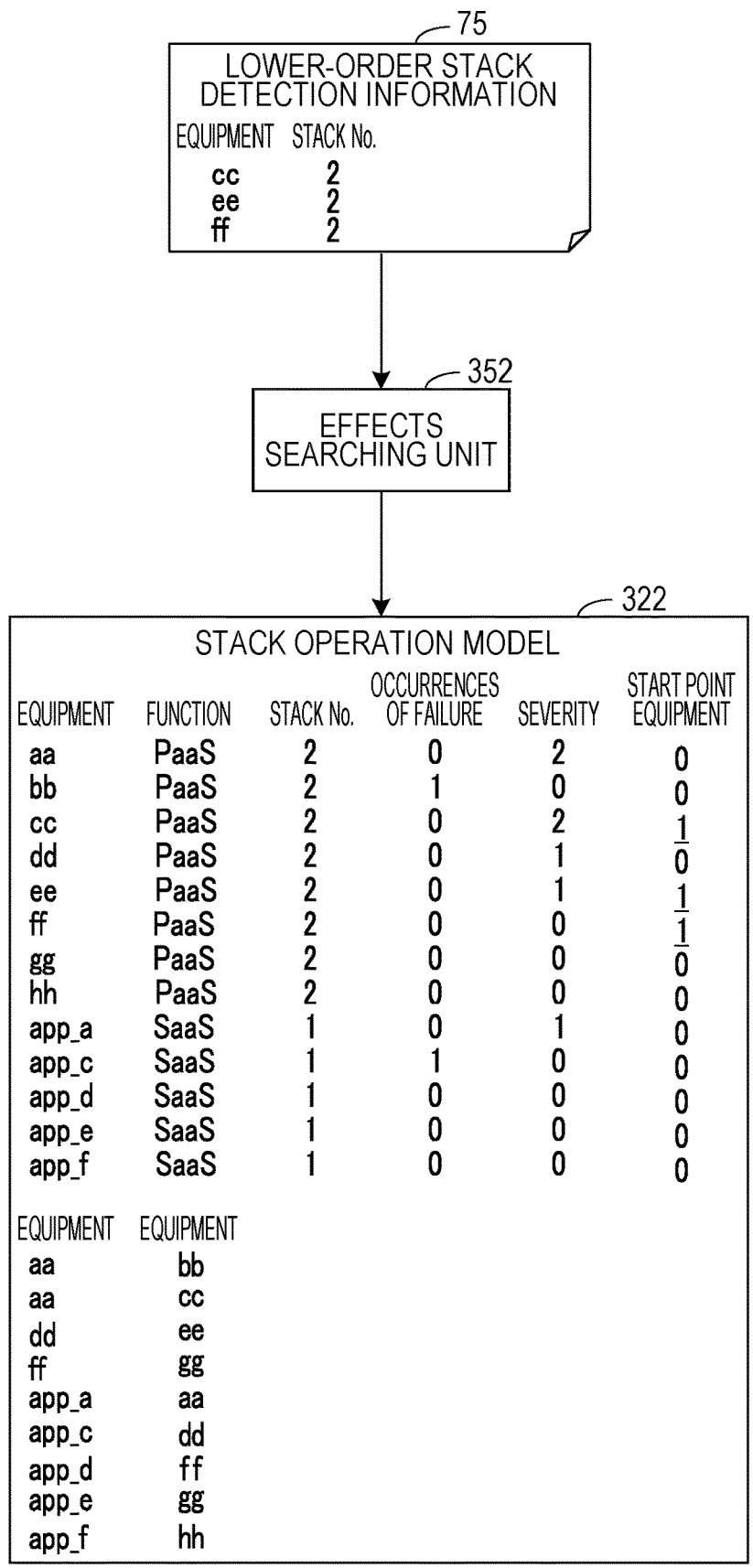
FIG. 45 is a diagram illustrating an example of a stack operation model in which lower-order stack detection information according to the third embodiment has been reflected.

FIG. 45 is a diagram illustrating an example of a stack operation model in which is reflected lower-order stack detection information according to the third embodiment. The effects searching unit 352 that has obtained the lower-order stack detection information 75 initializes the column of start point equipment in the stack operation model 322. The effects searching unit 352 sets information, indicating that the equipment in the stack 52 connected to the failure-affected equipment in the lower-order stack 51 is equipment to serve as a start point of a search, indicated in the lower-order stack detection information 75, to the stack operation model 322.

Thereafter, the effects searching unit 352 searches the range of effects of failure, whereupon the stack operation model 322 is updated in accordance with the search results.

Figure 46:
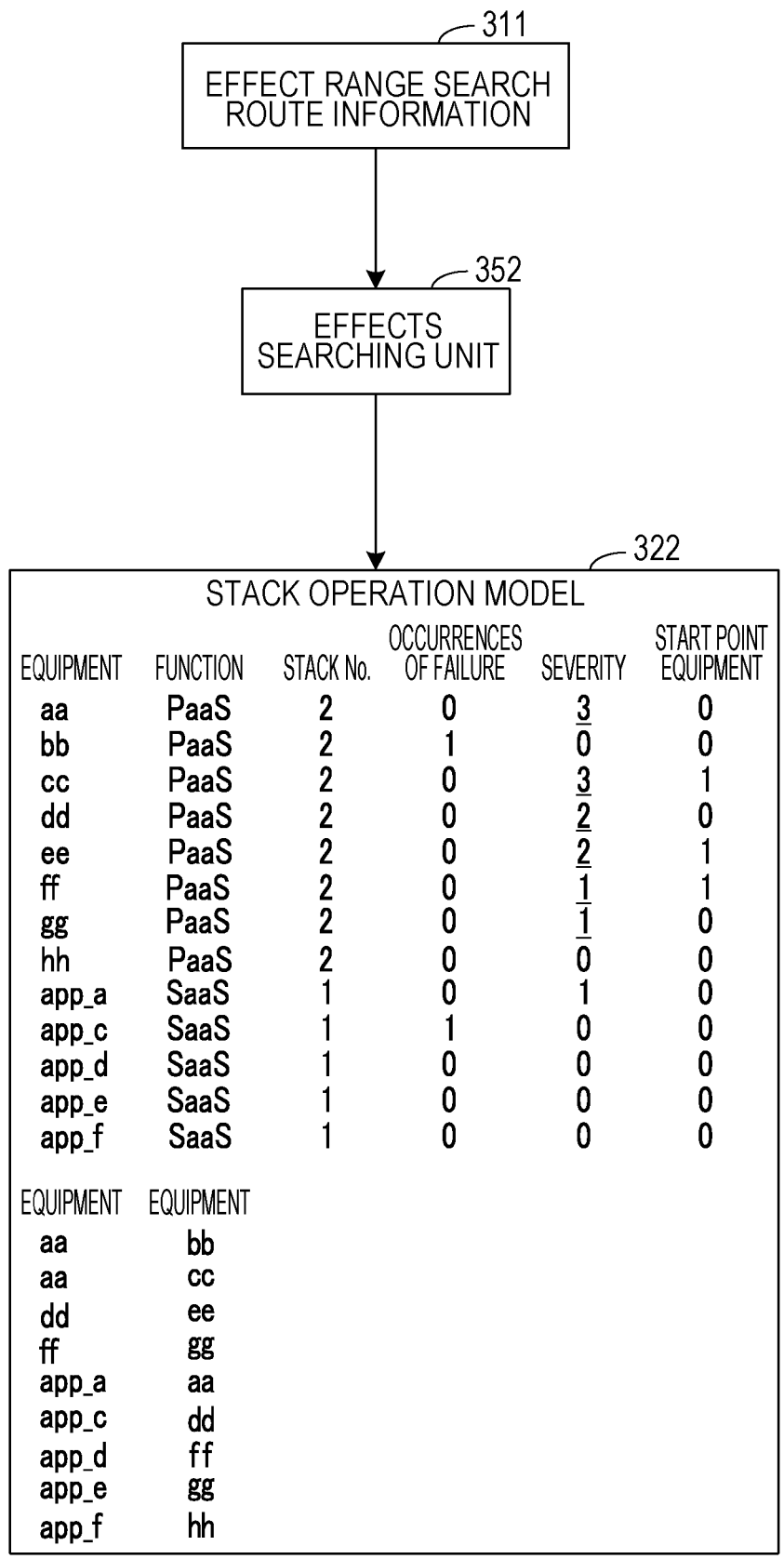
FIG. 46 is a diagram illustrating an example of a stack operation model in which there have been reflected search results of the range of effects in upflow processing according to the third embodiment.

FIG. 46 is a diagram illustrating an example of a stack operation model in which is reflected the search results of the range of effects in upflow processing according to the third embodiment. The stack operation model 322 reflecting the search results illustrated in FIG. 44 is illustrated in FIG. 46. The value of severity is incremented by "1" for the records of each of equipment "aa", "cc", "dd", "ee", "ff", and "gg" in the stack operation model 322.

Next, the procedures of effect range searching processing will be described with reference to a flowchart.

Figure 47:
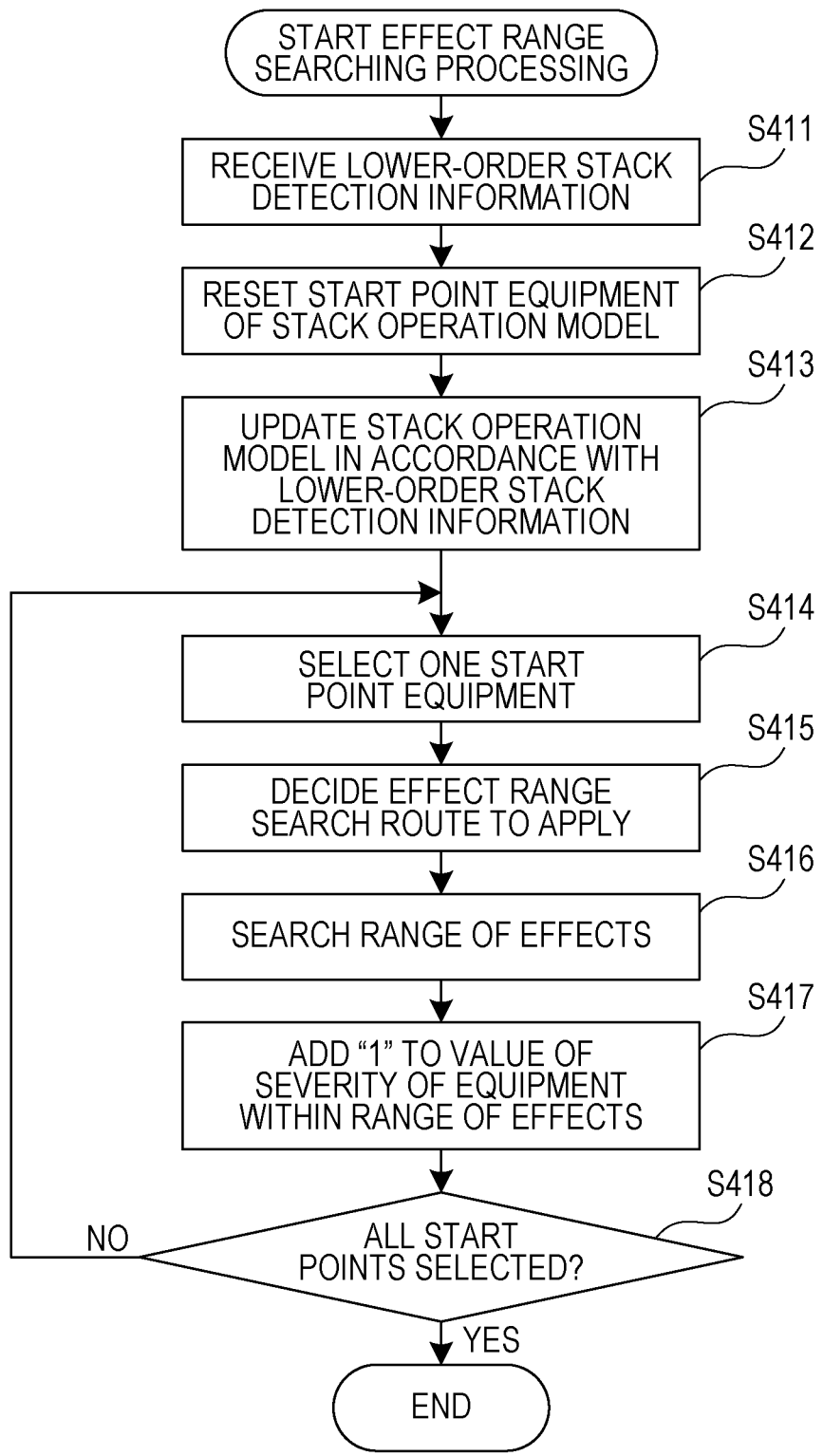
FIG. 47 is a flowchart illustrating an example of procedures of effect range searching processing in upflow processing according to the third embodiment.

FIG. 47 is a flowchart illustrating an example of the procedures of effect range searching processing in the upflow processing according to the third embodiment. Of the processing illustrated in FIG. 47, the processes of steps S411 through S416 and S418 are each the same as steps S321 through S326 and S328 of the processing according to the second embodiment illustrated in FIG. 36. The processing of step S417 that differs from the second embodiment will be described below.

(Step S417) The effects searching unit 352 increments the value in the column of severity by "1" for the records corresponding to equipment in the range of effects in the stack operation model 322.

Accordingly, each time of being detected within the range of effects by effect range searching in the upflow processing, the severity of each piece of equipment counted in the downflow processing is incremented by 1. The search results notifying unit 353 transmits information including the number of times of being within the range of effects as severity to the effect range identifying device 200 of the higher-order stack 53 and the terminal device 30.

Figure 48:
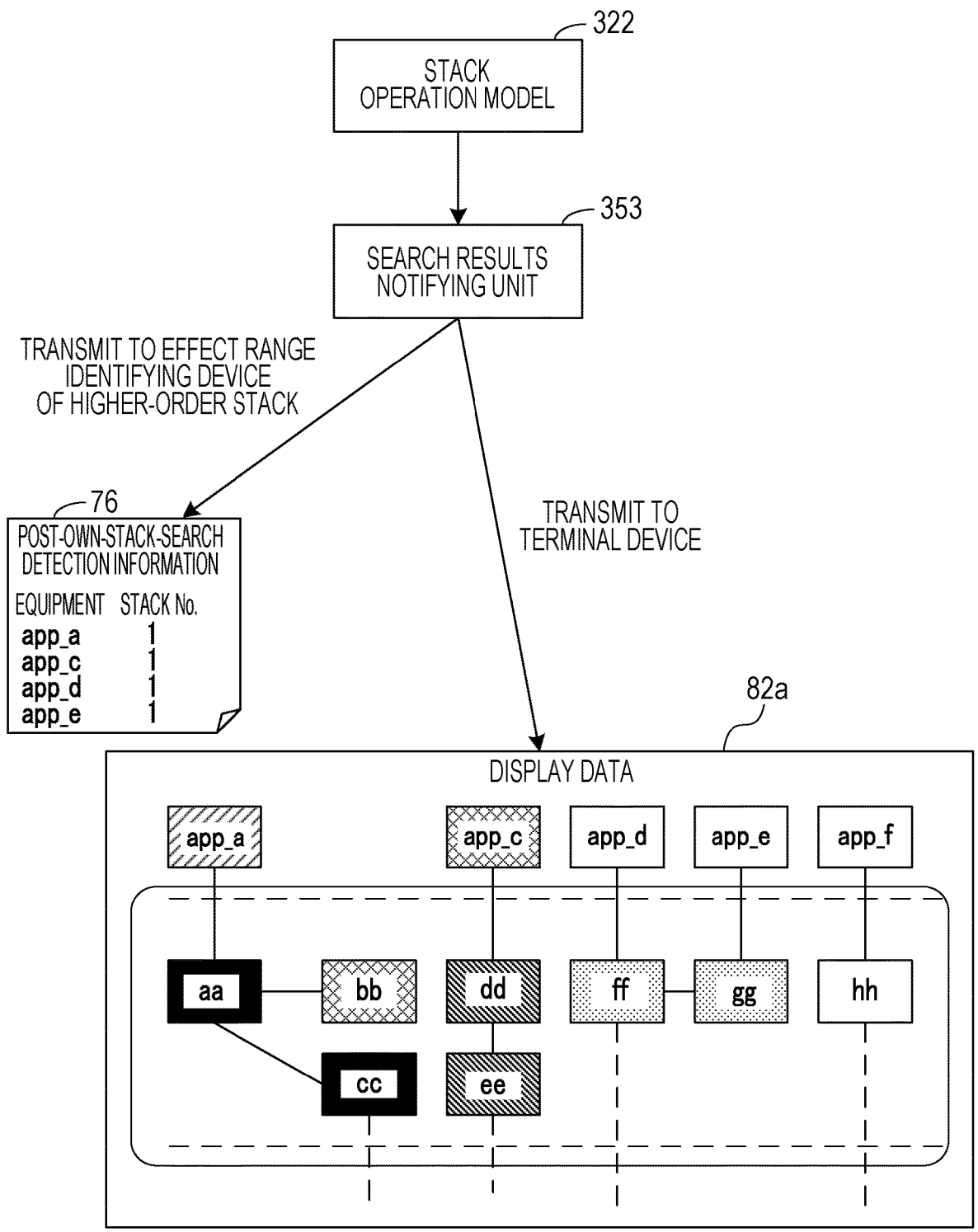
FIG. 48 is a diagram illustrating an example of search results notification processing in upflow processing according to the third embodiment.

FIG. 48 is a diagram illustrating an example of search results notification processing in upflow processing according to the third embodiment. The search results notifying unit 353 references the stack operation model 322, and generates post-own-stack-search detection information 76 indicating equipment in the higher-order stack 53 connected to any of the failure-detected equipment and failure-affected equipment in the stack 52. The search results notifying unit 353 then transmits the generated post-own-stack-search detection information 76 to the effect range identifying device 200 of the higher-order stack 53.

The search results notifying unit 353 also references the stack operation model 322 and generates display data 82*a* indicating the failure-detected equipment and failure-affected equipment at the higher-order stack 53 and the stack 52 to which it belongs, respectively. The display data 82*a* has the display form for failure-affected equipment set to a display form corresponding to the severity. For example, the color of an object indicating failure-affected equipment is set to a different color for each severity.

The search results notifying unit 353 then transmits the display data 82*a* to the terminal device 30 that the administrator of the stack 52 uses. Thus, an image corresponding to the display data 82*a* is displayed on the terminal device 30.

In this way, in the third embodiment the severity of failure-affected equipment is obtained, and difference in severity is displayed. Accordingly, the administrator may handle, with priority, equipment that has a high probability of being affected by the failure, and may accurately and speedily handle the failure.

Fourth Embodiment

Next, a fourth embodiment will be described. In the fourth embodiment, the seriousness of a failure occurring at equipment providing a service is obtained in accordance with the usage state of that service, for each stack, and information regarding seriousness is exchanged among the effect range identifying devices 200, 300, and 400 of the respective stacks. Knowing the seriousness when a failure occurs in equipment at another stack enables handling failure-affected equipment of the own stack to be handled in an appropriate order.

In a case where the stacks are being managed by different corporations, for example, the corporations managing the stacks are not able to disclose information of customers using the services. Accordingly, in a case where equipment at a lower-order stack is affected by a failure, the administrator of the lower-order stack is not able to tell how important the service provided by equipment at the higher-order stack using that equipment is. There are various aspects to importance of equipment, such as for example, the number of units of equipment connected to that equipment, usage purpose such as developmental environment or implementation environment, the number of customers using the equipment, contractual importance of using the equipment, social importance such as bank-related, and so on. Such information serving as a standard for judging importance of equipment within a certain stack is closely related to customer information, and may not be informed to an administrator of another stack.

Accordingly, in the fourth embodiment, the importance in a case where equipment in a certain stack is affected by a failure is replaced by a numerical value of seriousness, and transmitted to the effect range identifying devices of the other stacks. The effect range identifying devices that have received the seriousness of equipment within another stack judge the seriousness regarding equipment within their own stacks, taking into consideration the seriousness regarding equipment in a higher-order stack. This allows the seriousness of equipment within own stacks to be accurately calculated at each stack, and the administrators may handle appropriately so that effects of the failure do not lead to serious deterioration in service quality.

Points of difference between the fourth embodiment and the third embodiment will be described below.

Figure 49:
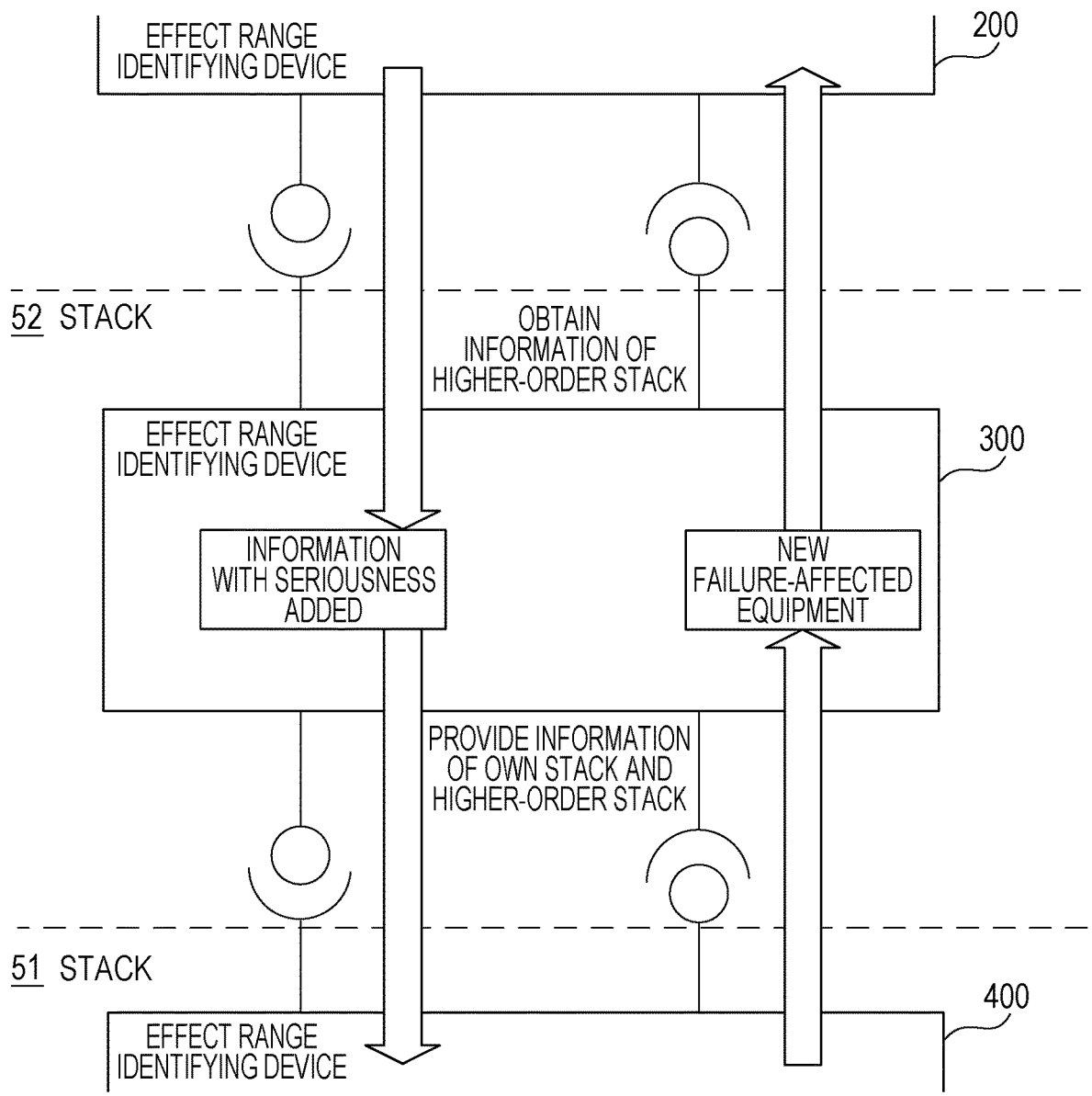
FIG. 49 is a diagram illustrating handover of information including seriousness.

FIG. 49 is a diagram illustrating handover of information including seriousness. For example, the effect range identifying device 300 obtains information, where the identifier of a piece of failure-affected equipment has added thereto the seriousness of that failure-affected equipment, from the effect range identifying device 200 in the higher-order stack 53 using equipment in the own stack. The effect range identifying device 300 then provides the information of the stack 52 (the identifier of the failure-affected equipment with the seriousness added thereto) and information obtained from the higher-order stack 53, to the effect range identifying device 400 of the lower-order stack 51.

The effect range identifying device 400 of the lower-order stack 51 searches for failure-affected equipment based on the obtained information, and transmits identifiers of new failure-affected equipment within the stack 52 connected to the failure-affected equipment in the stack 52 to the effect range identifying device 300 of the stack 52. The effect range identifying device 300 searches for failure-affected equipment based on the obtained information, and transmits identifiers of new failure-affected equipment within the higher-order stack 53 connected to the failure-affected equipment in the stack 52, to the effect range identifying device 200 of the stack 53.

Thus, in the fourth embodiment, the seriousness is calculated at the time of downflow processing, to calculate seriousness within the effect range identifying device 300.

Figure 50:
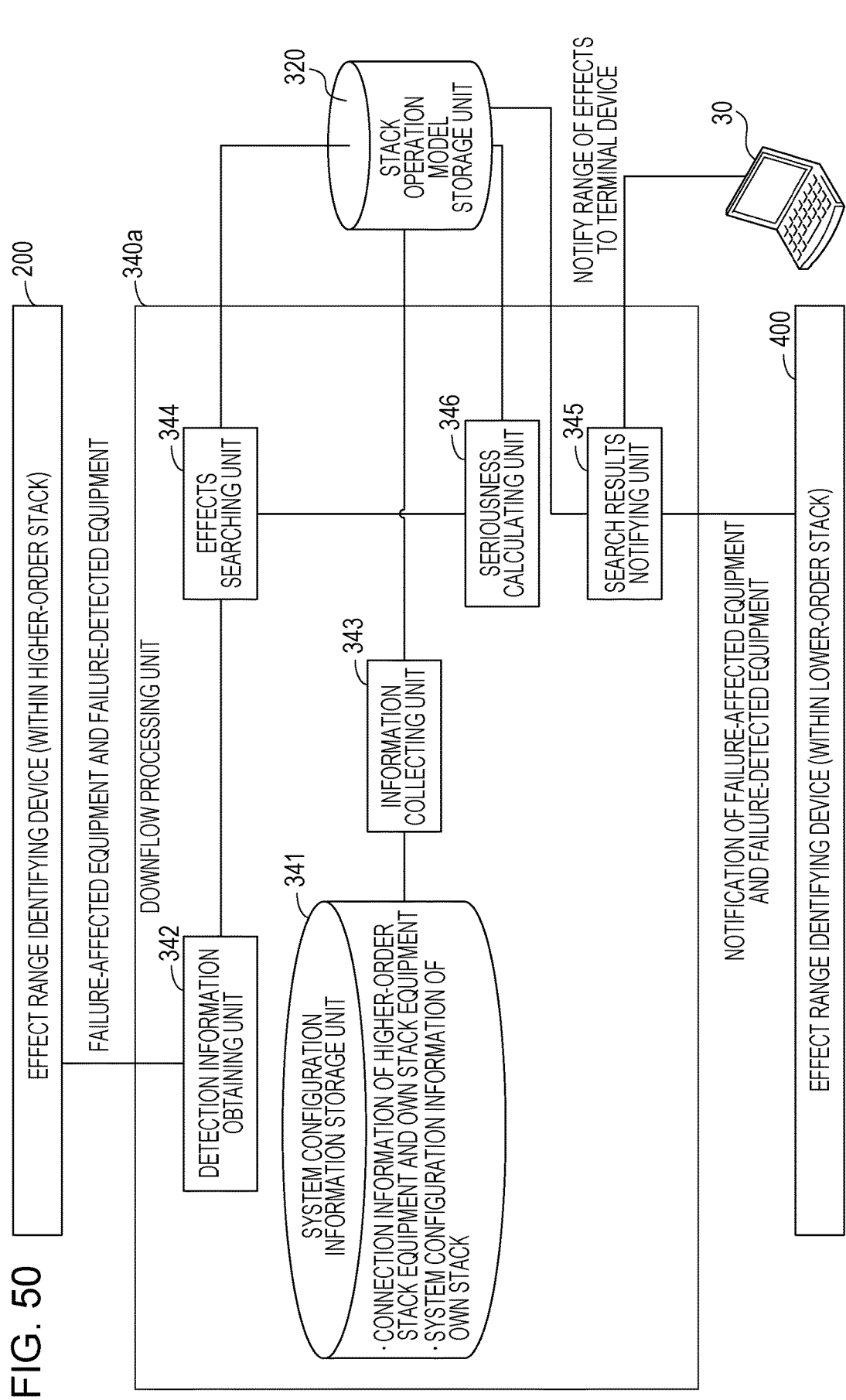
FIG. 50 is a diagram illustrating functions of a downflow processing unit in a fourth embodiment.

FIG. 50 is a diagram illustrating the functions of a downflow processing unit according to the fourth embodiment. A downflow processing unit 340a according to the fourth embodiment has, in addition to the components that the downflow processing unit 340 according to the second embodiment illustrated in FIG. 15 has, a seriousness calculating unit 346.

The seriousness calculating unit 346 calculates the seriousness of each of failure-detected equipment and failure-affected equipment, based on the usage states of services provided at each of the failure-detected equipment and failure-affected equipment in the stack 52. For failure-detected equipment or failure-affected equipment connected to the higher-order stack 53, the seriousness calculating unit 346 uses a summed value of the calculated seriousness and the seriousness of equipment in the higher-order stack 53 connected to, as the seriousness of the failure-detected equipment or failure-affected equipment. The seriousness calculating unit 346 then sets the calculated seriousness in the stack operation model.

Note that the following method is conceivable as a method to calculate seriousness.

Method of Calculating Seriousness Based on Contractual Usage Fees

For example, a database is provided in the effect range identifying device 300 that stores monthly usage fees of customers using services provided at the stack 52. The seriousness calculating unit 346 evaluates the usage fees of the previous month on a scale of 1 to 5, and sets the seriousness higher for customers paying greater usage fees. For example, the seriousness calculating unit 346 sets the seriousness for equipment used by customers of which the usage fees are evaluated to be highest, to "100". The seriousness calculating unit 346 sets the seriousness for equipment used by customers of which the usage fees are evaluated to be second highest, to "80". Thereafter, the seriousness calculating unit 346 lowers the value for seriousness by 20, for each level the evaluation is lowered to.

Method of Calculating Seriousness Based on Damages Occurring in Past Failures

For example, a database is provided in the effect range identifying device 300 that stores business types, customer size, and damages thereof, with regard to past cases of failures, and a database storing current customer businesses and customer size. The seriousness calculating unit 346 then estimates, from business types, customer size, and damages thereof, with regard to past cases of failures, that similar damages will be incurred if services are stopped regarding customers of the same business type and customer size, and calculates the seriousness in accordance with estimated damages. For example, the larger the scale of damages is, the larger the seriousness calculating unit 346 sets the value of seriousness.

Method of Calculating Seriousness Based on Difference of Whether Development Environment or Operational Environment For example, a database is provided in the effect range identifying device 300 that stores whether usage of equipment by customers is usage as a development environment or usage as an operational environment. The seriousness calculating unit 346 then calculates the seriousness of the equipment in accordance with whether the equipment is being used as a development environment, or an operational environment where the equipment is actually used by the customer for business. The seriousness calculating unit 346 sets the seriousness of the equipment being used in an operational environment higher than the seriousness of the equipment being used in development environment, for example.

Method of Calculating Seriousness Based on Number of Units Connected at Higher-Order Stack For example, the seriousness calculating unit 346 calculates the number of units within the higher-order stack 53 that are connected to the equipment in the stack 52. The seriousness calculating unit 346 then calculates the seriousness in accordance with the number of units within the higher-order stack 53 that are connected to each piece of equipment. For example, the seriousness calculating unit 346 evaluates the number of units within the higher-order stack 53 connected to each piece of equipment on a scale of 1 to 5, with the seriousness of the equipment having a greater number of connections being higher in value.

Method of Calculating Seriousness Based on Type of Business of Customers Using Equipment For example, a database is provided in the effect range identifying device 300 that stores business types of customers. The seriousness calculating unit 346 sets equipment used by customers of business types with high social importance, such as banks and so forth, so as to be higher than other equipment.

The seriousness calculating unit 346 may calculate seriousness by one of the above-described methods, or take a sum of seriousness calculated by multiple methods as the seriousness of the equipment.

Figure 51:
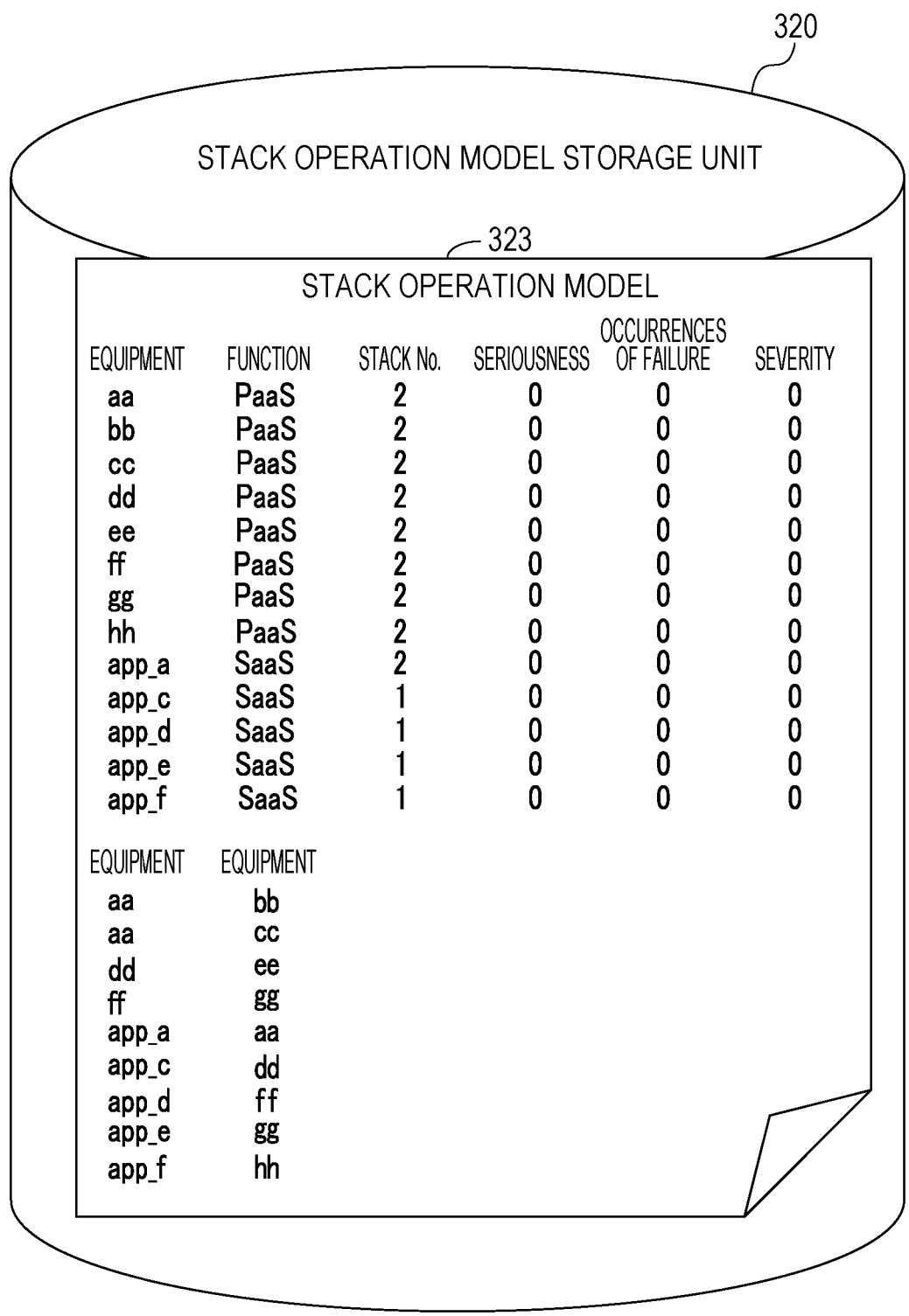
FIG. 51 is a diagram illustrating an example of stack operation model according to the fourth embodiment.

FIG. 51 is a diagram illustrating an example of a stack operation model according to the fourth embodiment. A stack operation model 323 according to the fourth embodiment has a column for seriousness added to the records of the equipment. The initial value of seriousness is "0", and when corresponding equipment becomes failure-detected equipment or failure-affected equipment, a value indicating the seriousness of that equipment is set to the column for seriousness.

Figure 52:
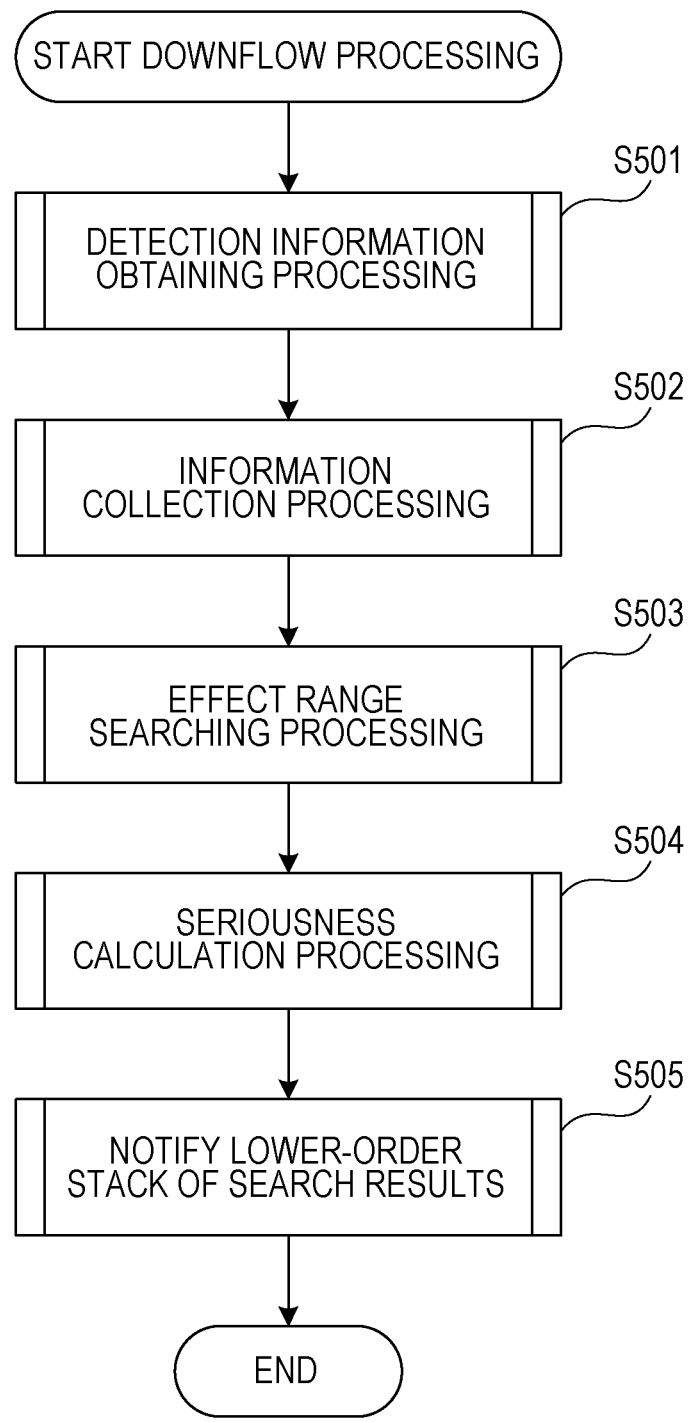
FIG. 52 is a diagram illustrating an example of procedures of downflow processing according to the fourth embodiment.

FIG. 52 is a diagram illustrating an example of the procedures for downflow processing in the fourth embodiment. The processing illustrated in FIG. 52 will be described below following the step numbers.

(Step S501) The detection information obtaining unit 342 performs detection information obtaining processing. The details of detection information obtaining processing are almost the same as the detection information obtaining processing according to the second embodiment illustrated in FIG. 19. The detection information obtaining processing according to the fourth embodiment differs from the second embodiment with regard to the point that the information to be obtained includes the value of seriousness for failure-detected equipment or failure-affected equipment.

(Step S502) The information collecting unit 343 performs information collection processing. A stack operation model is created by the information collection processing. Details of the information collection processing are almost the same as the information collection processing in the second embodiment illustrated in FIG. 21. The difference between the information collection processing according to the fourth embodiment and the second embodiment is the point that a column is included in the stack operation model 323 being generated, to set the seriousness of each piece of equipment, as illustrated in FIG. 51.

(Step S503) The effects searching unit 344 performs effect range searching processing. Details of the effect range searching processing is almost the same as the effect range searching processing according to the third embodiment illustrated in FIG. 42. The effect range searching processing according to the fourth embodiment differs from the third embodiment with regard to the point that when updating the stack operation model 323 in accordance with detection information obtained from the information collecting unit 343, the value for seriousness is also updated.

(Step S504) The seriousness calculating unit 346 performs seriousness calculation processing. Details of the seriousness calculation processing will be described later (see FIG. 57).

(Step S505) The search results notifying unit 345 performs search results notification processing to the lower-order stack 51. Details of the search results notification processing to the lower-order stack 51 are almost the same as the search results notification processing to the lower-order stack 51 according to the second embodiment illustrated in FIG. 27. The search results notification processing to the lower-order stack 51 according to the fourth embodiment differs from the second embodiment with regard to the point that information of seriousness for each piece of equipment is included in the information regarding which notification is made.

The processing of the steps in FIG. 52 will be described below in detail.

Figure 53:
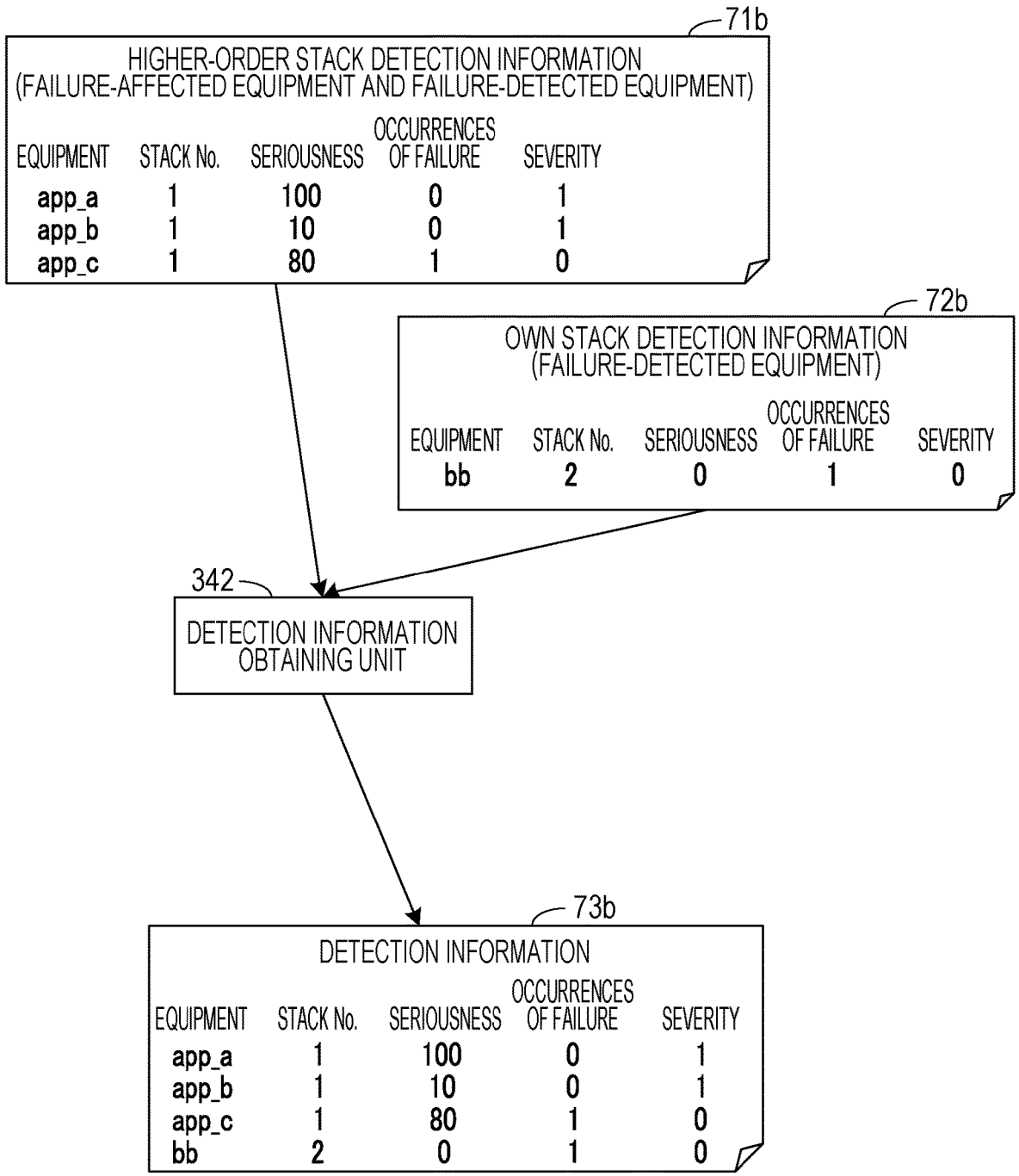
FIG. 53 is a diagram illustrating an example of detection information obtaining processing according to the fourth embodiment.

FIG. 53 is a diagram illustrating an example of detection information obtaining processing according to the fourth embodiment. The detection information obtaining unit 342 obtains higher-order stack detection information 71b and own-stack detection information 72b, as illustrated in FIG. 53.

The higher-order stack detection information 71b has set therein, in correlation with identifiers of equipment (equipment names) within the higher-order stack 53, the stack No. of the stack to which the equipment belongs, seriousness, information indicating whether or not there has been occurrence of failure, and the number of times of being detected as being in the range of effects of failure (severity). In the example in FIG. 53, the seriousness of equipment "app_a" is "100", the seriousness of equipment "app_b" is "10", and the seriousness of equipment "app_c" is "80".

The own-stack detection information 72b has set therein, in correlation with identifiers of equipment (equipment names) within the stack 52 to which the effect range identifying device 300 belongs, the stack No. of the stack to which the equipment belongs, seriousness, information of occurrence of failure, and severity. In the example in FIG. 53, the seriousness of equipment "bb" is "0".

The detection information obtaining unit 342 generates detection information 73b where the higher-order stack detection information 71b and own-stack detection information 72b have been integrated, and transmits the generated detection information 73b to the effects searching unit 344. The effects searching unit 344 updates the stack operation model 323 based on the received detection information 73b.

Figure 54:
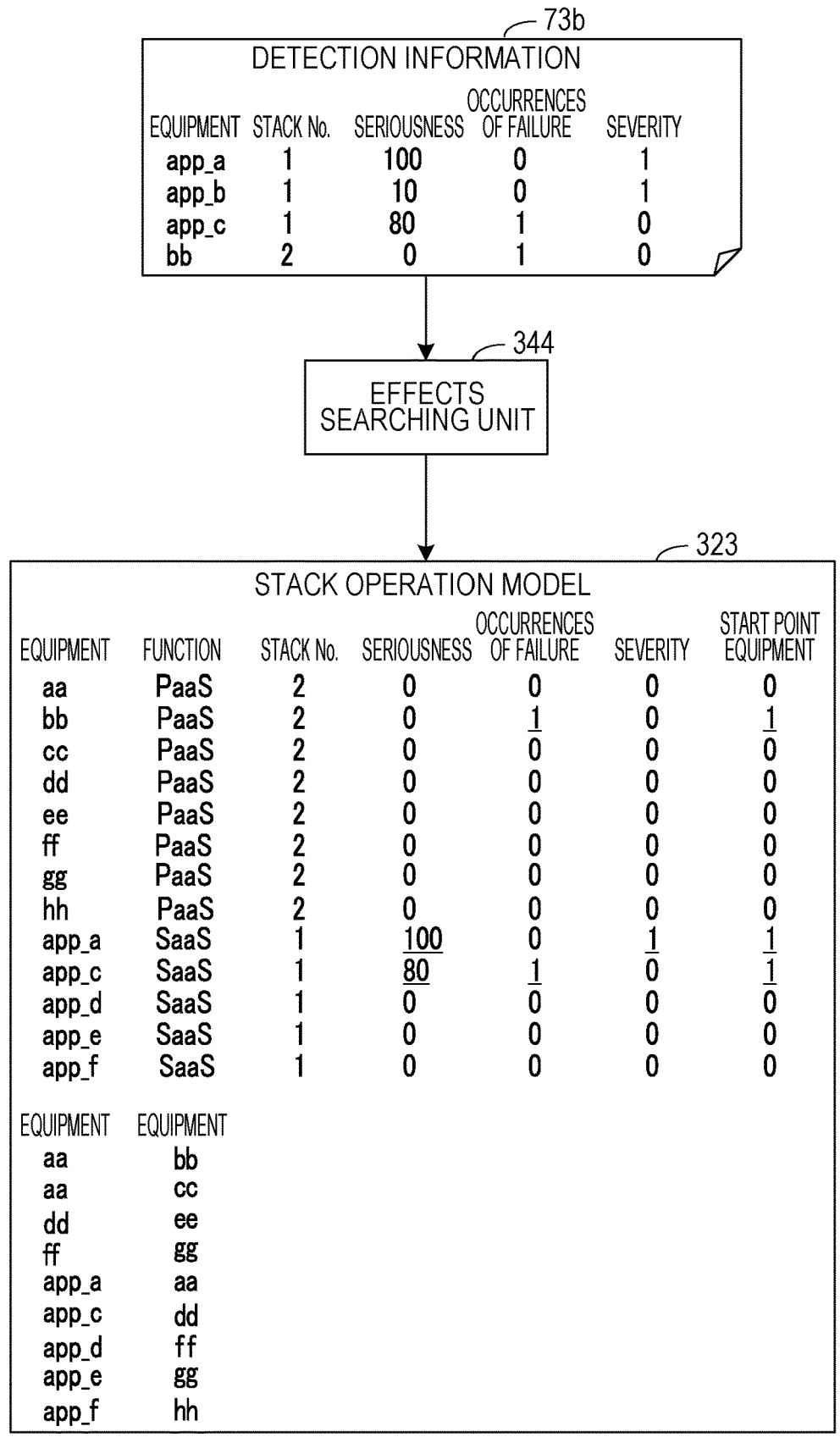
FIG. 54 is a diagram illustrating an example of a stack operation model in which detection information according to the fourth embodiment is reflected.

FIG. 54 is a diagram illustrating an example of a stack operation model in which the detection information according to the fourth embodiment has been reflected. The effects searching unit 344 that has obtained the detection information 73b adds information indicating whether or not equipment to serve as a start point for searching (the value of the "start point equipment" column) in each record in the stack operation model 323. The effects searching unit 344 reflects, in the stack operation model 323, information of equipment where a failure has occurred, and information the severity of equipment where there is a possibility of being affected by a failure, illustrated in the detection information 73b. The effects searching unit 344 also sets information to the effect that equipment where a failure has occurred and equipment of which there is a possibility of being affected by a failure, is equipment to be a start point of a search, in the stack operation model 323. The effects searching unit 344 further sets the seriousness of equipment indicated in the detection information 73b as the seriousness of the relevant equipment in the stack operation model 323.

Thereafter, upon the range of effects of failure being searched by the effects searching unit 344, the stack operation model 323 is updated in accordance with the search results.

Figure 55:
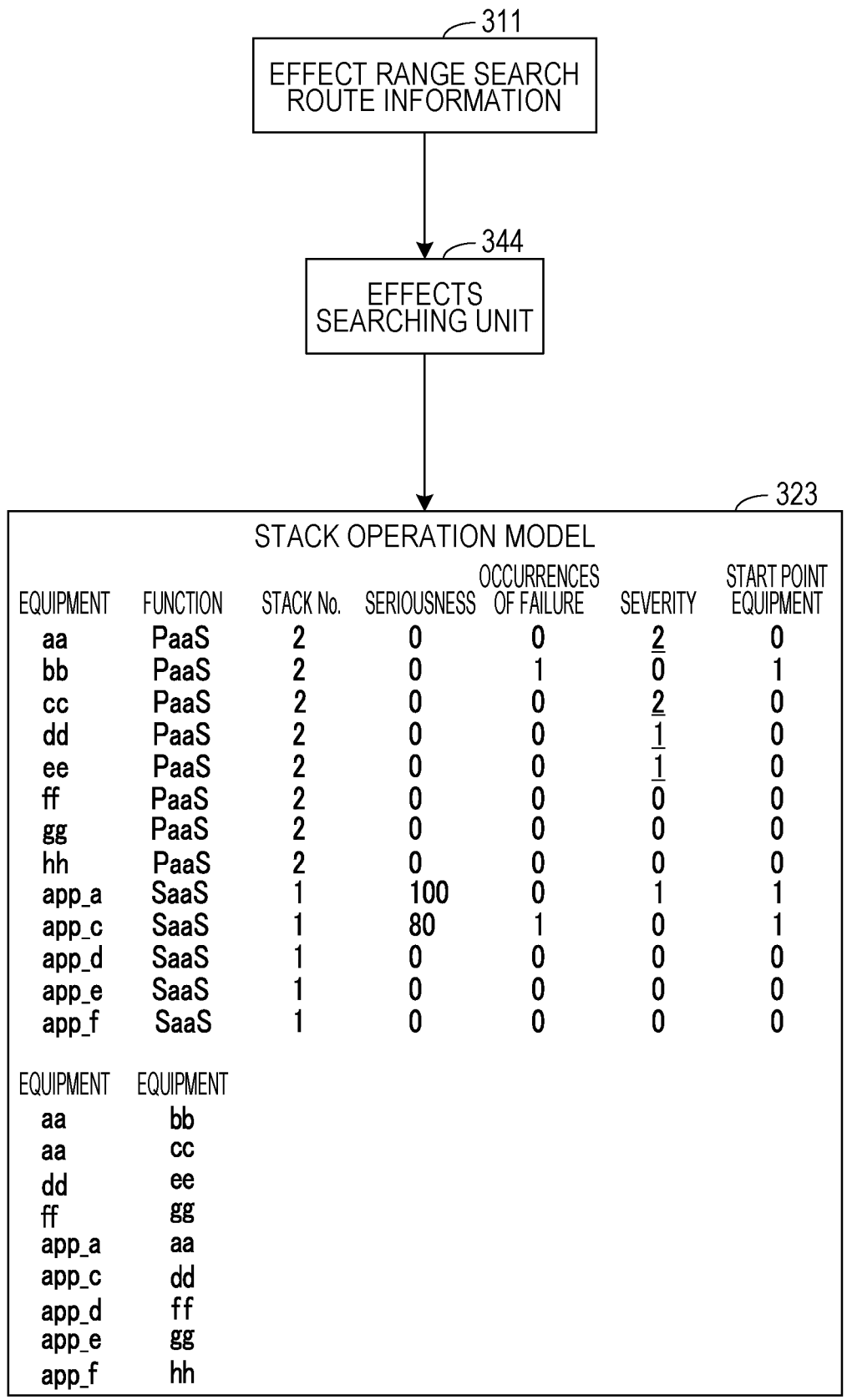
FIG. 55 is a diagram illustrating an example of a stack operation model in which are reflected search results of the range of effects in downflow processing according to the fourth embodiment.

FIG. 55 is a diagram illustrating an example of a stack operation model in which are reflected the search results of the range of effects in the downflow processing according to the fourth embodiment. FIG. 55 illustrates the stack operation model 323 where the search results such as illustrated in FIG. 40 have been reflected. In the example in FIG. 55, the value of severity has been changed to "2" for the records for equipment "aa" and "cc", and value of severity has been changed to "1" for the records for equipment "dd" and "ee".

Upon the effect range searching processing in the downflow processing ending, the seriousness of the failure-affected equipment is calculated by the seriousness calculating unit 346, and the calculated seriousness is set in the stack operation model 323.

Figure 56:
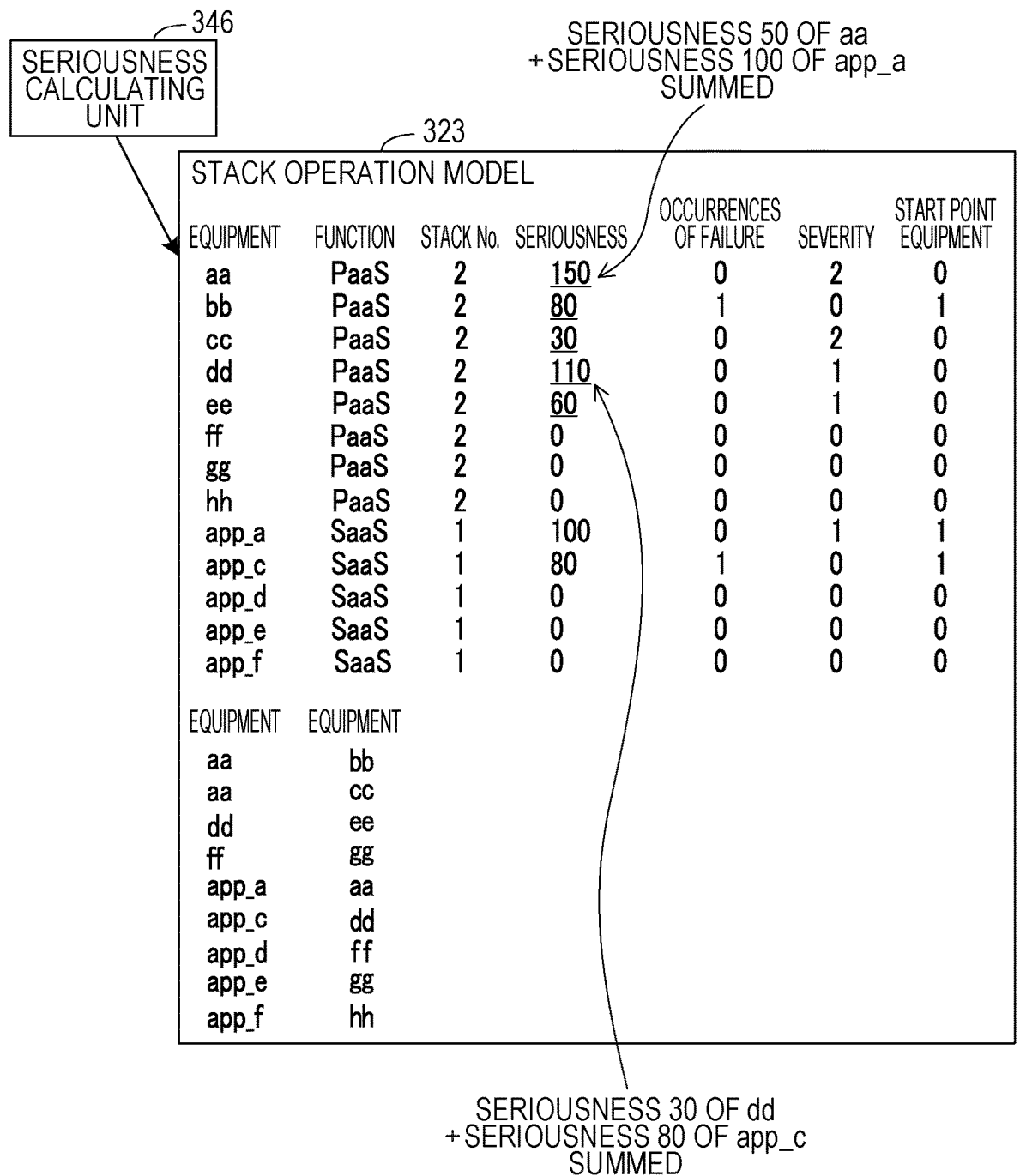
FIG. 56 is a diagram illustrating an example of setting seriousness as to a stack operation model.

FIG. 56 is a diagram illustrating an example of setting seriousness in a stack operation model. The seriousness calculating unit 346 first calculates the seriousness of the failure-detected equipment and failure-affected equipment in the stack 52 without taking into consideration the seriousness of equipment in the higher-order stack 53. In the example in FIG. 56, the seriousness of equipment "aa" is "50", the seriousness of equipment "bb" is "80", the seriousness of equipment "cc" is "30", the seriousness of equipment "dd" is "30", and the seriousness of equipment "ee" is "60".

For equipment connected to failure-detected equipment or failure-affected equipment in the higher-order stack 53, the seriousness calculating unit 346 adds the seriousness of the equipment of the connected higher-order stack 53 to the seriousness of the equipment itself. In the example in FIG. 56, the seriousness "100" of the equipment "app_a" is added to the own seriousness of the equipment "aa" that is "50", so the seriousness of the equipment "aa" is "150". Also, the seriousness "80" of the equipment "app_c" is added to the own seriousness of the equipment "dd" that is "30", so the seriousness of the equipment "dd" is "110".

The seriousness calculating unit 346 sets the value of seriousness calculated for the equipment within the stack 52 to the column for seriousness of the records of the relevant equipment in the stack operation model 323.

The following is a description of procedures for seriousness calculation processing with reference to a flowchart.

Figure 57:
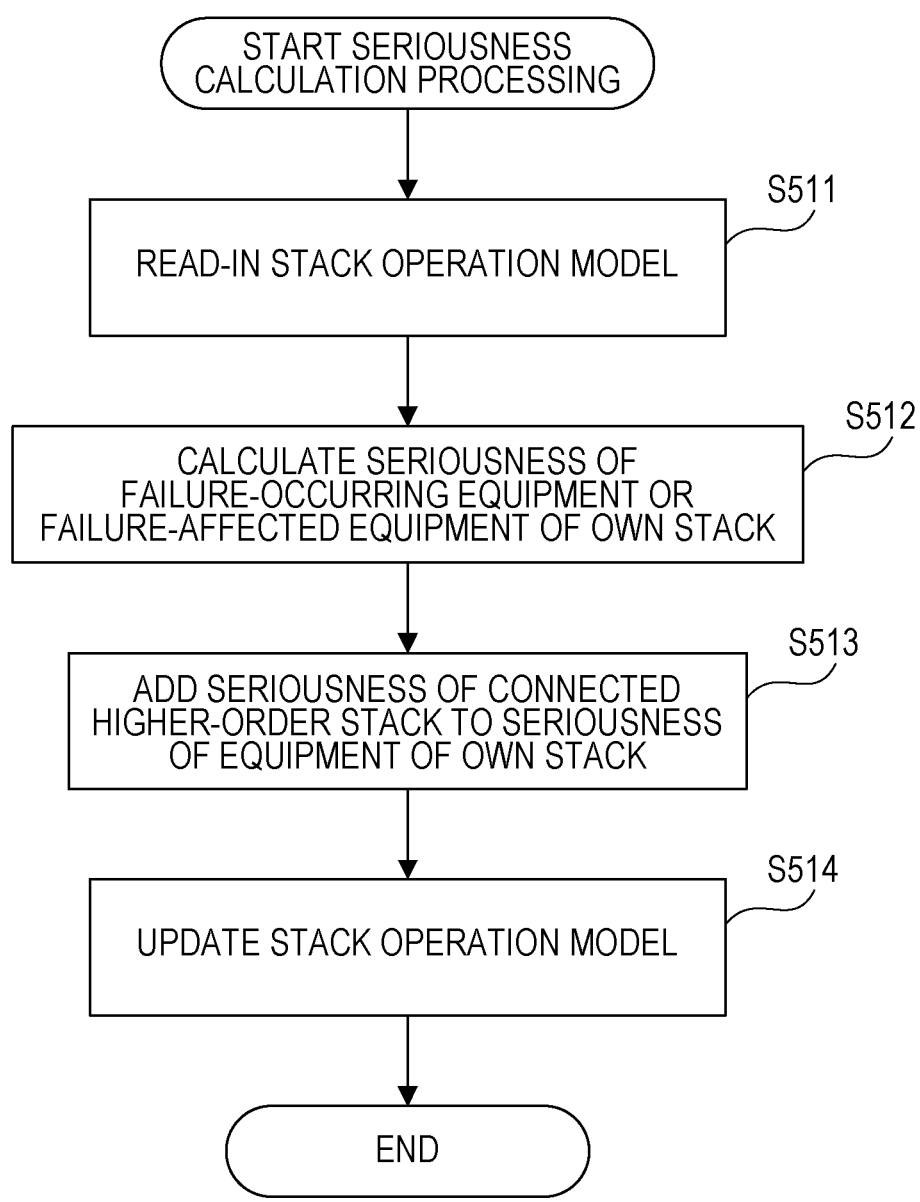
FIG. 57 is a flowchart illustrating an example of procedures of seriousness calculation processing.

FIG. 57 is a flowchart illustrating an example of procedures for seriousness calculation processing. The processing illustrated in FIG. 57 will be described below following the step numbers.

(Step S511) The seriousness calculating unit 346 reads in the stack operation model 323 from the stack operation model storage unit 320.

(Step S512) The seriousness calculating unit 346 calculates the seriousness of failure-detected equipment and failure-affected equipment in the stack 52. The seriousness calculating unit 346 does not take into consideration the seriousness of equipment in the higher-order stack 53 in this step.

(Step S513) The seriousness calculating unit 346 adds, to the seriousness of the equipment in the stack 52, the seriousness of the equipment in the higher-order stack 53 connected to that equipment.

(Step S514) The seriousness calculating unit 346 updates the seriousness of each piece of equipment in the stack operation model 323 to the value of the calculated seriousness.

Thus, searching processing of the range of effects of failure in the stack 52 is performed, and the seriousness of the stack operation model 323 is updated in accordance with the results of processing. Thereafter, search results notification processing is performed by the search results notifying unit 345.

Figure 58:
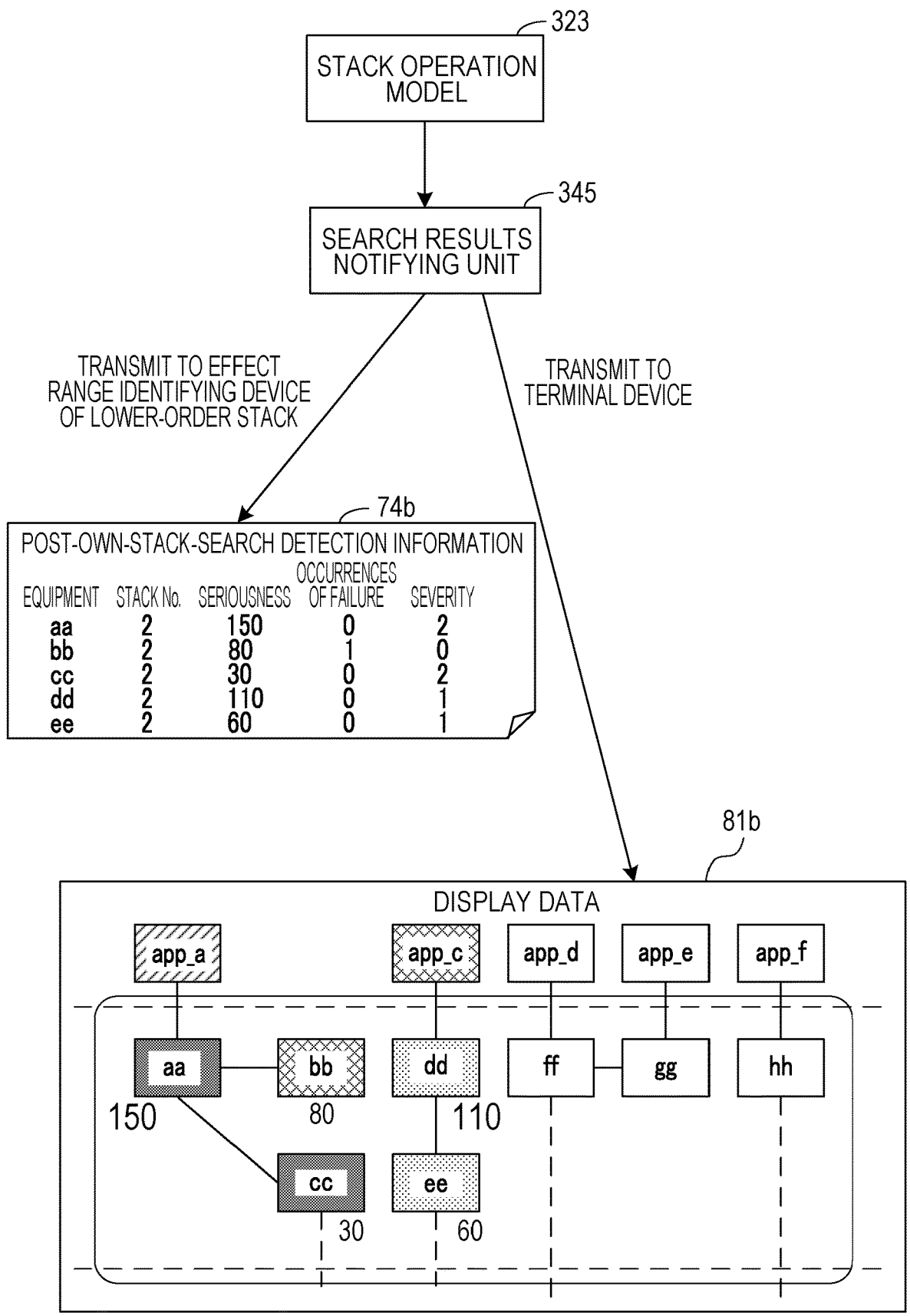
FIG. 58 is a diagram illustrating an example of search results notification processing in downflow processing according to the fourth embodiment.

FIG. 58 is a diagram illustrating an example of search results notification processing in the downflow processing according to the fourth embodiment. The search results notifying unit 345 references the stack operation model 323 and generates post-own-stack-search detection information 74b indicating failure-detected equipment and failure-affected equipment at the stack 52. The post-own-stack-search detection information 74b includes the values of seriousness of each piece of equipment. The search results notifying unit 345 then transmits the generated post-own-stack-search detection information 74b to the effect range identifying device 400 in the lower-order stack 51.

The search results notifying unit 345 references the stack operation model 323 and generates display data 81b indicating the failure-detected equipment and failure-affected equipment at the higher-order stack 53 and the stack 52 to which it belongs, respectively. The search results notifying unit 345 then transmits the display data 81b to the terminal device 30 that the administrator of the stack 52 uses. Thus, an image corresponding to the display data 81b is displayed on the terminal device 30.

The image corresponding to the display data 81b displays the connection relation among equipment within the stack 52, and the connection relation of equipment in the stack 52 and equipment in the higher-order stack 53, for example. An image corresponding to the display data 81b indicates the failure-detected equipment and failure-affected equipment in a highlighted display. For example, settings are made in the display data 81b so that the failure-detected equipment and failure-affected equipment are displayed in different colors. Also, in the image corresponding to the display data 81b, failure-affected equipment is displayed by a different color for each severity. Further, the values of seriousness of corresponding equipment are displayed near objects representing the equipment in the image corresponding to the display data 81b.

This so far is downflow processing according to the fourth embodiment. Seriousness is not updated in the upflow processing. Accordingly, the upflow processing according to the fourth embodiment is the same as in the third embodiment.

Figure 59:
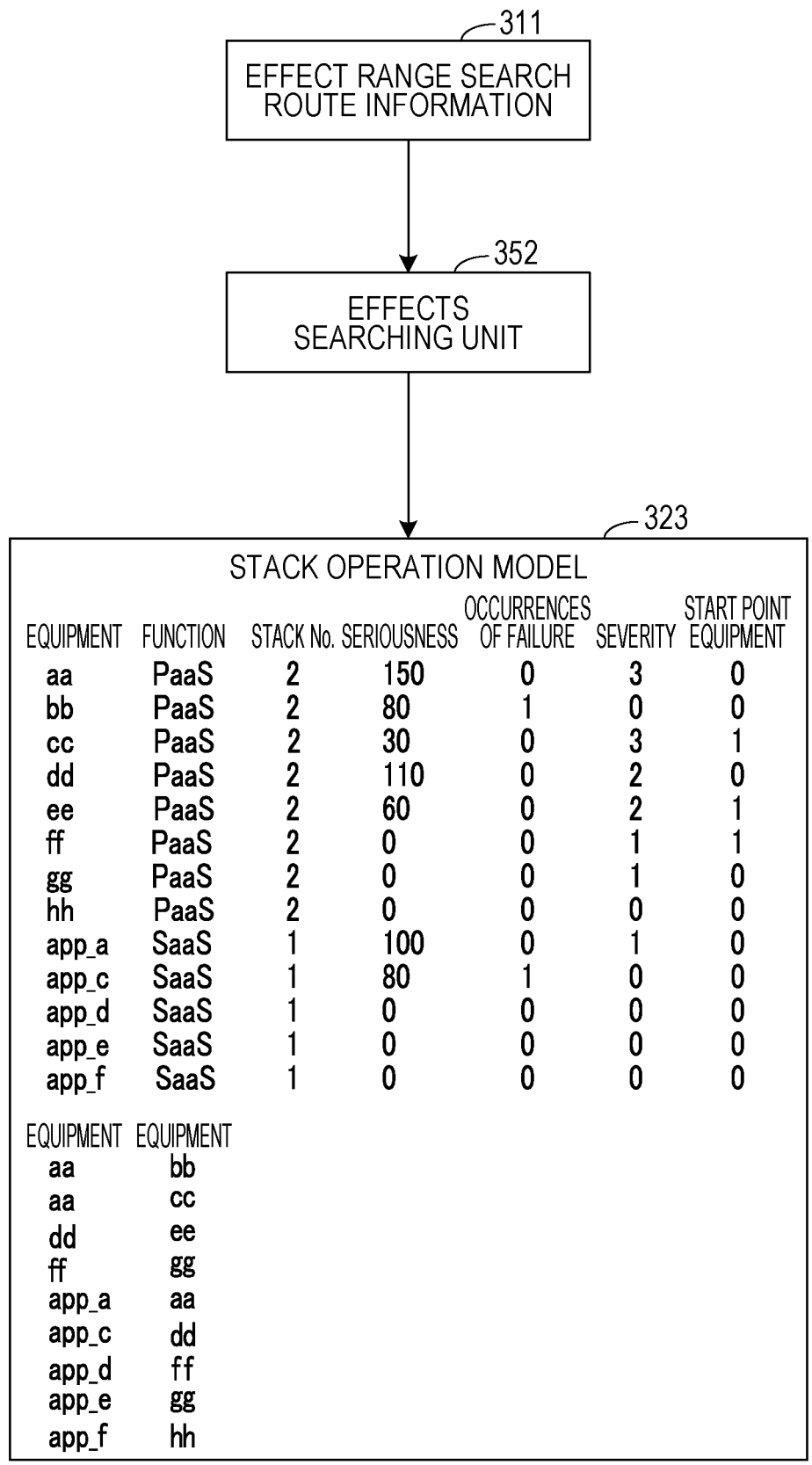
FIG. 59 is a diagram illustrating an example of a stack operation model to which have been reflected search results of the range of effects in upflow processing according to the fourth embodiment.

FIG. 59 is a diagram illustrating an example of a stack operation model in which is reflected the search results for the range of effects in the upflow processing according to the fourth embodiment. FIG. 59 illustrates the stack operation model 323 in which the search results illustrated in FIG. 44 have been reflected. "1" has been added to the values of severity in the records for each of the equipment "aa", "cc", "dd", "ee", "ff", and "gg" in the stack operation model 323.

Search results notification processing is performed based in such a stack operation model 323.

Figure 60:
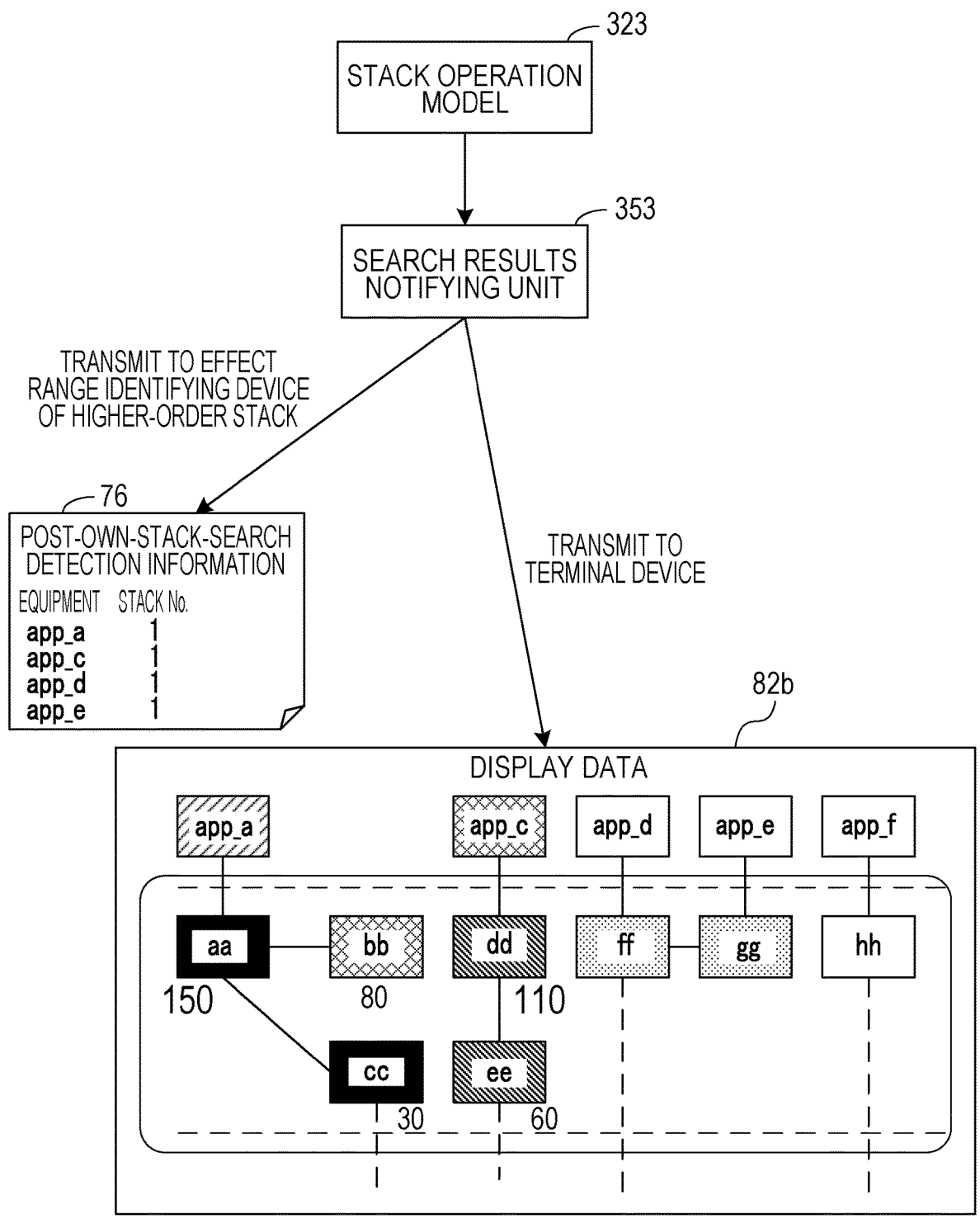
FIG. 60 is a diagram illustrating an example of search results notification processing in upflow processing according to the fourth embodiment.

FIG. 60 is a diagram illustrating an example of search results notification processing in the upflow processing according to the fourth embodiment. The search results notifying unit 353 references the stack operation model 323, and generates post-own-stack-search detection information 76 indicating equipment in the higher-order stack 53 connected to any of the failure-detected equipment and failure-affected equipment in the stack 52. The search results notifying unit 353 then transmits the generated post-own-stack-search detection information 76 to the effect range identifying device 200 of the higher-order stack 53.

The search results notifying unit 353 also references the stack operation model 323 and generates display data 82b indicating the failure-detected equipment and failure-affected equipment at the higher-order stack 53 and the stack 52 to which it belongs, respectively. The display data 82b has the display form for failure-affected equipment set to a display form corresponding to the severity. For example, the color of an object indicating failure-affected equipment is set to a different color for each severity. Further, objects indicating the values of seriousness of corresponding equipment are displayed near objects representing the equipment in the image corresponding to the display data 81b.

The search results notifying unit 353 then transmits the display data 82b to the terminal device 30 that the administrator of the stack 52 uses. Thus, an image corresponding to the display data 82b is displayed on the terminal device 30.

Thus, the severity and seriousness of the failure regarding the failure-detected equipment and failure-affected equipment is displayed at the terminal device 30. The administrator of the stack 52 may reference the displayed image and appropriately judge the order of priority in which to handle the failure. For example, the administrator handles equipment of which the severity or seriousness is a predetermined value or higher with priority.

Other Embodiments

In the second through fourth embodiments, the effects of failure at multiple pieces of equipment detected at the same period are managed in a single stack operation model. This is because it may be assumed that failures occurring at the same period have some sort of relationship. However, with a large-scale system, there is a possibility that multiple failures having different causes will occur at the same period. Accordingly, the effect range identifying devices 200, 300, and 400 may generate individual stack operation models each time the range of effects of a failure is searched for.

Figure 61:
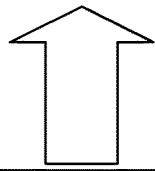
FIG. 61 is a diagram illustrating an example of generating a stack operation model for each failure effect range search.

FIG. 61 is a diagram illustrating an example of generating a stack operation model for each search for range of effects of failure. For example, the information collecting unit 343 generates equipment information of the stack 52 and higher-order stack equipment information of equipment connected to equipment of the stack 52, and creates a stack operation model 324 made up of just connection information among the pieces of equipment. The information collecting unit 343 periodically updates the stack operation model 324 to the newest information.

The effects searching unit 344 creates effects search stack operation models 324a, 324b, and so on, based on the stack operation model 324, each time a search is performed for the range of effects of failure. The effects search stack operation models 324a, 324b, and so on, include, in records for each piece of equipment, information of seriousness, whether or not a failure has occurred, severity, and whether or not to be start point equipment. A failure-occurrence No., which an identifier of each failure occurring, is set in the effects search stack operation models 324a, 324b, and so on.

In a case of transmitting information to other effect range identifying devices, the effect range identifying devices 200, 300, and 400 attach, to the information being transmitted, the failure-occurrence No. of the effects search stack operation model used to generate that information.

Accordingly, the effect range identifying devices 200, 300, and 400 may cooperate with each other, generate a failure-occurrence No. each time occurrence of a failure is detected at any equipment, and perform analysis of the range of effects of failure, and seriousness and severity at each piece of equipment, for each failure-occurrence No.

There are cases where some stacks out of the multiple stacks in a layered structure have not introduced an effect range identifying device. In this case, searching of effects of failure may be performed just between stacks that have introduced effect range identifying devices.

Figure 62:
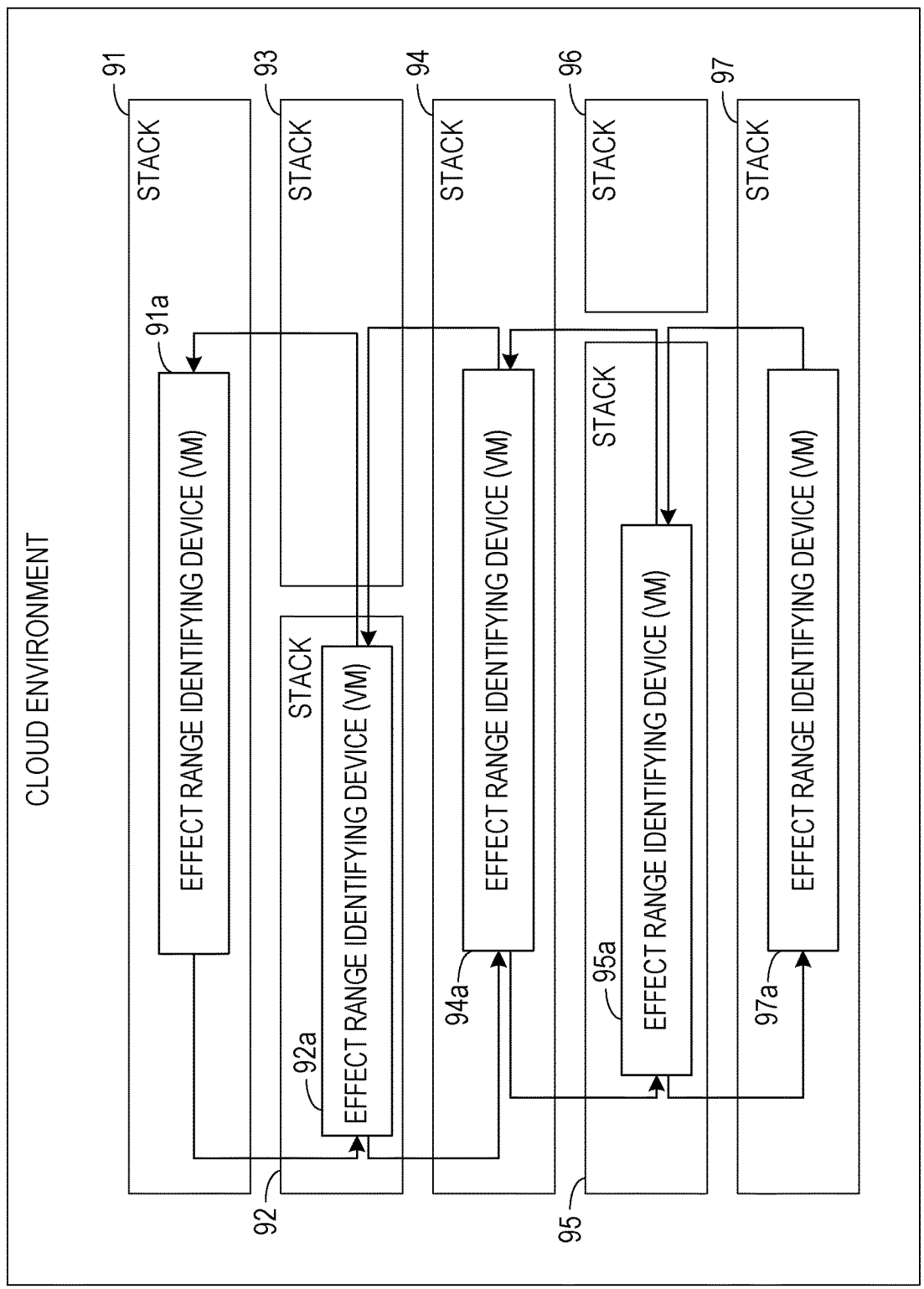
FIG. 62 is a diagram illustrating an example of a cloud environment including a stack regarding which an effect range identifying device has not been introduced.

FIG. 62 is a diagram illustrating an example of a cloud environment including stacks that have not introduced effect range identifying devices. Multiple stacks 91 through 97 are in a layered structure in FIG. 62. Stack 92 and stack 93 are stacks in the same layer. Stack 95 and stack 96 are also stacks in the same layer. In the example in FIG. 62, effect range identifying devices 91a, 92a, 94a, 95a, and 97a, realized by virtual machines, have been introduced to the stacks 91, 92, 94, 95, and 97. No effect range identifying devices have been introduced to stacks 93 and 96. In this case, searching for range of effects of failure is performed just among the effect range identifying devices 91a, 92a, 94a, 95a, and 97a. As a result, the range of effects of failure propagating through the stacks 91, 92, 94, 95, and 97 may be searched for.

A case is also conceivable where there are multiple stacks operated by different corporations in the same layer.

Figure 63:
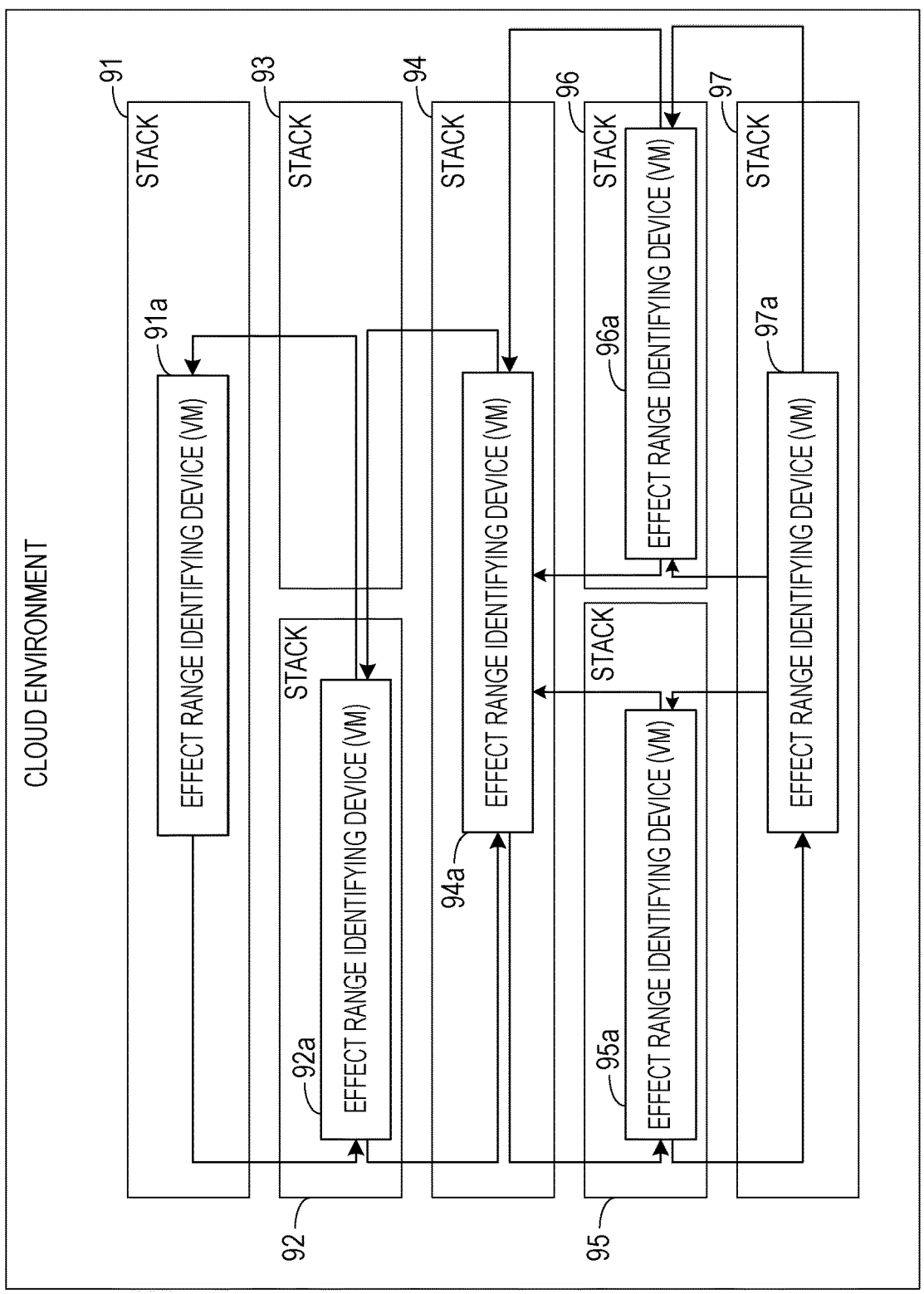
FIG. 63 is a diagram illustrating an example of a cloud environment where multiple stacks run by different corporations exist in the same layer.

FIG. 63 is a diagram illustrating an example of a cloud environment where there are multiple stacks operated by different corporations in the same layer. In the example in FIG. 63, stack 95 and stack 96 output the stacks 91 through 97 are managed and operated by different corporations, despite being in the same layer. The effect range identifying devices 91a, 92a, 94a, 95a, 96a, and 97a, realized by virtual machines, have been introduced to the stacks 91, 92, and 94 through 97. In such a case, in stacks that are vertically adjacent, failure effects searching across multiple stacks is performed by effect range identifying devices among corporations that have introduced effect range identifying devices.

The effect range identifying device may weight severity depending on the type of equipment serving as a start point. For example, the effect range identifying devices 200, 300, and 400 illustrated in the second through fourth embodiments change the value to be added to the severity of equipment within the range of effects from the start point thereof, depending on whether the equipment serving as the start point is failure-detected equipment or failure-affected equipment. If the equipment serving as the start point is failure-detected equipment, the severity of equipment within the range of effects is incremented by "2", while if the equipment serving as the start point is failure-affected equipment, the severity of equipment within the range of effects is incremented by "1", at the effect range identifying devices 200, 300, and 400. In a case where the equipment serving as the start point is failure-detected equipment, equipment where an abnormality is actually occurring is the start point, so a greater value is added to the severity in this way, as compared to a case where the equipment serving as a start point is failure-affected equipment. Further, in a case where the equipment serving as a start point is failure-affected equipment, for example, the effect range identifying devices 200, 300, and 400 may add the severity of the equipment serving as the start point to the severity of failure-affected equipment of which this equipment is the start point.

Although embodiments have been exemplarily illustrated, the configurations of parts illustrated in the embodiments may be replaced by others having similar functions. Also, other optional configurations and processes may be added. Further, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented method to detect range of a range of effects of a failure within a cloud computing system providing cloud services having a layered structure of services, the method comprising:

obtaining, from a higher-order effect range identifying device configured to search for a range of effects of failure within a higher-order service layer that provides a higher-order service using a service provided in an object service layer within the cloud computing system, an identifier of a detected higher-order service regarding which occurrence of an abnormality or a possibility of being affected by the abnormality has been detected;

determining with an object-service-layer range identifying device, based on search route information indicating a first search route to search for a service within a range of effects of failure from a start point service, a service within the object service layer that is reachable by tracing relations among services from the detected higher-order service by following a second search route in a case where the detected higher-order service is the start point service, to be a first in-effect-range service regarding which there is the possibility of being affected by the abnormality;

transmitting the identifier of the first in-effect-range service to a lower-order effect range identifying device configured to search for a range of effects of failure at a lower-order service layer, which is a source of providing a lower-order service that is used to provide a service within the object service layer;

determining, by the lower-order effect range identifying device, a lower-order service determined to be in the range of effects for failure, by following a third source route that uses the first in-effect range service as the start point service;

transmitting the identifier of the detected lower order service as a second in-effect range service to the object-service-layer range identifying device; and outputting the detected higher-order service, the first in-effect range service, and the second in-effect range service to an administrator of at least one service layer, wherein the higher-order effect range identifying device, the object-service-layer range identifying device, and the lower-order effect range identifying device are separate devices that operate within its own layer of services and maintains search route information for a set of search routes within the layer that corresponds to sets of services and resources that may be a cause of failure and can be correlated to a resource of a different layer.

2. The method of claim 1, further comprising:
calculating a seriousness in a case of the first in-effect-range service being affected by failure, the calculated seriousness based on a usage form of the first in-effect-range service; and
outputting seriousness display data, for a screen display, of the seriousness of the first in-effect-range service in the object service layer.

3. The method of claim 2, wherein,
in the calculating the seriousness, a sum of a value calculated based on the usage form of the first in-effect-range service, and a value calculated based on a usage form of the higher-order service in the higher-order service layer using the first in-effect-range service, is calculated as the seriousness of the first in-effect-range service.

4. The method of claim 1, further comprising:
outputting display data, for a screen display, indicating that the first in-effect-range service in the object service layer is in the range of effects of failure.

5. The method of claim 1, further comprising:
obtaining, from the lower-order effect range identifying device, an identifier of a using service within the object service layer that uses the lower-order service determined to be in the range of effects of failure, by the search for a failure effect range based on the first in-effect-range service by the lower-order effect range identifying device;
determining, based on the search route information, a service within the object service layer that is reachable by tracing relations among services from the using service by following a search route in a case where the using service is the start point service, to be a second in-effect-range service regarding which there is a possibility of being affected by an abnormality; and
transmitting an identifier of a using higher-order service using the second in-effect-range service out of the higher-order services within the higher-order service layer, to the higher-order effect range identifying device.

6. The method of claim 1, further comprising: determining, in a case where there are a plurality of the detected higher-order services, the first in-effect-range service with each of the plurality of detected higher-order services as the start point service;
determining a value corresponding to a count of times where the first in-effect-range service has been judged to be reachable by tracing relations among services from the detected higher-order services to be a severity of failure of the first in-effect-range service; and
outputting severity display data, for a screen display, of the severity of the first in-effect-range service in the object service layer.

7. A non-transitory, computer-readable recording medium having stored therein a program for causing a computer to execute a process, the process comprising:
obtaining, from a higher-order effect range identifying device configured to search for a range of effects of failure within a higher-order service layer that provides a higher-order service using a service provided in an object service layer within a cloud service where services being provided have a layered structure, an identifier of a detected higher-order service regarding which occurrence of an abnormality or a possibility of being affected by an abnormality has been detected;
determining with an object-service-layer range identifying device, based on search route information indicating a first search route to search for a service within a range of effects of failure from a start point service, a service within the object service layer that is reachable by tracing relations among services from the detected higher-order service by following a second search route in a case where the detected higher-order service is the start point service, to be a first in-effect-range service regarding which there is a possibility of being affected by an abnormality; and
transmitting the identifier of the first in-effect-range service to a lower-order effect range identifying device configured to search for a range of effects of failure at a lower-order service layer, which is a source of providing a lower-order service that is used to provide a service within the object service layer;
determining, by the lower-order effect range identifying device, a lower-order service determined to be in the range of effects for failure, by following a third source route that uses the first in-effect range service as the start point service;
transmitting the identifier of the detected lower order service as a second in-effect range service to the object-service-layer range identifying device; and
outputting the detected higher-order service, the first in-effect range service, and the second in-effect range service to an administrator of at least one service layer,
wherein the higher-order effect range identifying device, the object-service-layer range identifying device, and the lower-order effect range identifying device are separate devices that operate within its own layer of services and maintains search route information for a set of search routes within the layer that corresponds to sets of services and resources that may be a cause of failure and can be correlated to a resource of a different layer.

8. An apparatus comprising: a memory; and
a processor coupled to the memory and configured to:
obtain, from a higher-order effect range identifying device configured to search for a range of effects of failure within a higher-order service layer that provides a higher-order service using a service provided in an object service layer within a cloud service where services being provided have a layered structure, an identifier of a detected higher-order service regarding which occurrence of an abnormality or a possibility of being affected by an abnormality has been detected;
determine with an object-service-layer range identifying device, based on search route information indicating a first search route to search for a service within a range of effects of failure from a start point service, a service within the object service layer that is reachable by tracing relations among services from the detected higher-order service by following a second search route in a case where the detected higher-order service is the start point service, to be a first in-effect-range service regarding which there is a possibility of being affected by an abnormality; and
transmit the identifier of the first in-effect-range service to a lower-order effect range identifying device configured to search for a range of effects of failure at a lower-order service layer, which is a source of providing a lower-order service that is used to provide a service within the object service layer;

determine, by the lower-order effect range identifying device, a lower-order service determined to be in the range of effects for failure, by following a third source route that uses the first in-effect range service as the start point service;

transmit the identifier of the detected lower order service as a second in-effect range service to the object-service-layer range identifying device; and output the detected higher-order service, the first in-effect range service, and the second in-effect range service to an administrator of at least one service layer, wherein the higher-order effect range identifying device, the object-service-layer range identifying device, and the lower-order effect range identifying device are separate devices that operate within its own layer of services and maintains search route information for a set of search routes within the layer that corresponds to sets of services and resources that may be a cause of failure and can be correlated to a resource of a different layer.

9. A computer-implemented method to detect range of a range of effects of a failure within a cloud computing system having a layered structure, the method comprising:

detecting a failure within the cloud computer system, the cloud computer system including a higher-order layer having a first range identifying device, object layer having a second range identifying device, and lower-order layer having a third range identifying device, the first range identifying device, second range identifying device and third range identifying device perform cooperative processing to detect the range of effects of the detected failure;

receiving, by the second range identifying device, identifiers of higher order equipment of which a failure is detected;

searching, by the second range identifying device, for first in-effect range equipment based on the received identifiers and route information, the route information identifying relationships between equipment within a same layer of the layered structure and relationships between equipment with different layers of the layered structure;

transmitting, from the second range identifying device to the third range identifying device, identifiers of the first in-effect range equipment;

identifying, by the third range identifying device, lower-order equipment of the lower-order layer based on the identifiers of the first in-effect range equipment and the route information;

transmitting, from the third range identifying device to the second range identifying device, the identifiers of the identified lower-order equipment;

searching, by the second range identifying device, for second in-effect range equipment based on the route information and the identifiers of the lower-order equipment; and outputting the range of effects of the detected failure that identifies the detected higher order equipment, the searched first in-effect range equipment, and the second in-effect range equipment, wherein the first in-effect range equipment and the second in-effect range equipment are different, and wherein the first range identifying device, the second range identifying device, and the third range identifying device are separate devices that operate within its own layer of services and maintains search route information for a set of search routes within the layer that corresponds to sets of services and equipment that may be a cause of failure and can be correlated to equipment of a different layer.

* * * * *